US011299253B2

(12) United States Patent
Tokugawa et al.

(10) Patent No.: US 11,299,253 B2
(45) Date of Patent: Apr. 12, 2022

(54) TRANSONIC AIRFOIL, WING, AND AIRCRAFT

(71) Applicant: JAPAN AEROSPACE EXPLORATION AGENCY, Tokyo (JP)

(72) Inventors: Naoko Tokugawa, Tokyo (JP); Tatsunori Yuhara, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 16/771,414

(22) PCT Filed: Oct. 10, 2018

(86) PCT No.: PCT/JP2018/037668
§ 371 (c)(1),
(2) Date: Jun. 10, 2020

(87) PCT Pub. No.: WO2019/116697
PCT Pub. Date: Jun. 20, 2019

(65) Prior Publication Data
US 2021/0070420 A1    Mar. 11, 2021

(30) Foreign Application Priority Data

Dec. 12, 2017  (JP) .............................. JP2017-237651

(51) Int. Cl.
*B64C 3/14*    (2006.01)
(52) U.S. Cl.
CPC ................................... *B64C 3/14* (2013.01)
(58) Field of Classification Search
CPC ........ B64C 2003/146; B64C 2003/149; B64C 3/14
See application file for complete search history.

(56) References Cited

U.S. PATENT DOCUMENTS

| 4,240,597 A | 12/1980 | Ellis et al. |
| 4,413,796 A * | 11/1983 | Bousquet ................. B64C 3/14 |
| | | 244/35 R |

(Continued)

FOREIGN PATENT DOCUMENTS

| CN | 104691739 A | 6/2015 |
| CN | 107284650 A | 10/2017 |

(Continued)

OTHER PUBLICATIONS

International Search Report dated Jan. 15, 2019 in International Application No. PCT/JP2018/037668.

(Continued)

*Primary Examiner* — Justin M Benedik
(74) *Attorney, Agent, or Firm* — Saliwanchik, Lloyd & Eisenschenk

(57) ABSTRACT

[Object] To provide a transonic airfoil capable of reducing pressure drag more than before, a wing having such an airfoil, and an aircraft including such a wing.

[Solving Means] An airfoil 11 has a shape in which a pressure coefficient Cp of a static pressure in a chord direction of a leading edge 12 of the airfoil 11 is −0.04 or less at $z/c=0.015$ (where z represents a coordinate in a direction perpendicular to an airflow direction within a plane that forms an airfoil, with a leading edge being as a reference (an upper wing surface direction is positive, and a lower wing surface direction is negative), and c represents a chord length). Thus, a pressure distribution has a sharp rise, which can decrease pressure drag.

9 Claims, 59 Drawing Sheets

(56) References Cited

U.S. PATENT DOCUMENTS

| | | | |
|---|---|---|---|
| 4,455,003 A | 6/1984 | Hilbig | |
| 4,655,412 A * | 4/1987 | Hinkleman | B64C 3/14 244/35 R |
| 4,718,619 A | 1/1988 | Ashill et al. | |
| 4,856,735 A | 8/1989 | Lotz et al. | |
| 6,651,927 B1 * | 11/2003 | Hackett | B64C 3/14 244/35 R |
| 7,000,870 B2 | 2/2006 | Tracy et al. | |
| 9,031,817 B2 * | 5/2015 | Yoshida | B64F 5/00 703/1 |
| 2003/0127561 A1 * | 7/2003 | Somers | B64C 3/14 244/35 R |
| 2006/0226283 A1 | 10/2006 | Shepshelovich et al. | |
| 2012/0166148 A1 | 6/2012 | Yoshida et al. | |

FOREIGN PATENT DOCUMENTS

| | | |
|---|---|---|
| EP | 0 076 907 A2 | 8/1982 |
| EP | 0 111 785 A1 | 6/1984 |
| JP | 3-080680 B2 | 12/1991 |
| JP | 2012-126205 A | 7/2012 |
| JP | 5747343 B2 | 7/2015 |

OTHER PUBLICATIONS

Yuhara, T., "A Study of Streamline Curvature and Its Application to Airfoil Design" APISAT, 2016, pp. 1-6, Japan Aerospace Exploration Agency, Chofu, Japan, (submitted to Transaction of JSASS under review).

Barger, R. L. et al., "A Streamline Curvature Method for Design of Supercritical and Subcritical Airfoils" National Aeronautics and Space Administration, NASA TN D-7770, Sep. 1974, 17 pages, Washington, D.C.

Cook, P.H. et al., "Aerofoil RAE 2822—Pressure Distributions, and Boundary Layer and Wake Measurements", Agard AR-138, 1979, Royal Aircraft Establishment, Farnborough, Hants, United Kingdom, pp. A6-1 to A6-77.

Smith, N.R. et al., "Conceptual Design of an Environmentally Responsible 150-Passenger Commercial Aircraft", AIAA 2010-1392, $48^{th}$ AIAA Aerospace Sciences Meeting Including the New Horizons Forum and Aerospace Exposition, Jan. 4-7, 2020, Orlando, Florida, 11 pages.

NACA airfoil, Wikipedia, 7 pages, https://en.wikipedia.org/w/index.php?title=NACA airfoil&oidid=949083507, last edited on Apr. 4, 2020.

Lyu, Z. et al., "Aerodynamic Shape Optimization Investigations of the Common Research Model Wing Benchmark", AIAA Journal, Apr. 2015, 53(4):968-985.

Kimura T. (Gakushuin University), "Natural laminar flow design for main wing of transonic airliner with limited wing thickness", Graduation research, 2016, 54 pages, along with partial English translation.

Kamiya, N., "Vision for the study of transonic wing", The Japan Society for Aeronautical and Space Sciences Journal 27, 1979, pp. 627-637, along with partial English translation.

Nomura T., "Conceptual Design of Future Passenger Aircraft Aimed at Reducing Fuel Consumption", JAXA Research and Development Report, ISSN 1349-1113, JAXA-RR-13-007, Dec. 2013, along with English Abstract.

Supplementary European Search Report dated Jul. 27, 2021 in European Application No. 18889651.8.

Office Action dated Aug. 20, 2021 in Canadian Application No. 3,085,552.

Office Action dated Nov. 29, 2021 in Japanese Application No. 2017-237651.

* cited by examiner

TRANSONIC AIRFOIL, WING, AND AIRCRAFT

CROSS-REFERENCE TO RELATED APPLICATIONS

This application is the U.S. national stage application of International Patent Application No. PCT/JP2018/037668, filed Oct. 10, 2018, which claims the benefit under 35 U.S.C. § 119 of Japanese Patent Application No. 2017-237651, filed Dec. 12, 2017, the disclosures of each of which are incorporated herein by reference in their entirety.

TECHNICAL FIELD

The present invention relates to a transonic airfoil of a main wing of, for example, a transonic airliner, a wing having the airfoil, and an aircraft including the wing as a main wing.

BACKGROUND ART

The drag that acts on an aircraft can be classified into two of pressure drag and friction drag.

Of those, the pressure drag is force that pulls an object backward by separating air around the object, creating vortexes backwards, and reducing the pressure. The pressure drag is one kind of profile drag that varies depending on only the shape of an object.

In a transonic airliner, approximately 80% of the pressure drag occurs by a main wing, and thus a reduction in pressure drag of the main wing plays a significant role in reduction of the whole drag of the airliner.

The main wing of transonic airliners that is currently operated has an sweptback angle to delay the influence of compressibleness of the air generated on the wings, that is, the damage caused by a shock wave. Furthermore, transonic airfoils such as a peaky airfoil, a rear-loading airfoil, and a supercritical airfoil, in which a cross-sectional shape of a wing, i.e., an airfoil, has a flat upper wing surface and is configured to suppress acceleration, are employed to devise generation of a gentle shock wave.

The peaky airfoil, which is a representative transonic airfoil, is a transonic airfoil but causes no shock wave. Meanwhile, the supercritical airfoil causes a shock wave, but the shock wave is very weak (see Non-Patent Literatures 1 to 8 and Patent Literatures 1 to 4).

CITATION LIST

Patent Literature

Patent Literature 1: U.S. Pat. No. 4,413,796
Patent Literature 2: European Patent Application Laid-open No. 0111785A1
Patent Literature 3: U.S. Pat. No. 4,240,597
Patent Literature 4: U.S. Pat. No. 4,655,412
Patent Literature 5: Japanese Patent No. 5747343

Non-Patent Literature

Non-Patent Literature 1: Yuhara, T. (JAXA) 'A Study of Streamline Curvature and Its Application to Airfoil Design' APISAT, 2016. (submitted to Transaction of JSASS under review)
Non-Patent Literature 2: Barger, R. L. and Brooks, C. W. (NASA) 'A Streamline Curvature Method for Design of Supercritical Airfoils' NASA TN D-7770, 1974.
Non-Patent Literature 3: P. H. Cook, M. A. McDonald, M. C. P. Firmin 'Aerofoil RAE 2822—Pressure Distributions and Boundary Layer and Wake Measurements' AGARD AR-138, 1979.
Non-Patent Literature 4: Natalie R. et al. 'Conceptual Design of an Environmentally Responsible 150—Passenger Commercial Aircraft' AIAA 2010-1392
Non-Patent Literature 5: 'NACA airfoil' Wikipedia
Non-Patent Literature 6: Zhoujie Lyu, et al. 'Aerodynamic Shape Optimization Investigations of the Common Research Model Wing Benchmark' AIAA Journal, Vol. 53, No. 4 (2015), pp. 968-985.
Non-Patent Literature 7: Kimura, T. (Gakushuin University), "Natural laminar flow design for main wing of transonic airliner with limited wing thickness" [Translated from Japanese.], Graduation research, 2016
Non-Patent Literature 8: Kamiya, N. "Vision for the study of transonic wing" [Translated from Japanese.], the Japan Society for Aeronautical and Space Sciences Journal 27 (1979) 627-637
Non-Patent Literature 9: Nomura, T. "Conceptual Design of Future Passenger Aircraft Aimed at Reducing Fuel Consumption", JAXA-RR-13-007, 2013

DISCLOSURE OF INVENTION

Technical Problem

However, to improve sustainability of environment and resources in air transport, which is predicted to continue expanding, it is necessary to further reduce aerodynamic drag.

For one means of such reduction, the inventors of the present invention are examining the technology in which the technology of designing a natural laminar flow wing for reducing friction drag is applied to a concept design of a transonic aircraft (see Patent Literature 5 and the like). In the process of the examination, the inventors of the present invention have discovered an airfoil that significantly reduces pressure drag (Non-Patent Literature 7).

Thus, it is an object of the present invention to provide a transonic airfoil capable of reducing pressure drag more than before, a wing having such an airfoil, and an aircraft including such a wing.

Solution to Problem

The following facts have been known: thrust occurs if the leading edge of a wing is twisted down; and a curvature distribution that forms an airfoil has high sensitivity with respect to a pressure distribution.

However, the shape of the leading edge of the airfoil, and its change in the chord direction, which are points for reducing the pressure drag of the transonic airfoil, are not clarified. The inventors of the present invention have been keenly examined to clarify those points and then solved the above problems.

In other words, a transonic airfoil according to one embodiment of the present invention has a shape in which a pressure coefficient Cp of a static pressure in a chord direction of a leading edge is −0.04 or less at $z/c=0.015$, where z represents a coordinate in a direction perpendicular to an airflow direction within a plane that forms an airfoil, with the leading edge being as a reference (an upper wing surface direction is positive, and a lower wing surface direction is negative), and c represents a chord length.

The transonic airfoil may further have a shape in which the pressure coefficient Cp of the static pressure in the chord direction of the leading edge is −0.07 or less at z/c=0.035.

In the transonic airfoil according to one embodiment of the present invention, κ has a local maximal value of 70 or more in an upwardly convex curve in a range of −0.08<s/c<0.08, $K_s$ is 2.2 or more in a range from s/c=−0.1 to s/c=0.02, and κ is 0.3 or less in a range from s/c=0.3 to s/c=0.6, where s represents a surface length along a surface of the airfoil, with the leading edge being as a reference (the upper wing surface direction is positive, and the lower wing surface direction is negative), κ represents a curvature that is made dimensionless by a reciprocal of the chord length, and $K_s$ represents an integral value of the curvature κ.

Furthermore, in the transonic airfoil, κ may be less than 0.3 at s/c=0.5, and the κ being less than 0.3 may increase to be 0.45 or more at s/c=0.8.

Furthermore, in the transonic airfoil, κ may have a local maximal value of 1 or more in an upwardly convex curve in a range from s/c=0.9 or more to a position of a trailing edge.

In the transonic airfoil, κ may monotonically decrease in a range from a stagnation point to a crest position of a lower wing surface, and $K_s$ may be 0.1 or more in a range from s/c=−0.1 to s/c=−0.2.

Furthermore, in the transonic airfoil, κ may have a mean value of 0.45 or less in a range from s/c=−0.52 to s/c=−0.34, and κ may be 0.4 or less at s/c=−0.52.

Furthermore, in the transonic airfoil, a distribution of κ may monotonically increase to 1 or more in a range from s/c=−0.9 or less to a position of a trailing edge.

A wing according to one embodiment of the present invention has the transonic airfoil described above. Additionally, an aircraft according to one embodiment of the present invention includes a main wing having the transonic airfoil described above.

Advantageous Effects of Invention

According to the present invention, it is possible to reduce pressure drag more than before.

MODE(S) FOR CARRYING OUT THE INVENTION

Hereinafter, an embodiment of the present invention will be described with reference to the drawings.

Figure 1:
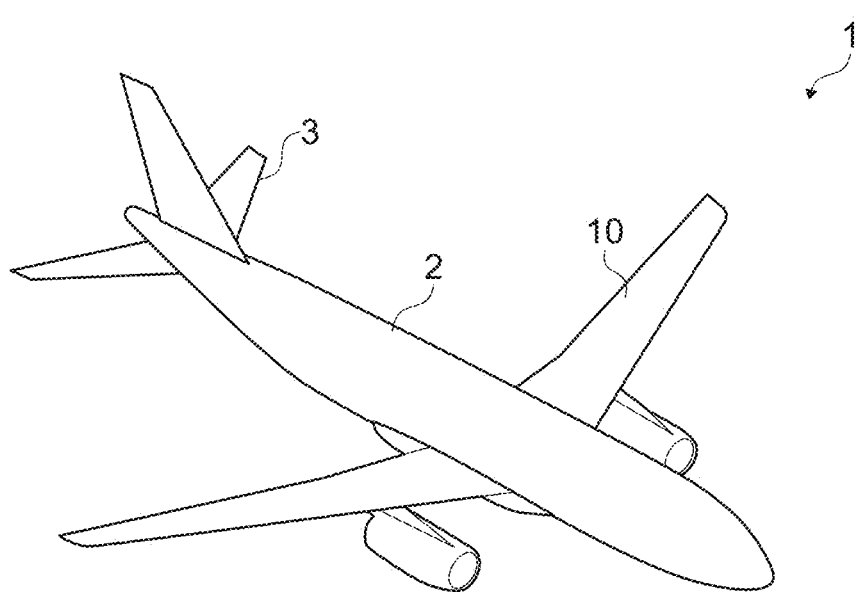
FIG. 1 is a schematic perspective view of an aircraft according to one embodiment of the present invention.

FIG. 1 is a schematic perspective view of an aircraft according to one embodiment of the present invention.

An aircraft 1 includes a main wing 10, an empennage 3, and the like provided to a fuselage 2.

The main wing 10 has a transonic airfoil according to the present invention.

Figure 2:
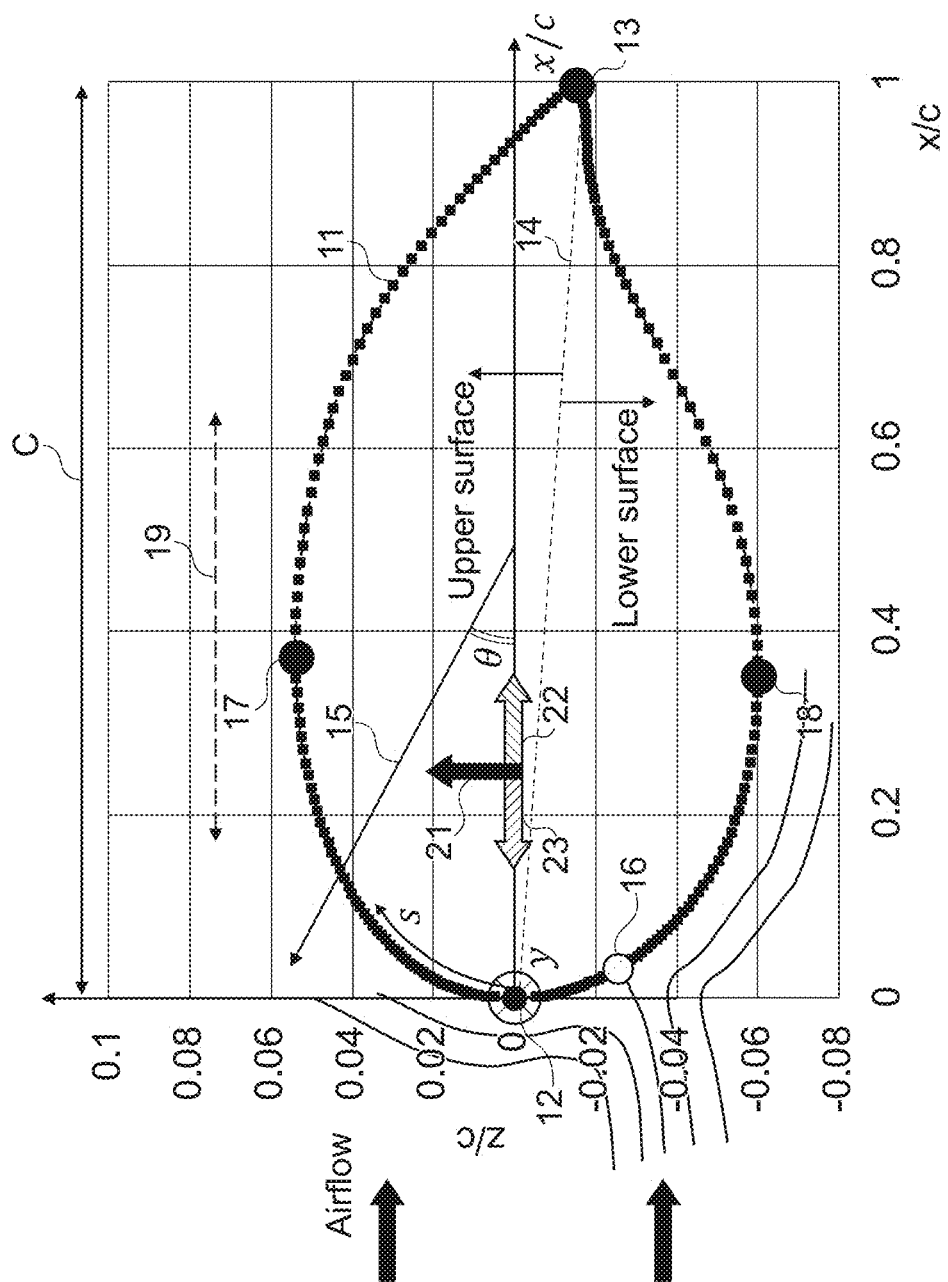
FIG. 2 is a diagram showing a dimensionless airfoil of a main wing shown in FIG. 1.

FIG. 2 is a diagram showing a dimensionless airfoil of the main wing 10.

A reference numeral 11 represents a two-dimensional airfoil (airfoil) of the main wing 10. The two-dimensional airfoil 11 includes two-dimensional elements in a chord direction, which are arranged in a wingspan direction to configure three-dimensional elements (three-dimensional wing) attached to mainly generate lift in the aircraft 1.

A reference numeral 12 represents a leading edge, and a reference numeral 13 represents a trailing edge. The leading edge 12 and the trailing edge 13 are two-dimensional elements at positions having a minimum value and a maximum value of the coordinate in the chord direction.

In the diagram, the upper side from a line segment 14 connecting the leading edge 12 and the trailing edge 13 is the upper surface of the main wing 10, and the lower side from the line segment 14 is the lower surface of the main wing 10.

A reference symbol x represents a coordinate in an airflow direction with the leading edge 12 being as a reference, a reference symbol y represents a coordinate in the wingspan direction orthogonal to the airfoil 11, and a reference symbol z represents a coordinate in a direction perpendicular to x within the plane that forms the airfoil 11, with the leading edge 12 being as a reference.

A reference symbol c represents a chord length, that is, a maximum length between any two points on the airfoil 11.

In the diagram, the unit of each of the x-axis and the z-axis is x/c and z/c, respectively, which are dimensionless.

A reference symbol θ represents an angle defined by a line 15, which connects the center of the airfoil 11 (x/c=0.5, z/c=0) and any point on the airfoil 11, and a line satisfying z/c=0 (X-axis). The upper surface side is assumed as positive, and the lower surface side is assumed as negative.

A reference symbol s represents a surface length along the surface of the airfoil 11 with the leading edge 12 being as a reference. The upper surface side is assumed as positive, and the lower surface side is assumed as negative.

A reference numeral 16 represents a stagnation point, a reference numeral 17 represents an upper surface crest, and a reference numeral 18 represents a lower surface crest. The stagnation point 16 is a position, at which the velocity of the fluid is zero, on the surface of the two-dimensional element into the airflow. The stagnation point 16 is located near the leading edge 12 in an actual flow with viscosity. The crest means a position at which the z coordinate is maximum or minimum on the airfoil 11. The maximum position is referred to as an upper surface crest, and the minimum position is referred to as a lower surface crest.

A reference numeral 19 represents a mid-chord. The mid-chord 19 is a middle region between the leading edge 12 and the trailing edge 13 of the two-dimensional airfoil 11.

Additionally, a reference numeral 21 represents lift, a reference numeral 22 represents drag, and a reference numeral 23 represents thrust. The lift 21 is the force in the airflow direction and the perpendicular direction that acts by movement of the two-dimensional element in the air. The drag 22 is the force in the airflow direction that acts by movement of the two-dimensional element in the air. The thrust 23 is the force in the direction opposite to the airflow direction that acts by movement of the two-dimensional element in the air. Note that pressure drag is, in the drag 22, drag generated by the pressure of the surface of the two-dimensional element, and pressure thrust is, in the thrust 23, thrust generated by the pressure of the surface of the two-dimensional element.

In this specification, a reference symbol κ represents a curvature that is made dimensionless by the reciprocal of the chord length c, and a reference symbol K is an integral value of the curvature κ. Here, $K_\theta$ and $K_s$ are as follows.

$$K_\theta = \int_{\theta_{low}}^{\theta} \kappa \cdot d\theta \quad \text{[Math. 1]}$$

where $\theta_{low} = -5$ deg.

$$K_s = \int_{s_{low}}^{s/c} \kappa \cdot d(s/c) \quad \text{[Math. 2]}$$

where $s_{low}/C = -0.1$.

Figure 3:
FIG. 3 is a graph (part 1) showing a pressure distribution of a static pressure in a chord direction of airfoils according to one embodiment and airfoils illustrated as reference examples.

FIG. 3 is a graph (part 1) showing a pressure distribution of a static pressure in the chord direction of the airfoils 11 according to this embodiment and airfoils as reference examples.

In FIG. 3, a thick solid line A indicates a pressure distribution of an airfoil 11 in a first mode according to this embodiment, a medium solid line B indicates a pressure distribution of an airfoil 11 in a second mode according to this embodiment, a thin solid line C indicates a pressure distribution of an airfoil 11 in a third mode according to this embodiment. Additionally, a dotted line D indicates a pressure distribution of an RAE 2822 airfoil (see Non-Patent Literature 3), a chain line E indicates a pressure distribution of a CRM airfoil (see Non-Patent Literature 3), and a chain double-dashed line F indicates a pressure distribution of a Baseline airfoil (see Non-Patent Literature 9).

Note that, also in the graphs to be shown below, the thick solid line A indicates data regarding the airfoil 11 in the first mode according to this embodiment, the medium solid line B indicates data regarding the airfoil 11 in the second mode according to this embodiment, the thin solid line C indicates data regarding the airfoil 11 in the third mode according to this embodiment, the dotted line D indicates data regarding the RAE 2822 airfoil, the chain line E indicates data regarding the CRM airfoil, and the chain double-dashed line F indicates data regarding the Baseline airfoil.

The airfoils 11 in the first to third modes according to this embodiment have a shape in which a pressure coefficient Cp of a static pressure in the chord direction of the leading edge 12 is −0.04 or less at z/c=0.015.

With this shape, the airfoils 11 in the first to third modes according to this embodiment have a sharp rise of the pressure distribution as compared with the airfoils illustrated as reference examples, and can thus decrease the pressure drag. Decreasing the pressure drag leads to decreasing the drag 22 and increasing the thrust 23.

Note that the airfoils 11 in the first to third modes according to this embodiment favorably have a shape in which the pressure coefficient Cp of the static pressure in the chord direction of the leading edge 12 is −1 or more at z/c=0.015. This is because an extremely low Cp is highly likely to generate a large adverse pressure gradient in the downstream, cause boundary layer separation, and thus increase the pressure drag.

Figure 4:
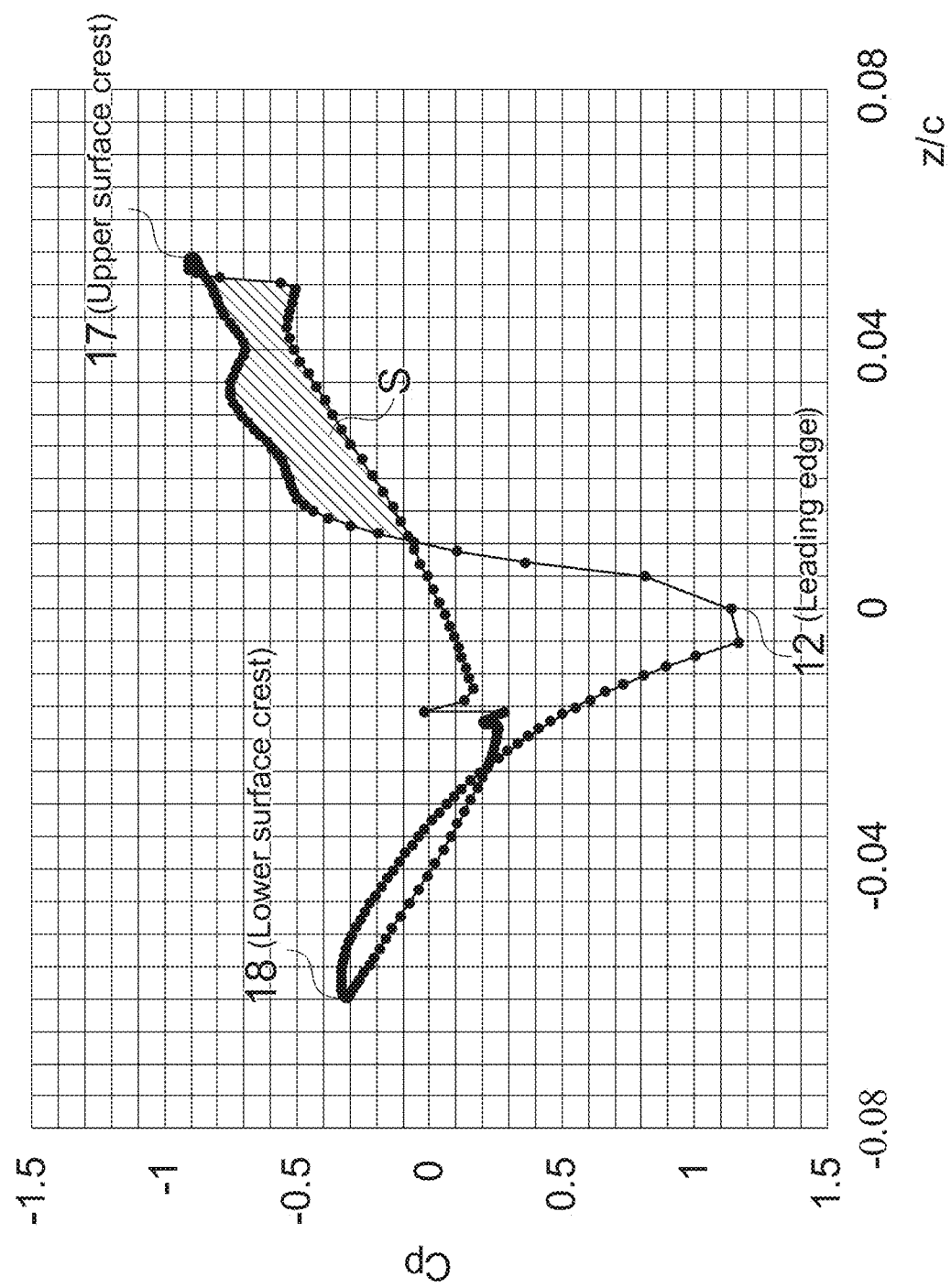
FIG. 4 is a graph of the pressure distribution of an airfoil in a first mode, which is extracted from FIG. 3.

Additionally, FIG. 4 is a graph of the pressure distribution of the airfoil 11 in the first mode, which is extracted from FIG. 3. As a hatched region (inverted region) denoted by a reference symbol S becomes larger, the thrust increases. As seen from FIG. 4, the airfoils 11 in the first to third modes according to this embodiment have a larger area of the inverted region than those of the airfoils illustrated as reference examples. This results from the shape in which the pressure coefficient Cp of the static pressure in the chord direction of the leading edge 12 is −0.04 or less at z/c=0.015. Therefore, the airfoils 11 in the first to third modes according to this embodiment have an increased thrust also by an increase of the inverted region, as compared with the airfoils illustrated as reference examples.

According to the knowledge of the inventors of the present invention, it has been found that the area of the inverted region of the airfoil 11 according to this embodiment increases by approximately 38% to 138% as compared with the related art, and thus the thrust corresponding thereto increases.

Figure 5:
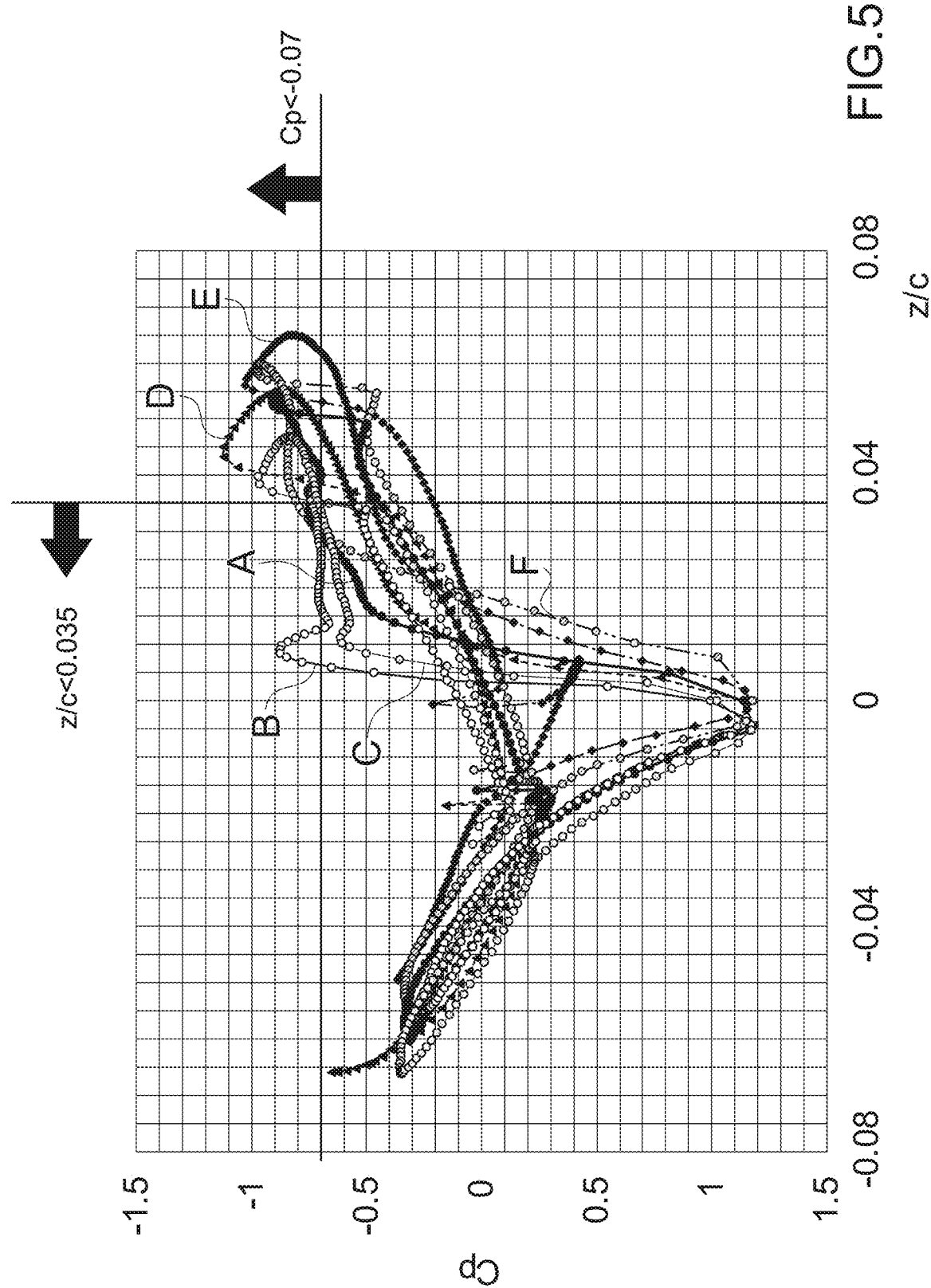
FIG. 5 is a graph (part 2) showing the pressure distribution of the static pressure in the chord direction of the airfoils according to one embodiment and the airfoils illustrated as reference examples.

FIG. 5 is a graph (part 2) showing the pressure distribution of the static pressure in the chord direction of the airfoils 11 according to this embodiment and airfoils as reference examples.

The airfoils 11 in the first to third modes according to this embodiment further have a shape in which the pressure coefficient Cp of the static pressure in the chord direction of the leading edge 12 is −0.07 or less at z/c=0.035.

Thus, the airfoils 11 in the first to third modes according to this embodiment have a further expanded inverted region, and the effect of increasing the thrust can be enhanced.

Note that the airfoils 11 in the first to third modes according to this embodiment favorably have a shape in which the pressure coefficient Cp of the static pressure in the chord direction of the leading edge 12 is −1 or more at z/c=0.035. This is because an extremely low Cp is highly likely to generate a large adverse pressure gradient in the downstream, cause boundary layer separation, and thus increase the pressure drag.

As described above, the airfoil 11 according to this embodiment is characterized by having a sharp rise of the pressure distribution. The modes in shape of the airfoil 11 for such a purpose will be described below.

Figure 6:
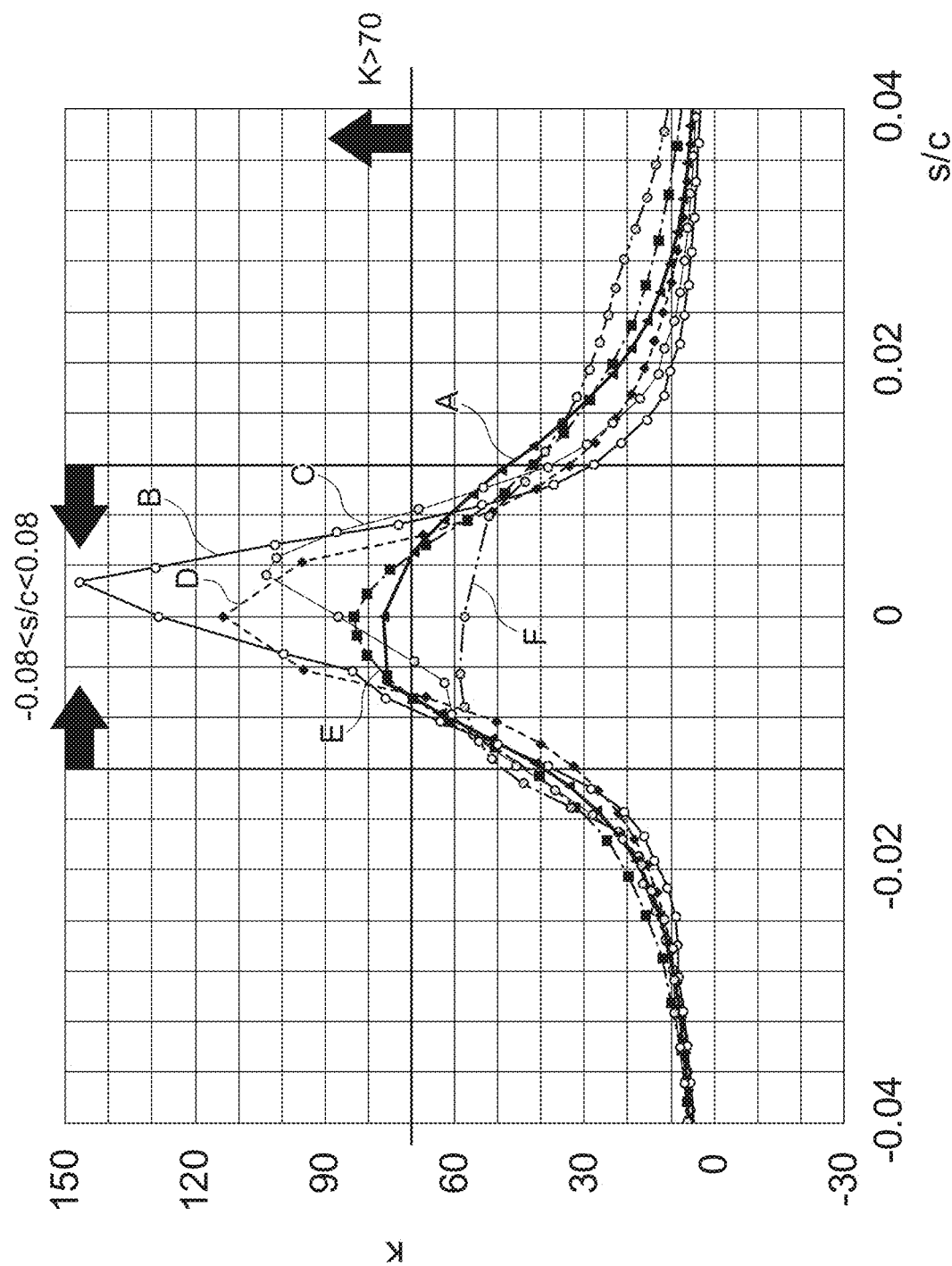
FIG. 6 is a graph (part 1) showing a relationship between s/c and κ of the airfoils according to one embodiment and the airfoils illustrated as reference examples.
Figure 7:
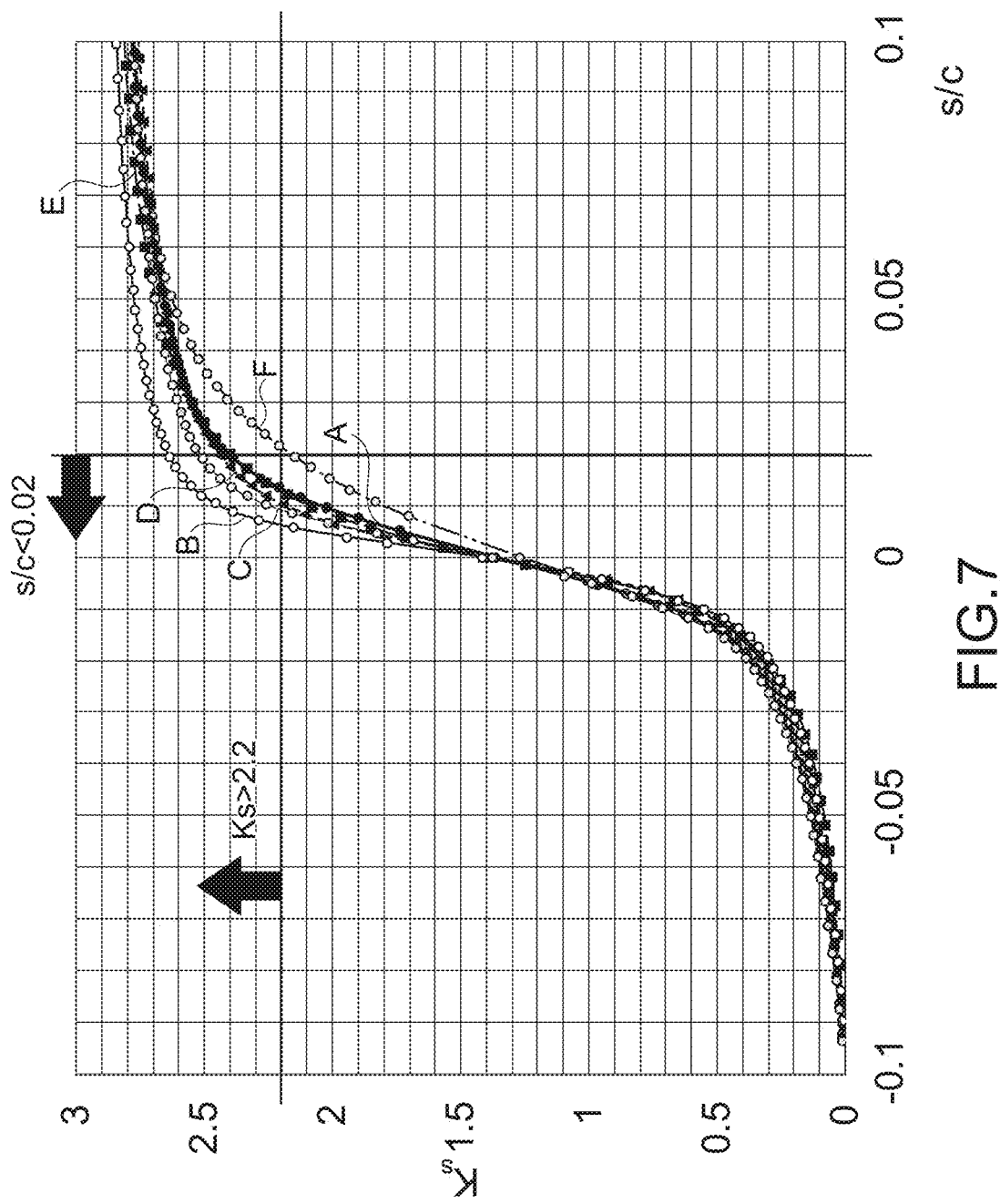
FIG. 7 is a graph (part 1) showing a relationship between s/c and $K_s$ of the airfoils according to one embodiment and the airfoils illustrated as reference examples.
Figure 8:
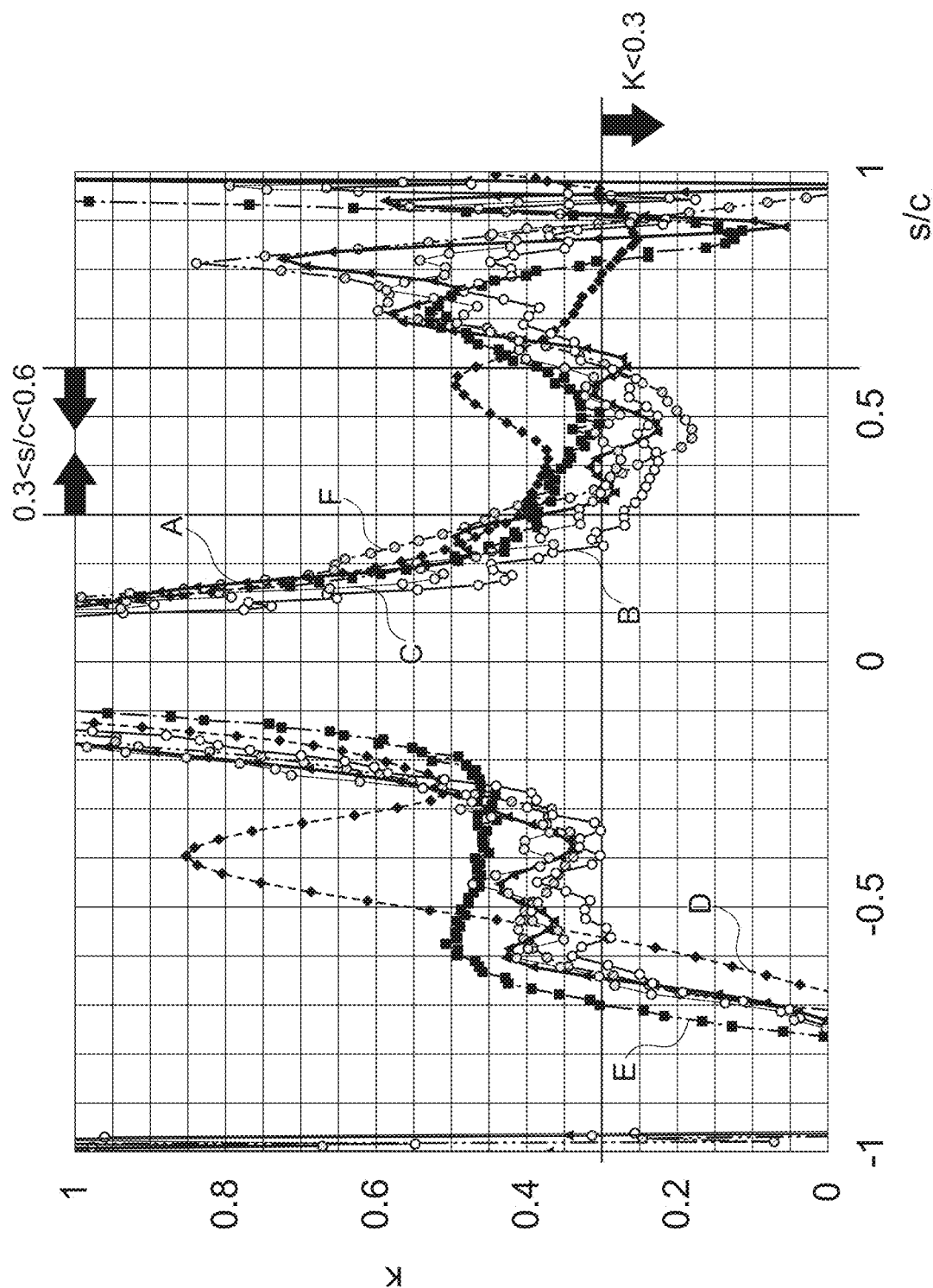
FIG. 8 is a graph (part 2) showing a relationship between s/c and κ of the airfoils 11 according to one embodiment and the airfoils illustrated as reference examples.

FIG. 6 is a graph (part 1) showing a relationship between s/c and κ of the airfoils 11 according to this embodiment and the airfoils illustrated as reference examples. FIG. 7 is a graph (part 1) showing a relationship between s/c and $K_s$ of the airfoils 11 according to this embodiment and the airfoils illustrated as reference examples. FIG. 8 is a graph (part 2) showing a relationship between s/c and κ of the airfoils 11 according to this embodiment and the airfoils illustrated as reference examples.

The airfoils 11 according to this embodiment have a shape in which, as shown in FIG. 6, κ has a local maximal value of 70 or more in an upwardly convex curve in the range of −0.08<s/c<0.08, and as shown in FIG. 7, $K_s$ is 2.2 or more in the range from s/c=−0.1 to s/c=0.02. Such a shape can sharply decrease the pressure and can increase the thrust.

Note that, in the airfoils 11 according to this embodiment, κ favorably has a local maximal value of 250 or less in the range of −0.08<s/c<0.08. Additionally, $K_s$ is favorably 5 or less in the range from s/c=−0.1 to s/c=0.02. This is because an extremely sharp shape of the leading edge is highly likely to cause a stall if the angle of attack of the airframe is changed.

Additionally, the airfoils 11 according to this embodiment have a shape in which κ is 0.3 or less in the range from s/c=0.3 to s/c=0.6, which is near a position where a shock wave is generated, as shown in FIG. 8. Thus, the pressure lowered with the shape shown in FIGS. 6 and 7 is kept low also at that position (from s/c=0.3 to s/c=0.6), and thus the thrust further increases.

Note that, in the airfoils 11 according to this embodiment, κ is favorably 0.05 or more in the range from s/c=0.3 to s/c=0.6. This is because a flat shape or a recessed shape with a negative curvature in this region is highly likely to cause the boundary layer separation and thus increase the pressure drag.

The airfoils 11 according to this embodiment have the shape described above and can set the pressure coefficient Cp of the static pressure in the chord direction of the leading edge 12 to be −0.04 or less at z/c=0.015 and further set the pressure coefficient Cp of the static pressure in the chord direction of the leading edge 12 to be −0.07 or less at z/c=0.035. This can reduce the pressure drag and also enlarge the inverted region, and thus increase the thrust.

Figure 9:
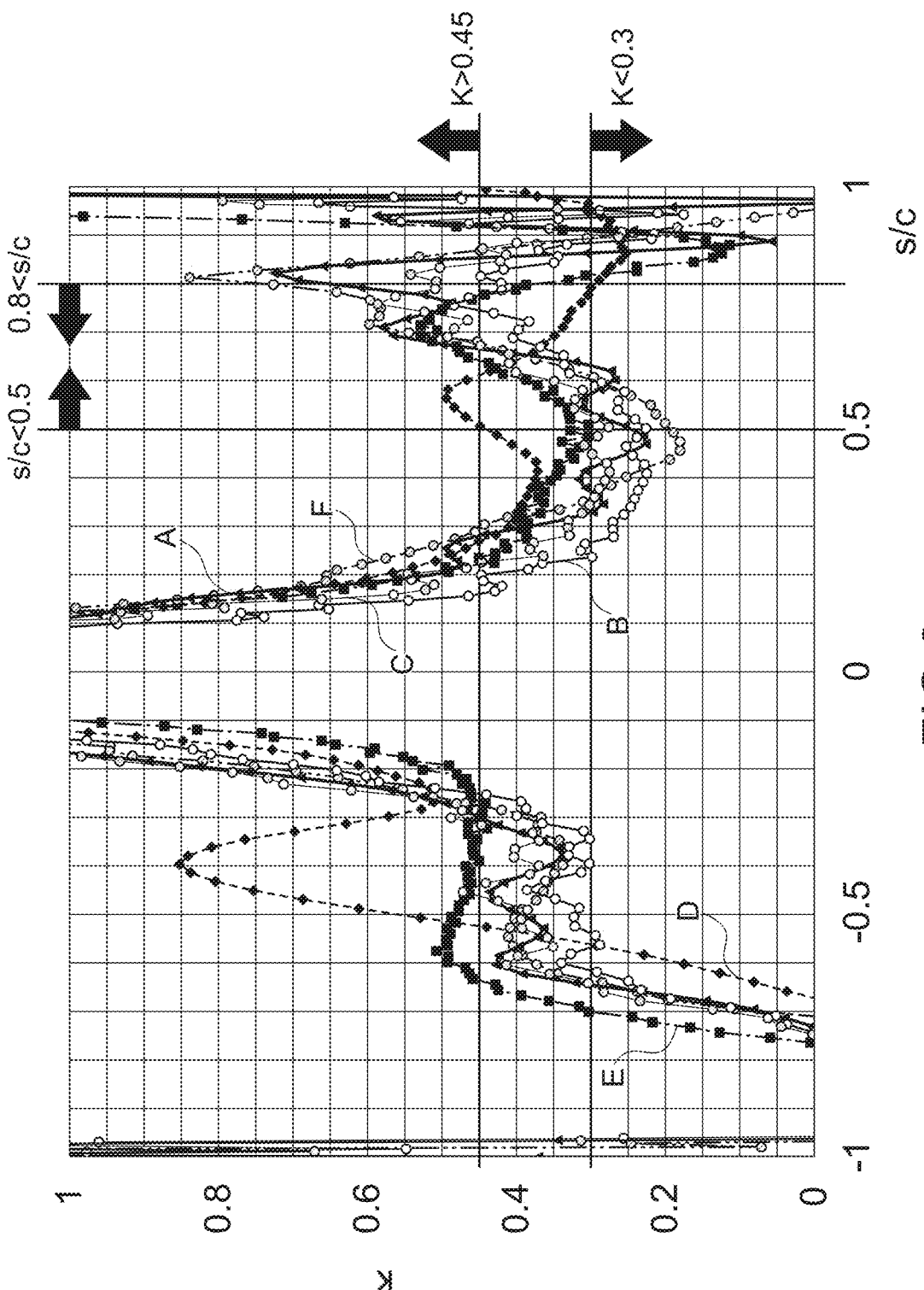
FIG. 9 is a graph (part 3) showing a relationship between s/c and κ of the airfoils according to one embodiment and the airfoils illustrated as reference examples.

FIG. 9 is a graph (part 3) showing a relationship between s/c and κ of the airfoils 11 according to this embodiment and the airfoils illustrated as reference examples.

The airfoils 11 according to this embodiment have a shape in which, as shown in FIG. 9, κ being near the position of the upper surface crest 17 is less than 0.3 at s/c=0.5, and κ, which is less than 0.3, increases to be 0.45 or more at s/c=0.8. Positions of s/c=0.5 and s/c=0.8 are around the position at which a shock wave occurs.

With such a shape, the pressure in the rear of the position of the upper surface crest 17 rises, and the thrust further increases.

Note that κ is favorably 0.05 or more at s/c=0.5. This is because a flat shape or a recessed shape with a negative curvature in this region is highly likely to cause the boundary layer separation and thus increase the pressure drag. Additionally, it is favorable that κ increases to 100 or less at s/c=0.8. This is because an excessively large curvature is highly likely to generate a large adverse pressure gradient in the downstream, cause the boundary layer separation, and thus increase the pressure drag.

Figure 10:
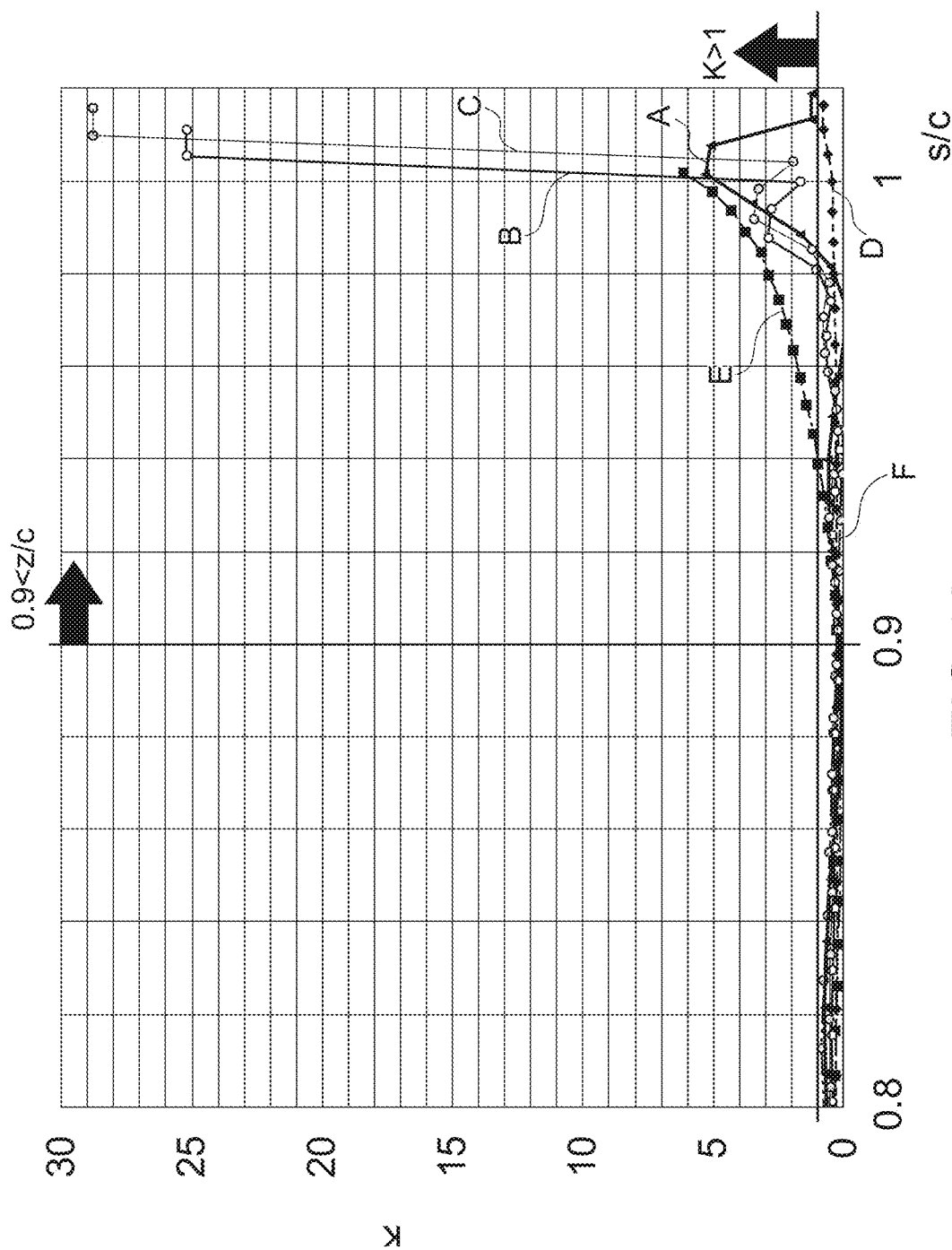
FIG. 10 is a graph (part 4) showing a relationship between s/c and κ of the airfoils according to one embodiment and the airfoils illustrated as reference examples.

FIG. 10 is a graph (part 4) showing a relationship between s/c and κ of the airfoils 11 according to this embodiment and the airfoils illustrated as reference examples.

The airfoils 11 according to this embodiment have a shape in which, as shown in FIG. 10, κ has a local maximal value of 1 or more in an upwardly convex curve in the range from s/c=0.9 or more to the position of the trailing edge.

With this shape, the pressure, which is kept low from s/c=0.3 to s/c=0.6, increases by the shock wave and then further increases at that position (position of local maximal value), and thus the drag decreases.

Note that κ favorably has a local maximal value of 100 or less. This is because an extremely large curvature at the trailing edge is highly likely to generate a large adverse pressure gradient in the downstream, cause the boundary layer separation, and thus increase the pressure drag.

Figure 11:
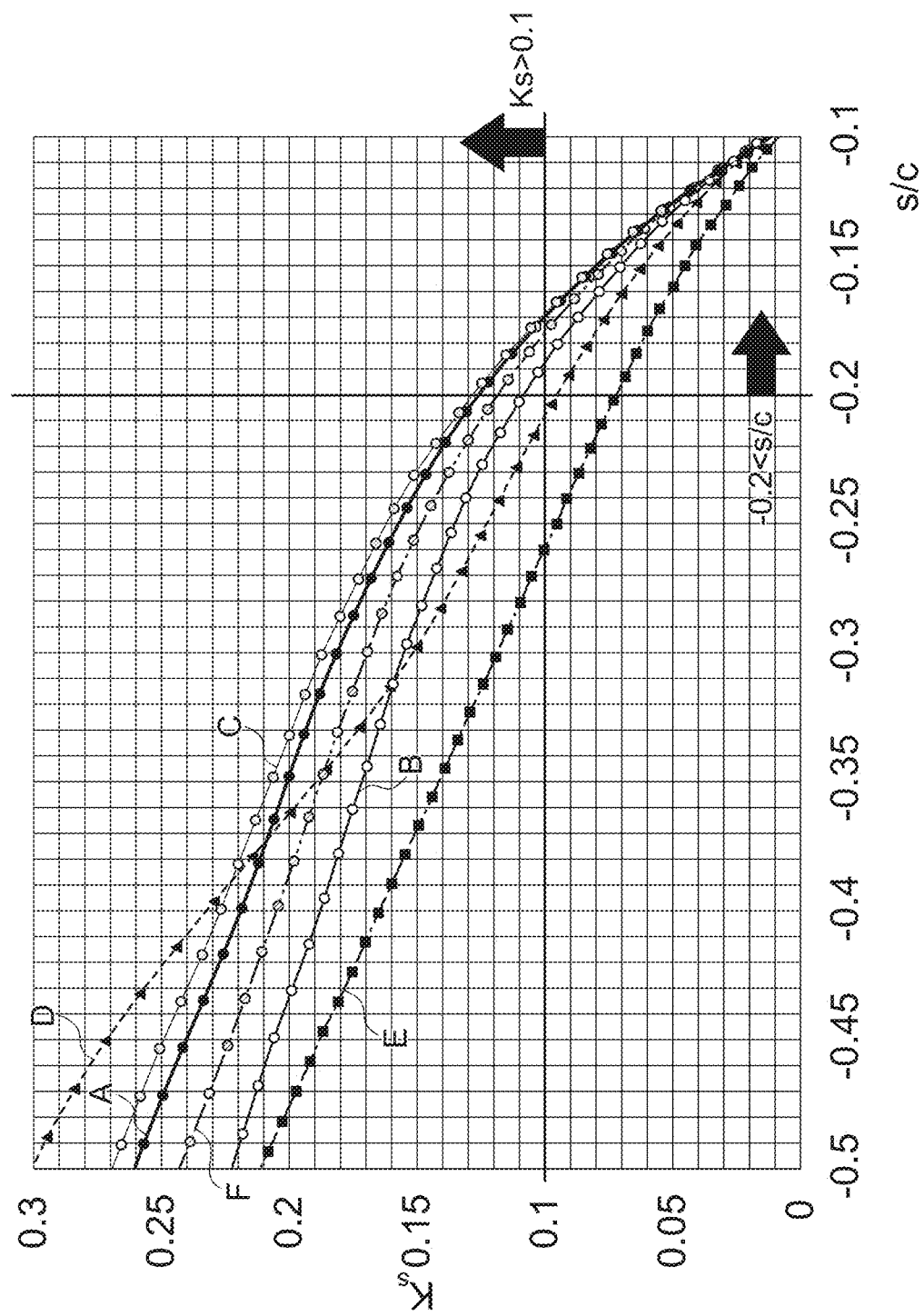
FIG. 11 is a graph (part 2) showing a relationship between s/c and $K_s$ of the airfoils according to one embodiment and the airfoils illustrated as reference examples.

FIG. 11 is a graph (part 2) showing a relationship between s/c and $K_s$ of the airfoils 11 according to this embodiment and the airfoils illustrated as reference examples.

The airfoils 11 according to this embodiment have a shape in which, as shown in FIG. 11, κ monotonically decreases in the range from the stagnation point 16 to the crest position 18 of the lower wing surface, and $K_s$, which is the integral value of the curvature, is 0.1 or more in the range from s/c=−0.1 to s/c=−0.2.

Thus, the pressure sharply decreases, and thus the thrust increases.

Note that $K_s$, which is the integral value of the curvature, is favorably 5 or less in the range from s/c=−0.1 to s/c=−0.2. This is because an extremely sharp shape of the leading edge is highly likely to cause a stall if the angle of attack of the airframe is changed.

Figure 12:
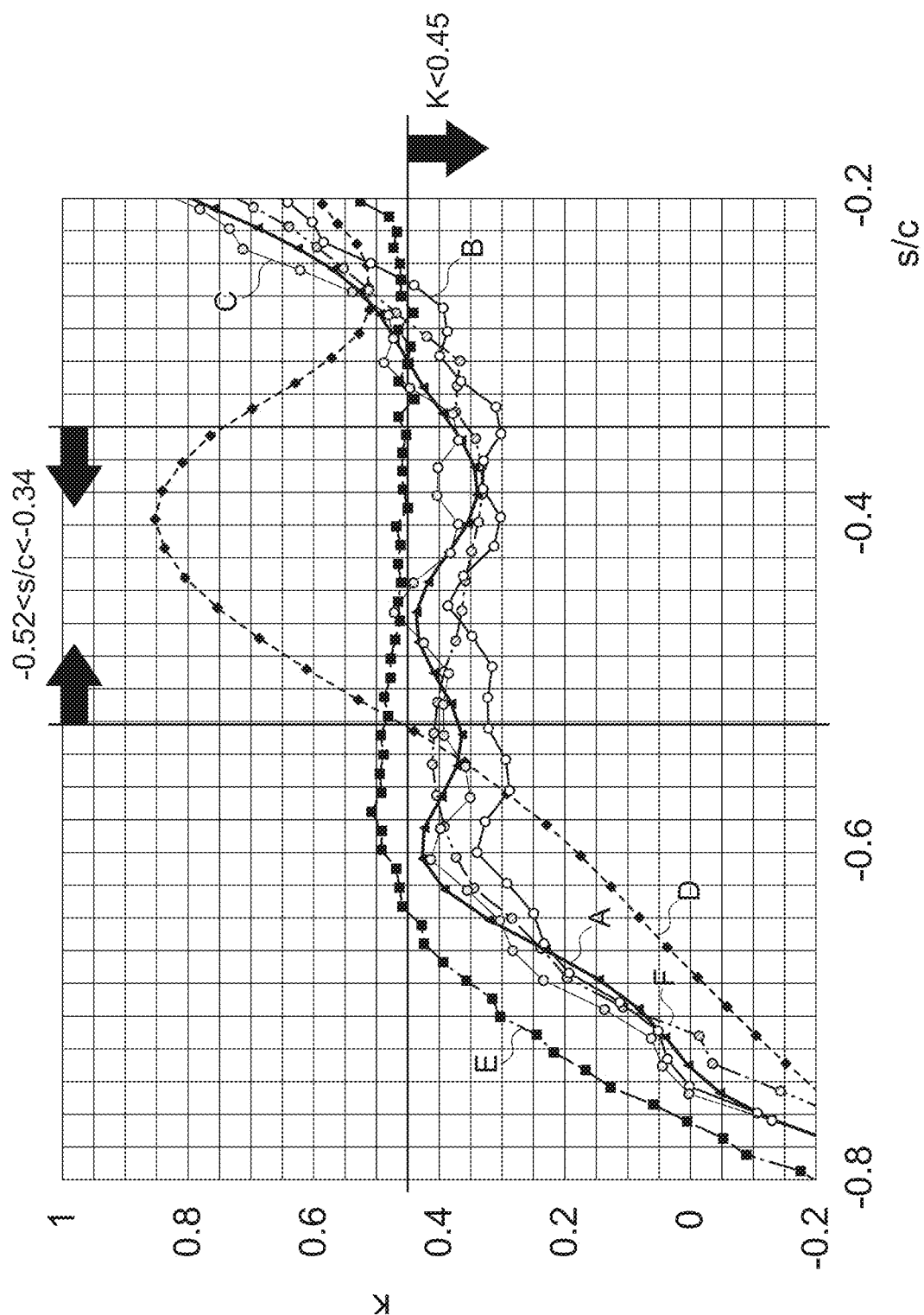
FIG. 12 is a graph (part 5) showing a relationship between s/c and κ of the airfoils according to one embodiment and the airfoils illustrated as reference examples.

FIG. 12 is a graph (part 5) showing a relationship between s/c and κ of the airfoils 11 according to this embodiment and the airfoils illustrated as reference examples.

The airfoils 11 according to this embodiment have a shape in which, as shown in FIG. 12, κ has a mean value of 0.45 or less in the range from s/c=−0.52 to s/c=−0.34 near the crest position 18 of the lower wing surface, and κ is 0.4 or less at s/c=−0.52.

Thus, the pressure lowered with the shape shown in FIG. 11 is kept low in that position (from s/c=−0.52 to s/c=−0.34), and thus the thrust further increases.

Note that κ favorably has a mean value of 0.2 or more in the range from s/c=−0.52 to s/c=−0.34. This is because a flat shape or a recessed shape with a negative curvature in this region is highly likely to cause the boundary layer separation and thus increase the pressure drag.

Figure 13:
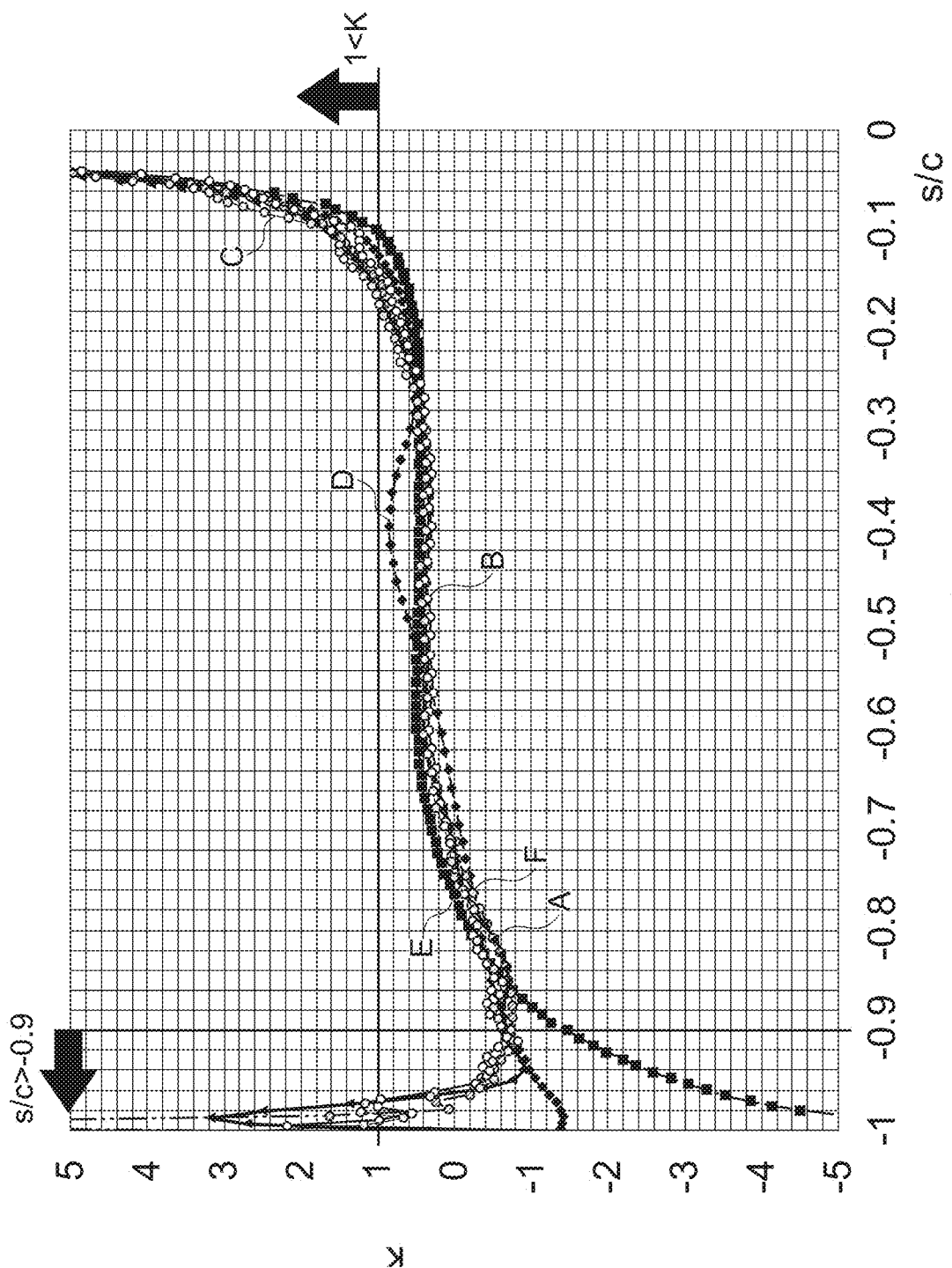
FIG. 13 is a graph (part 6) showing a relationship between s/c and κ of the airfoils according to one embodiment and the airfoils illustrated as reference examples.

FIG. 13 is a graph (part 6) showing a relationship between s/c and κ of the airfoils 11 according to this embodiment and the airfoils illustrated as reference examples.

The airfoils 11 according to this embodiment have a shape in which, as shown in FIG. 13, the distribution of κ monotonically increases to 1 or more in the range from s/c=−0.9 or less to the position of the trailing edge 13.

Thus, the pressure rises, and the drag decreases.

Figure 14:
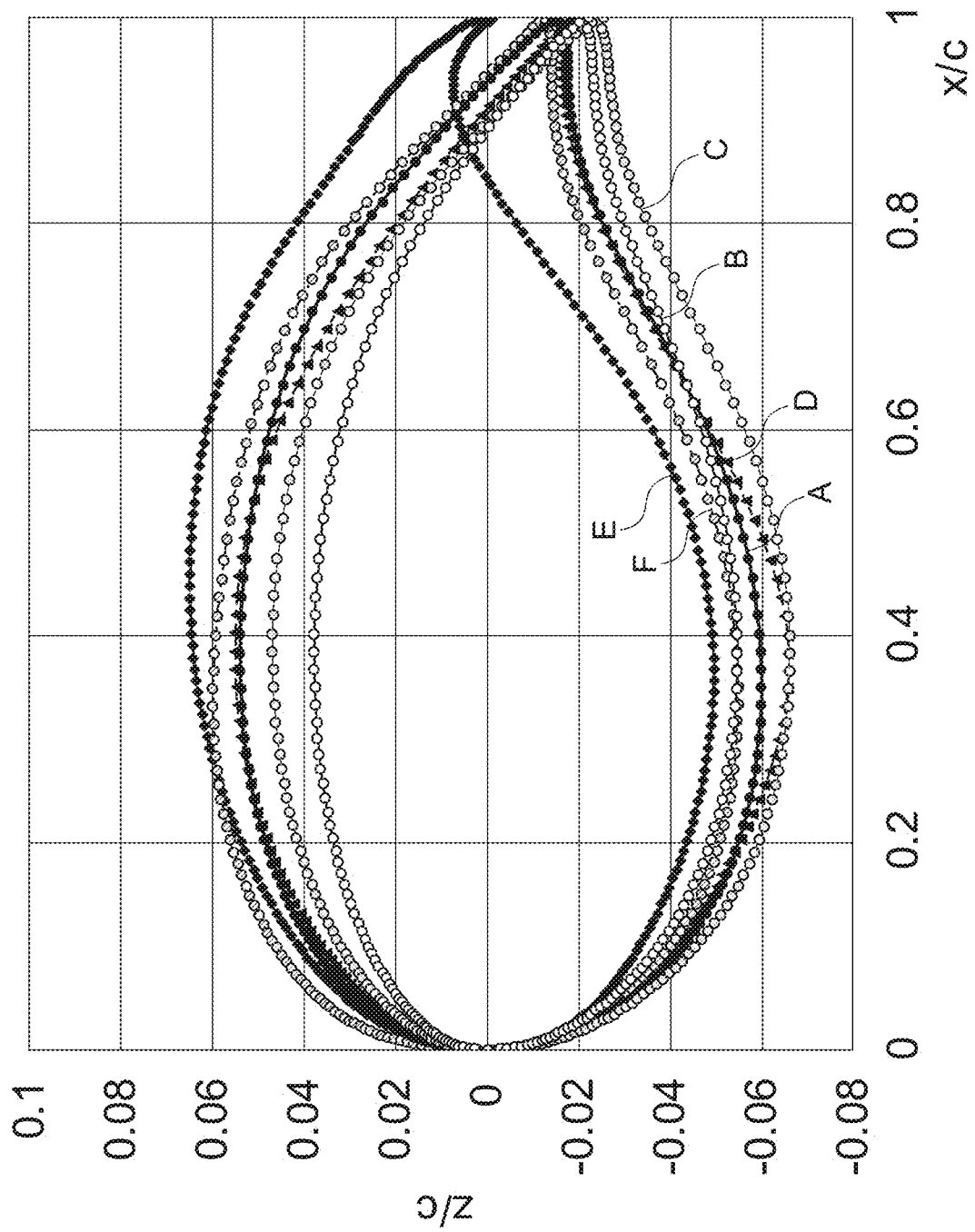
FIG. 14 is a graph showing dimensionless airfoils 11 according to one embodiment and dimensionless airfoils illustrated as reference examples.
Figure 15:
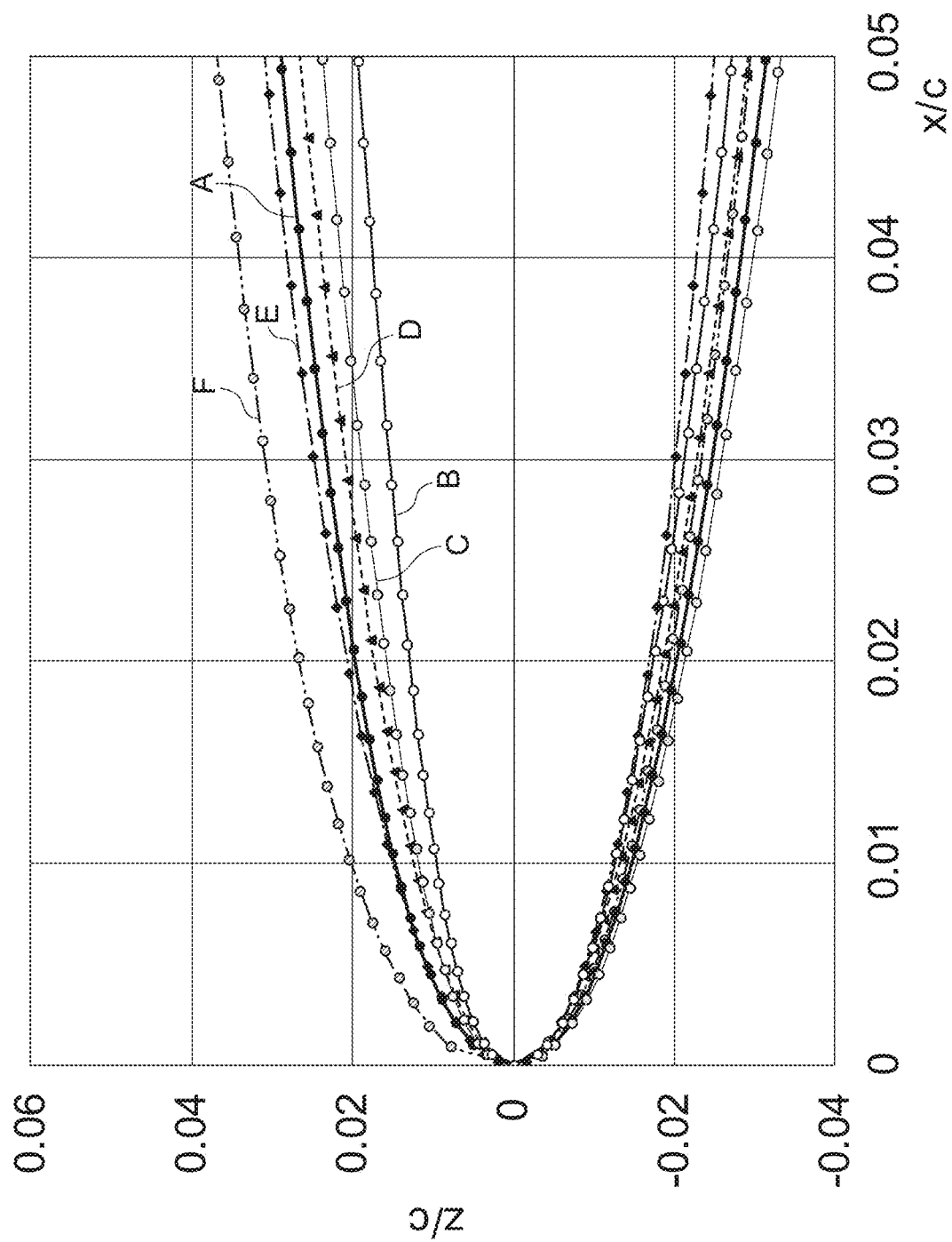
FIG. 15 is a graph showing the vicinity of the leading edge of the FIG. 14 in an enlarged manner.

FIG. 14 is a graph showing the dimensionless airfoils 11 of this embodiment and dimensionless airfoils used as reference examples. FIG. 15 is a graph showing the vicinity of the leading edge of the FIG. 14 in an enlarged manner.

The airfoils 11 according to the embodiment described above can reduce the pressure drag of a transonic wing having the airfoil 11 by approximately 10% of the whole aerodynamic drag of the transonic aircraft. This corresponds to approximately ten times the friction drag reduced by achieving a natural laminar flow.

Figure 16A:
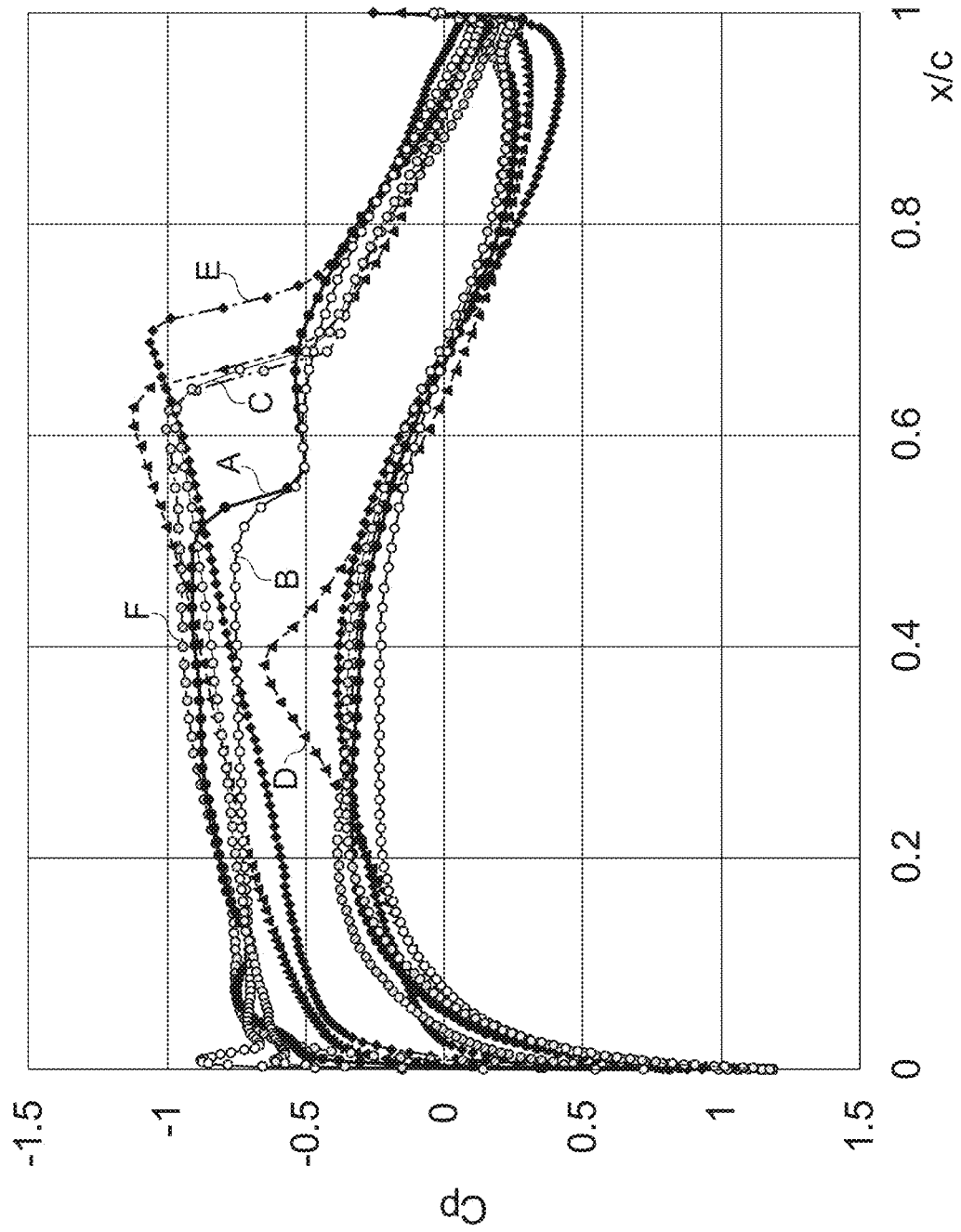
FIG. 16A is a graph showing a relationship between Cp and x/c of the airfoils 11 according to one embodiment.
Figure 16B:
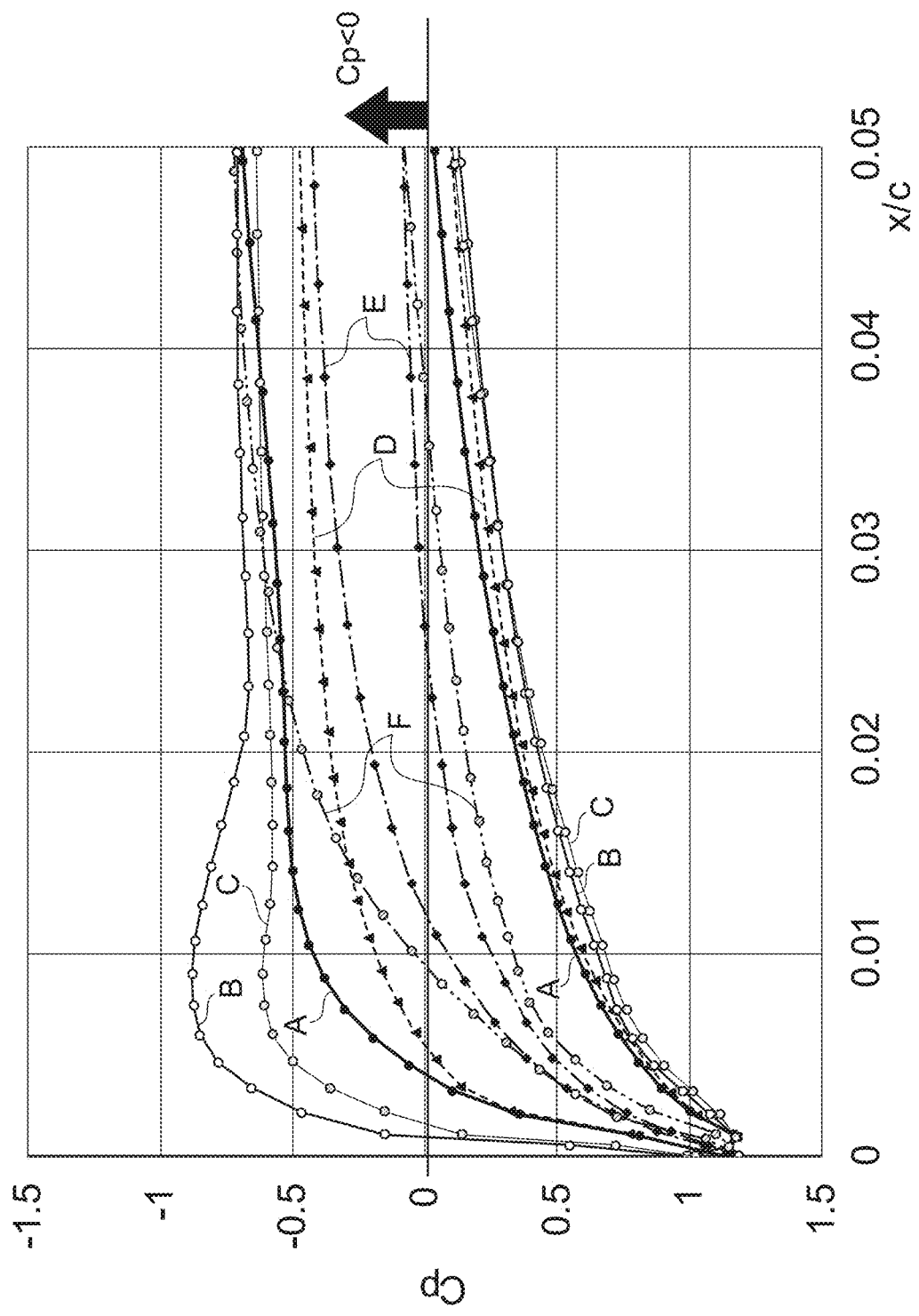
FIG. 16B is a graph showing the vicinity of the leading edge of FIG. 16A in an enlarged manner.
Figure 17:
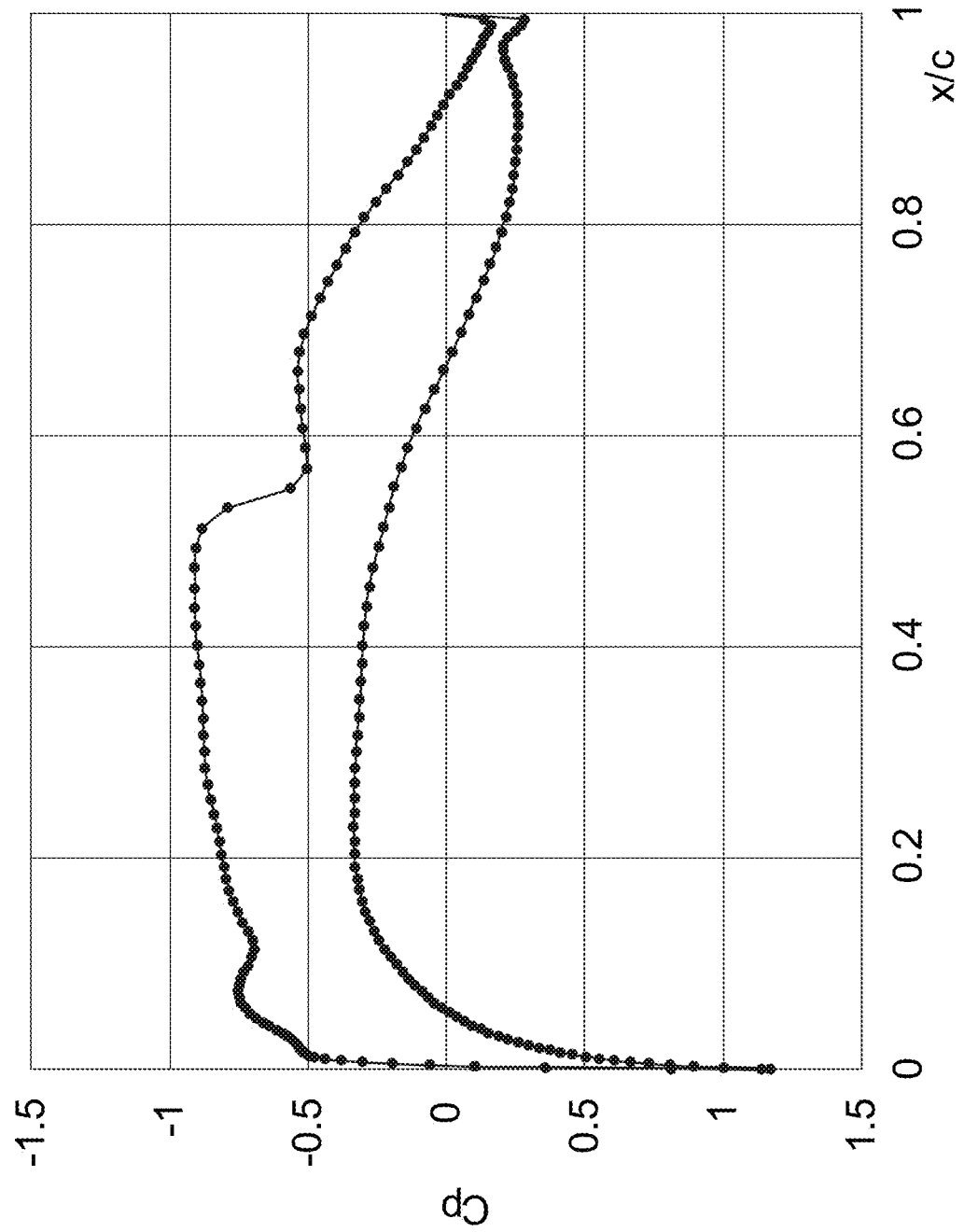
FIG. 17 is a graph showing a relationship between x/c and Cp of the airfoil in the first mode according to one embodiment.
Figure 18:
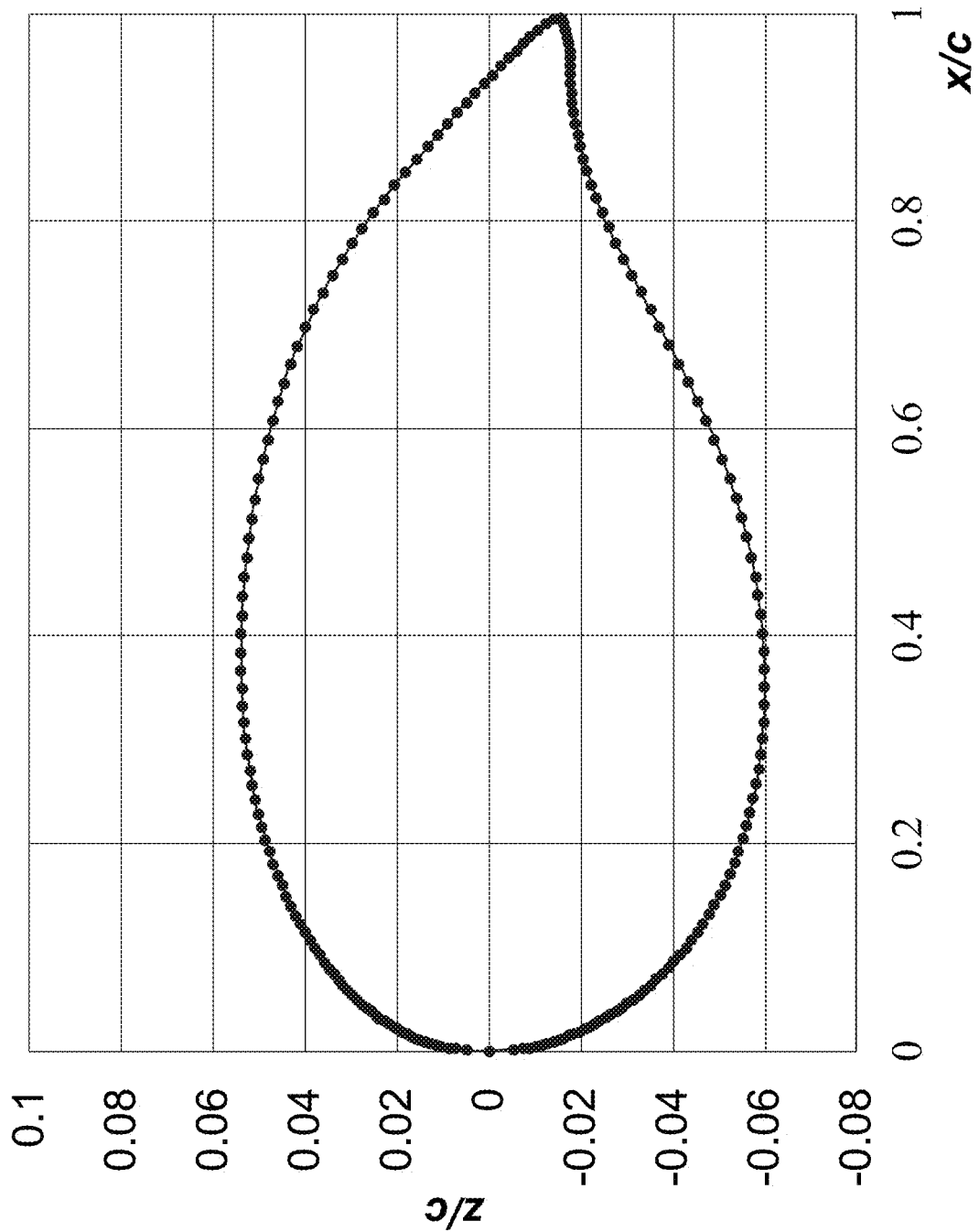
FIG. 18 is a graph showing a relationship between x/c and z/c of the airfoil in the first mode according to one embodiment.
Figure 19:
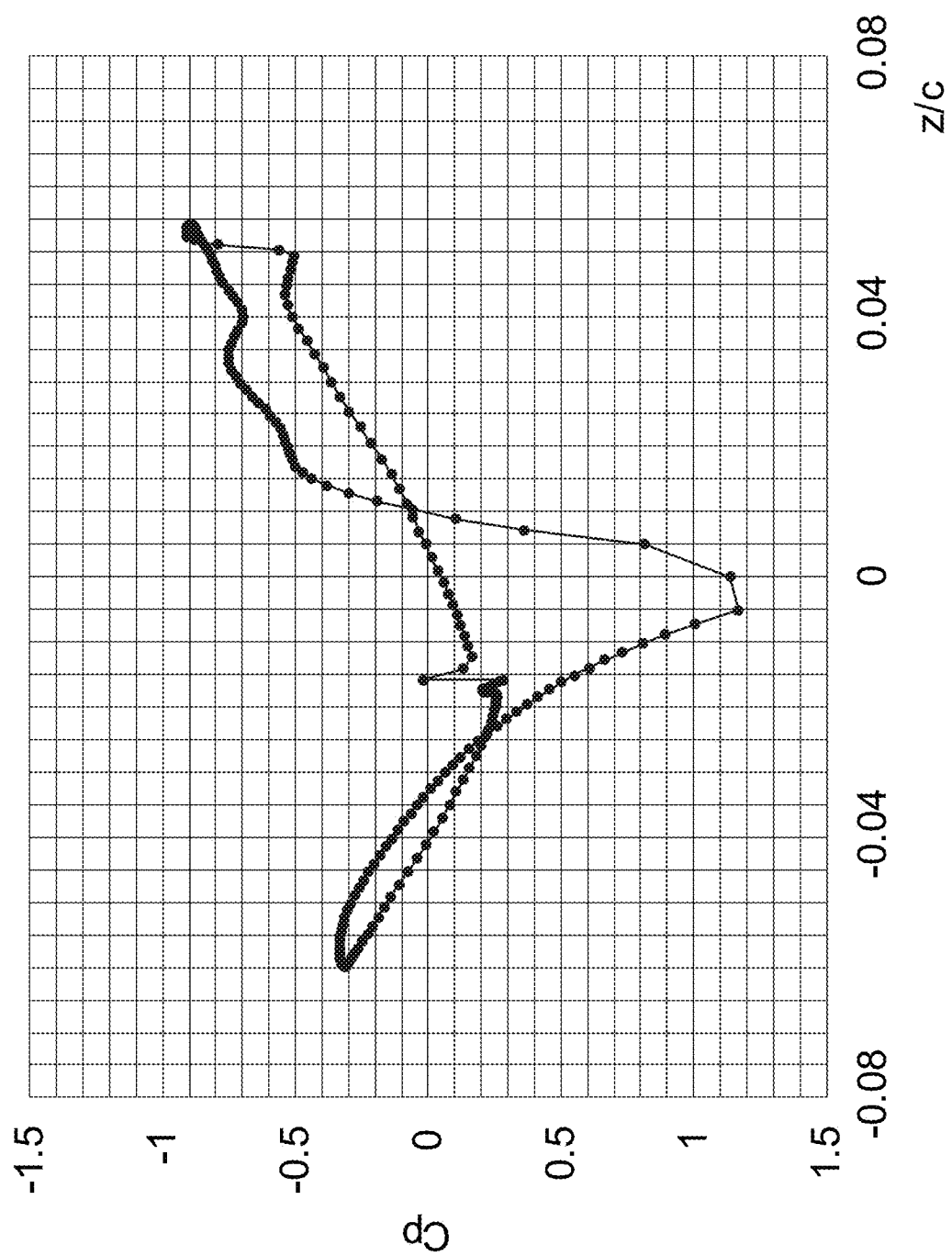
FIG. 19 is a graph showing a relationship between z/c and Cp of the airfoil in the first mode according to one embodiment.
Figure 20:
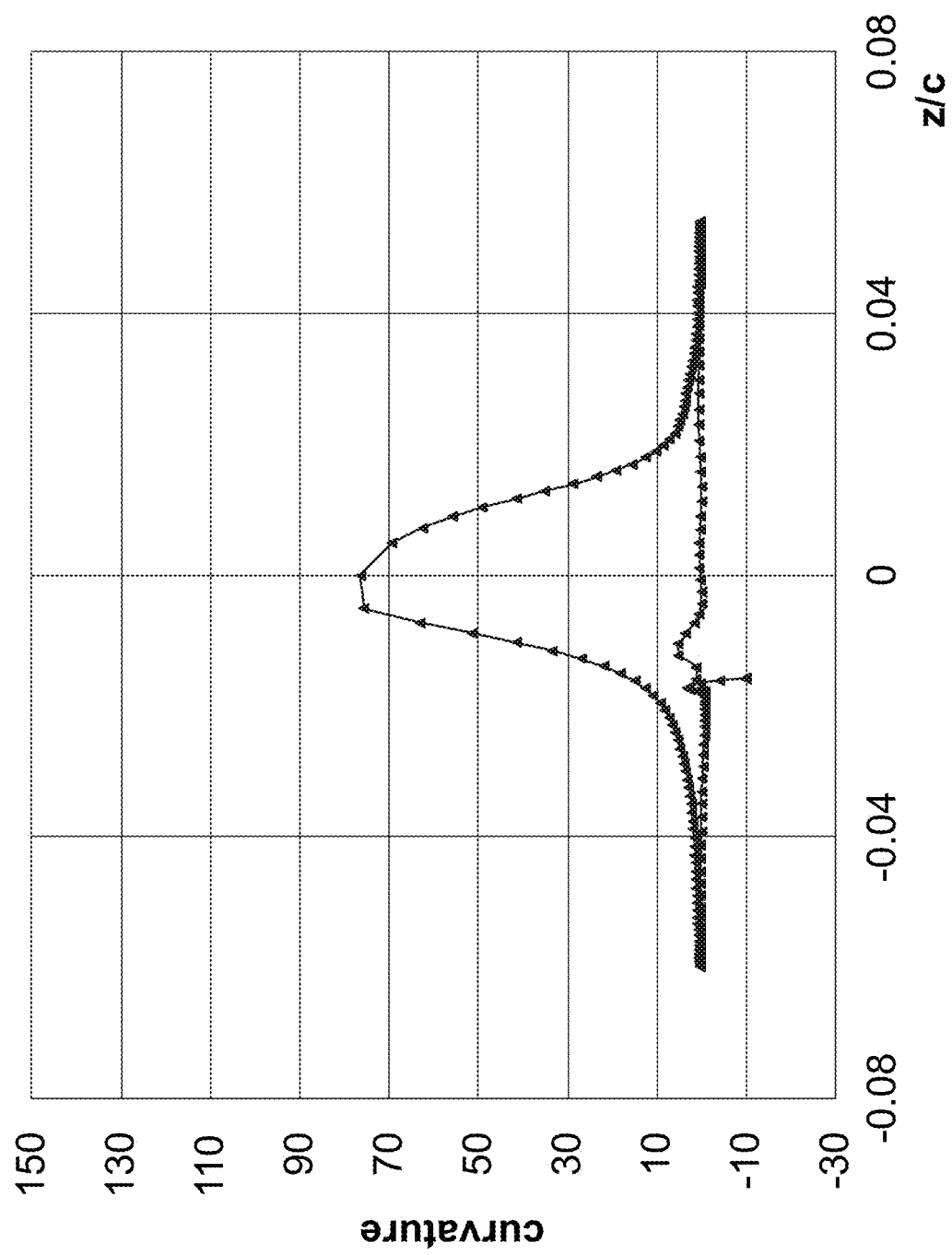
FIG. 20 is a graph showing a relationship between z/c and κ of the airfoil in the first mode according to one embodiment.
Figure 21:
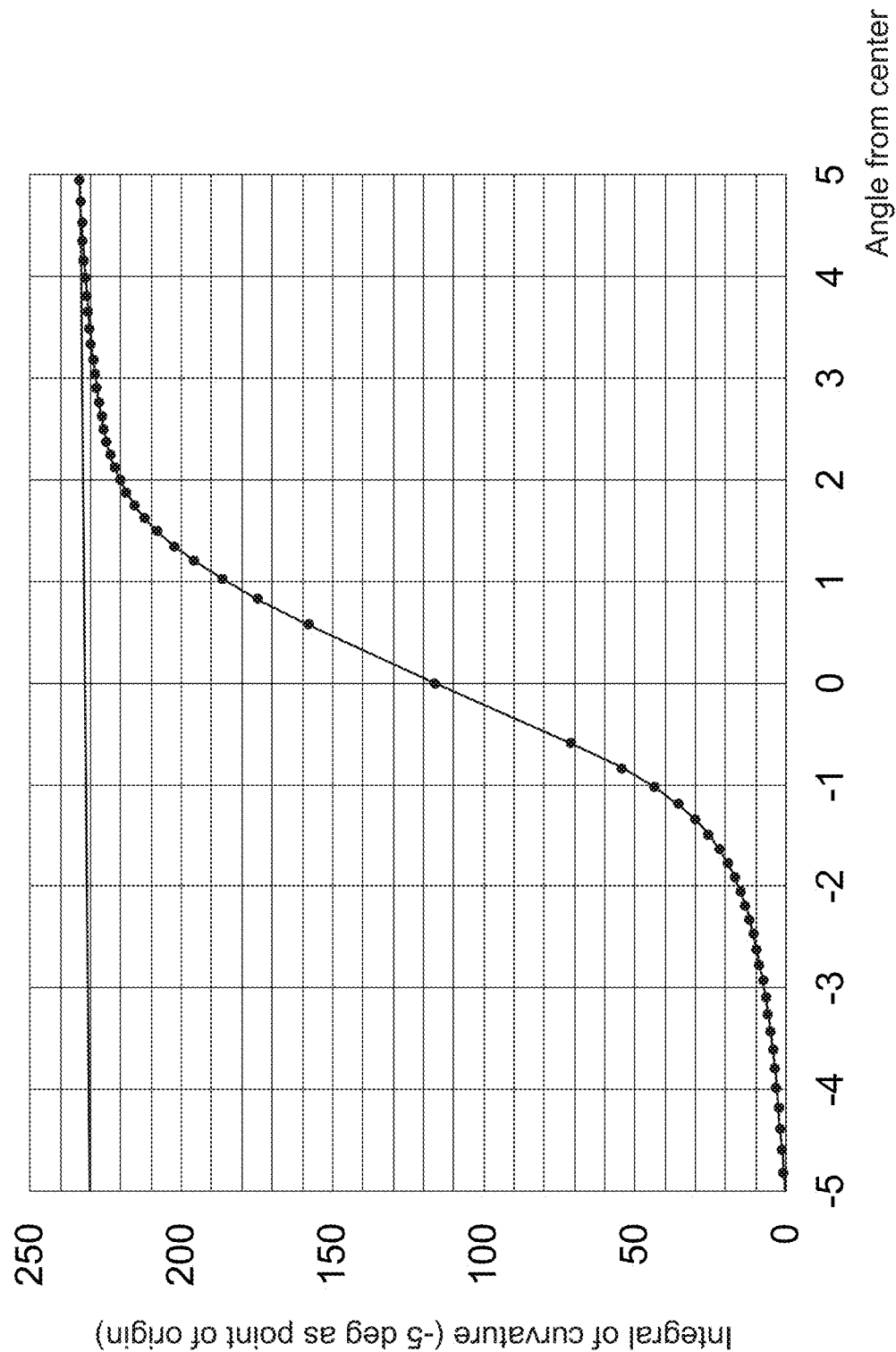
FIG. 21 is a graph showing a relationship between an angle from the center θ and $K_θ$ of the airfoil in the first mode according to one embodiment.
Figure 22:
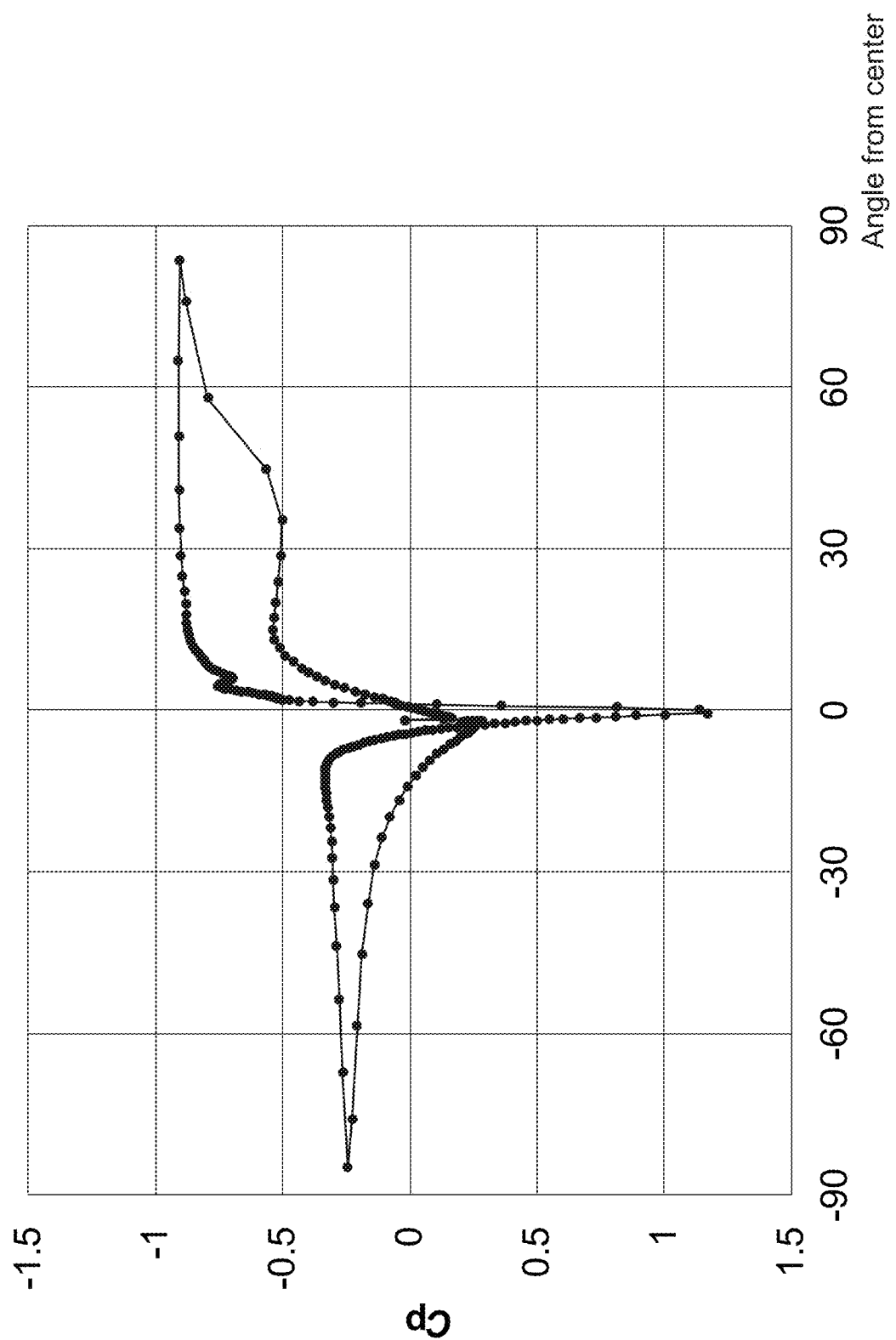
FIG. 22 is a graph showing a relationship between the angle from the center θ and Cp of the airfoil in the first mode according to one embodiment.
Figure 23:
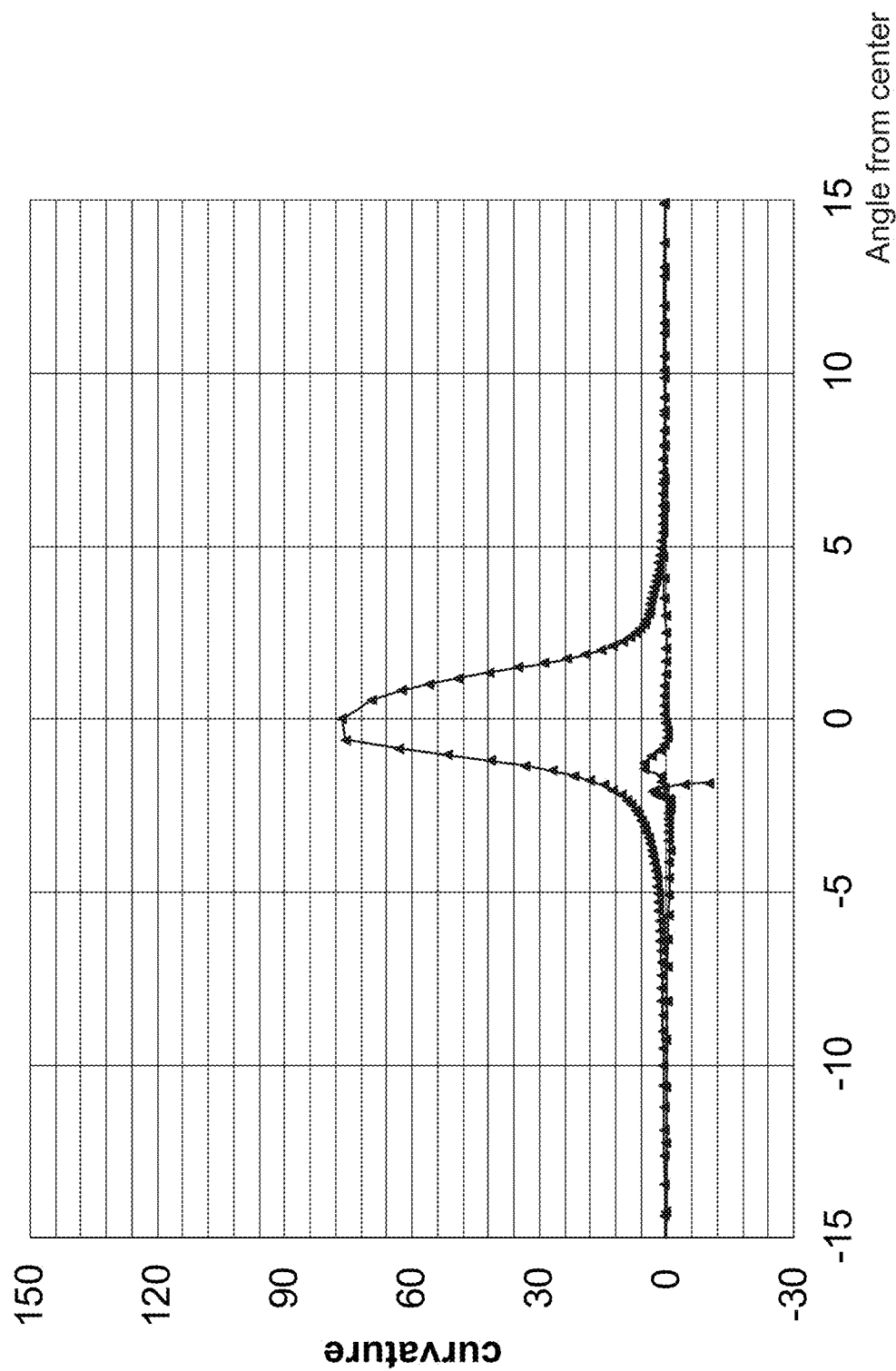
FIG. 23 is a graph showing a relationship between the angle from the center θ and κ of the airfoil in the first mode according to one embodiment.
Figure 24:
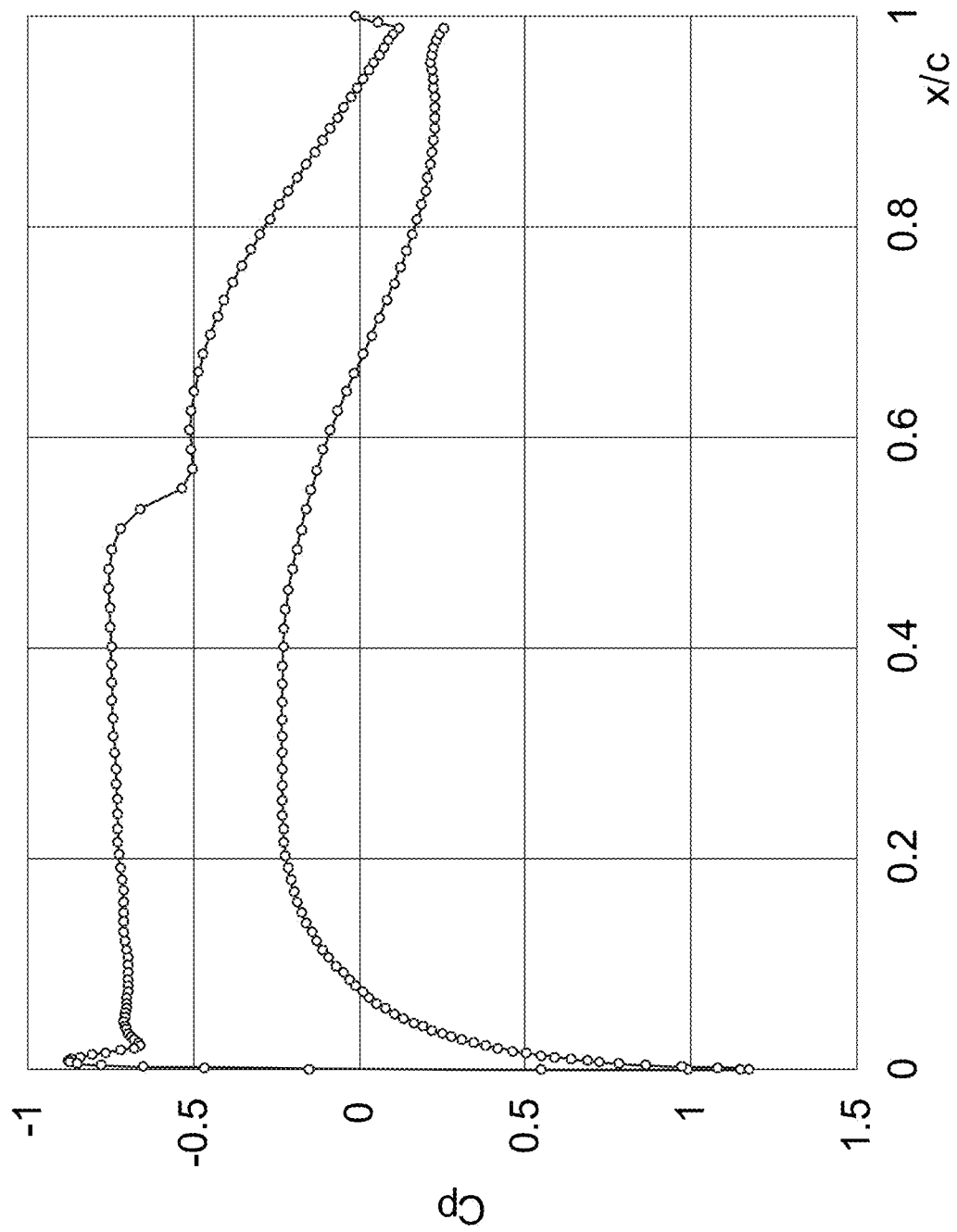
FIG. 24 is a graph showing a relationship between x/c and Cp of an airfoil in a second mode according to one embodiment.
Figure 25:
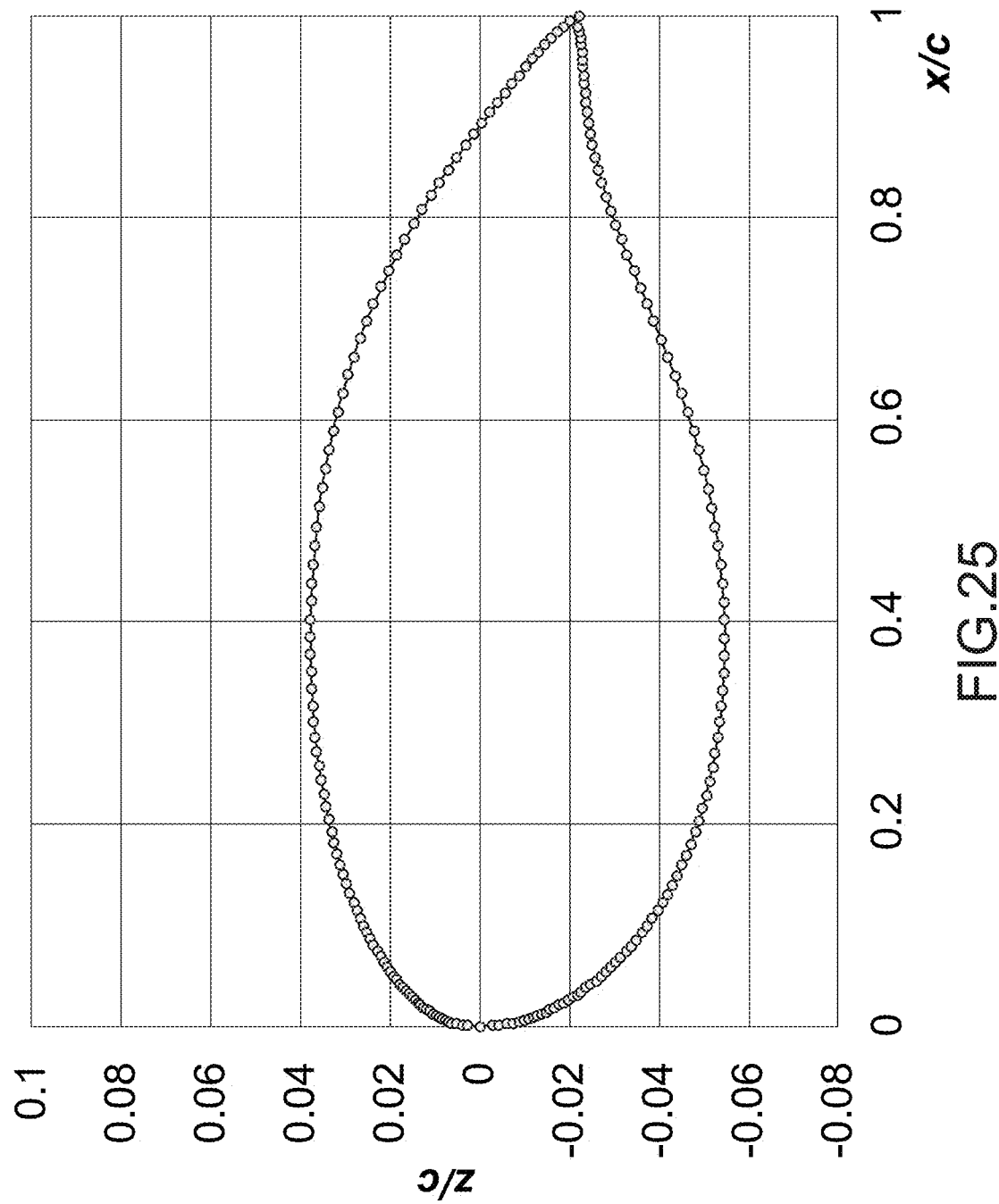
FIG. 25 is a graph showing a relationship between x/c and z/c of the airfoil in the second mode according to one embodiment.
Figure 26:
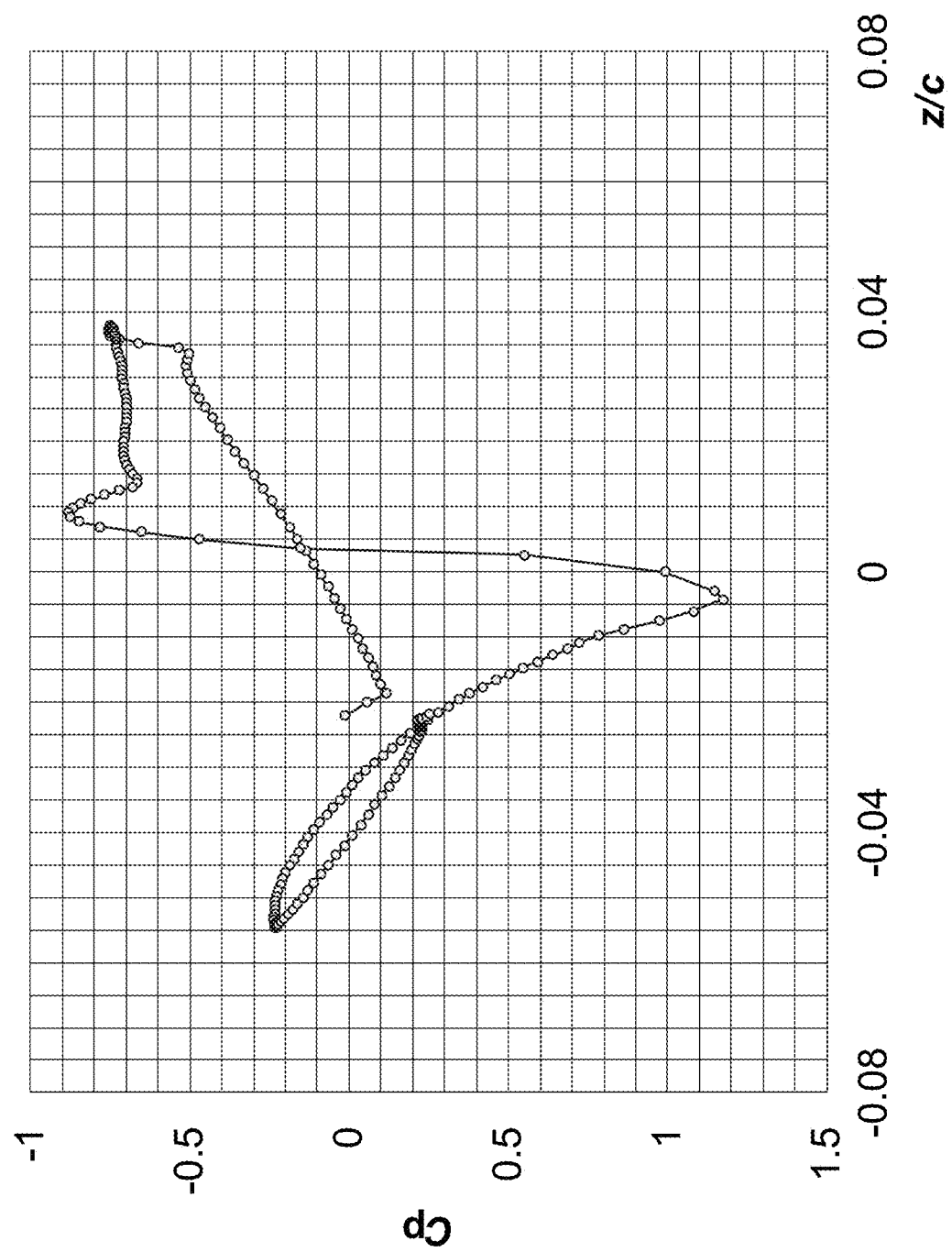
FIG. 26 is a graph showing a relationship between z/c and Cp of the airfoil in the second mode according to one embodiment.
Figure 27:
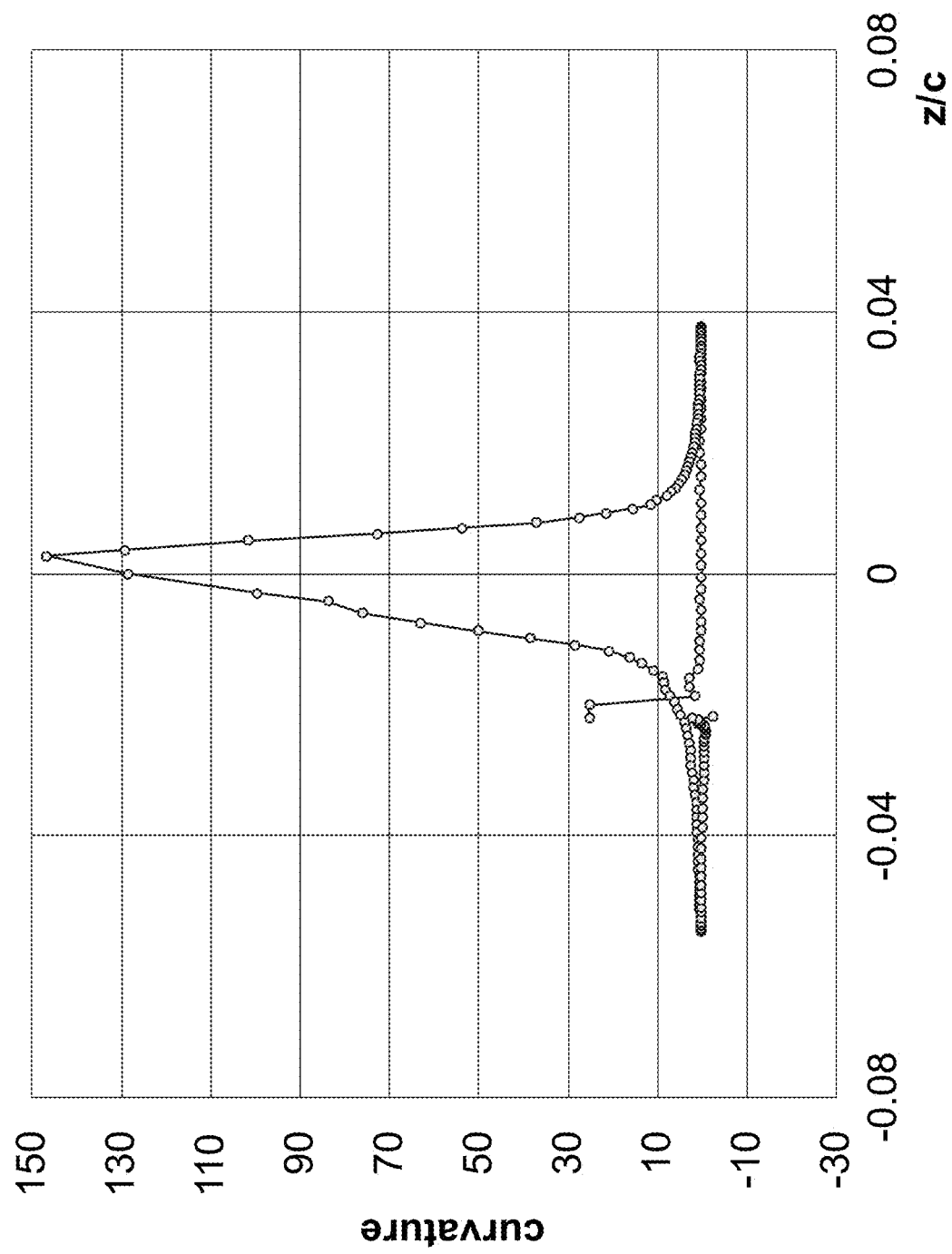
FIG. 27 is a graph showing a relationship between z/c and κ of the airfoil in the second mode according to one embodiment.
Figure 28:
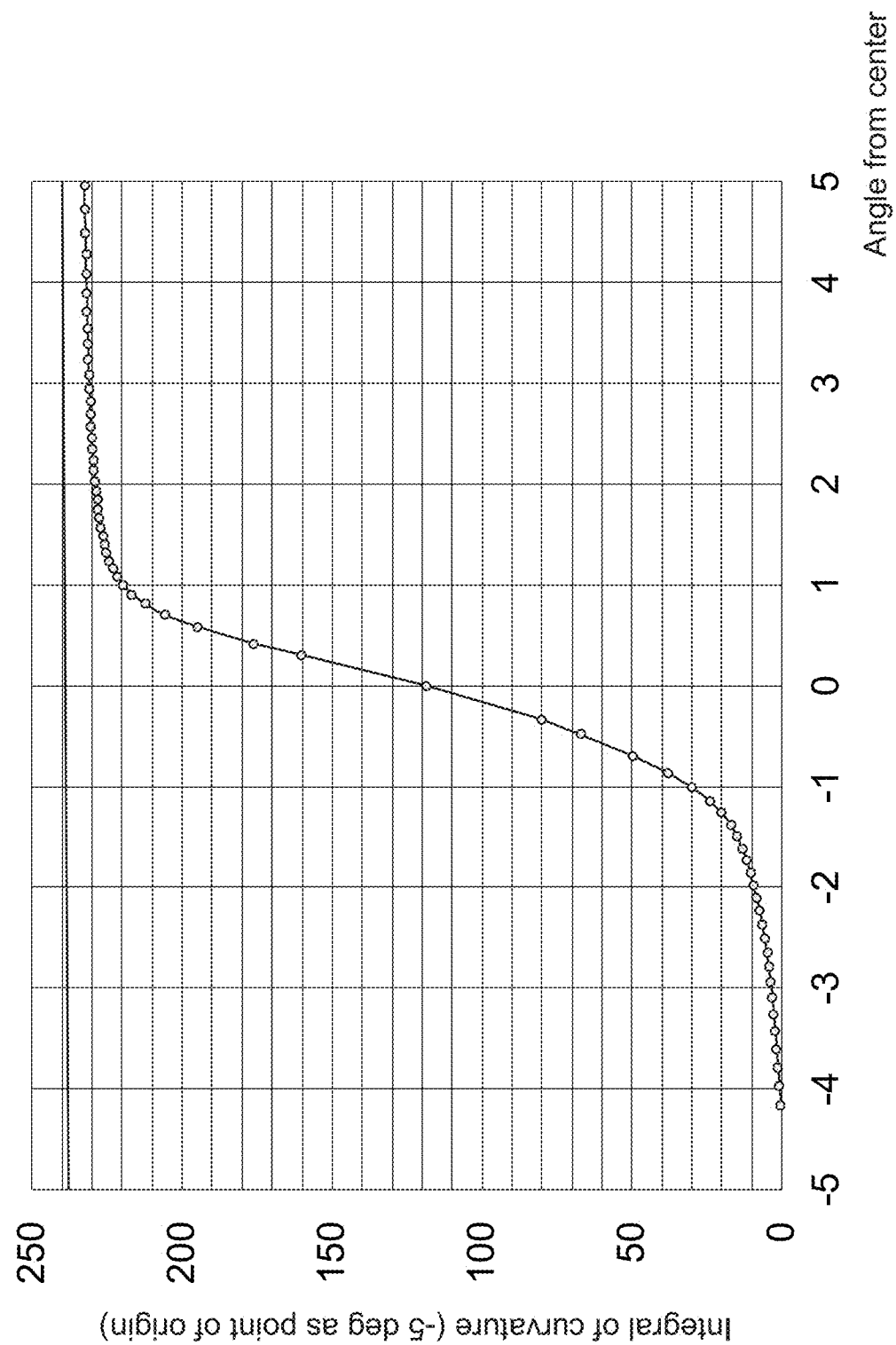
FIG. 28 is a graph showing a relationship between an angle from the center θ and $K_θ$ of the airfoil in the second mode according to one embodiment.
Figure 29:
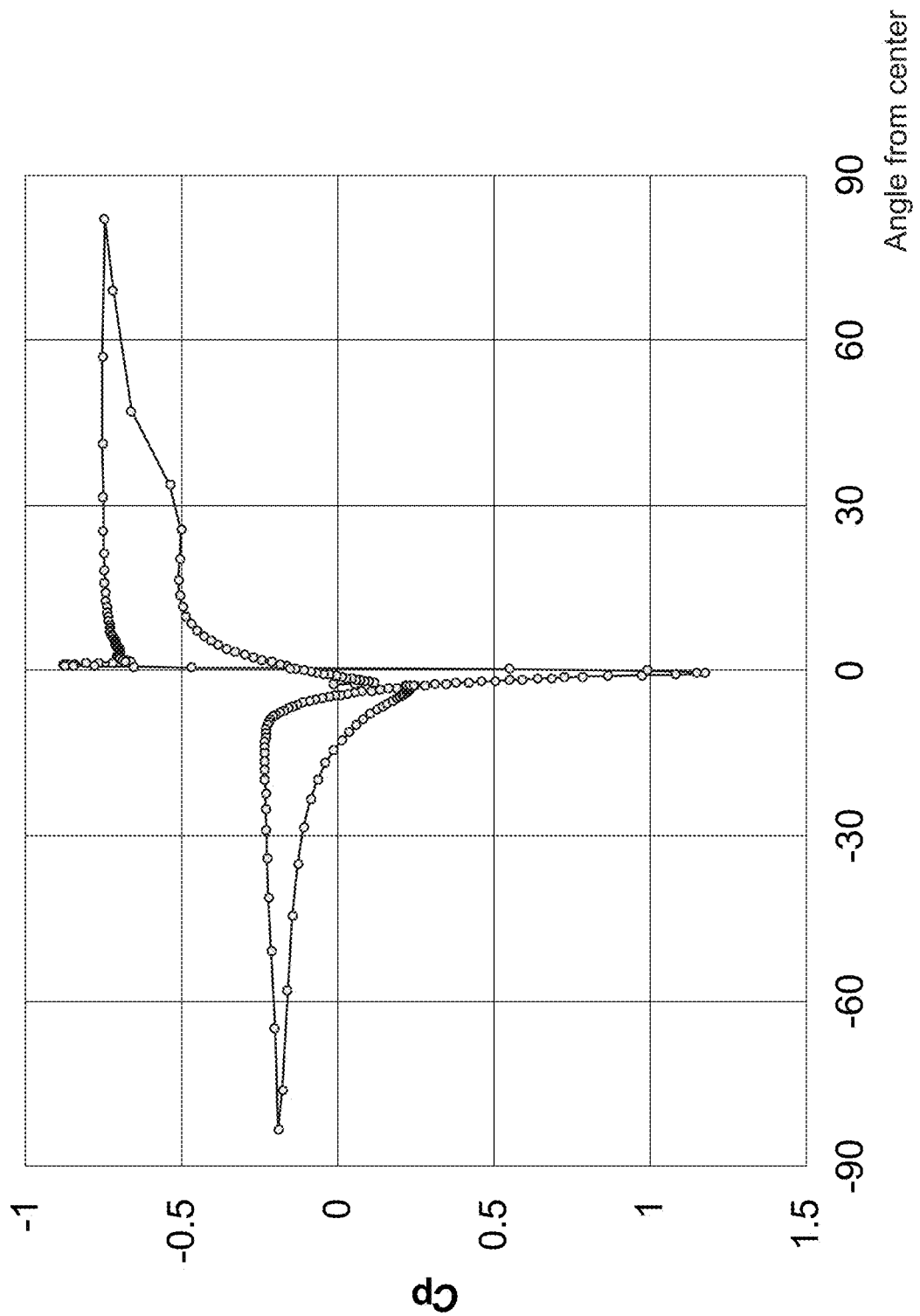
FIG. 29 is a graph showing a relationship between the angle from the center θ and Cp of the airfoil in the second mode according to one embodiment.
Figure 30:
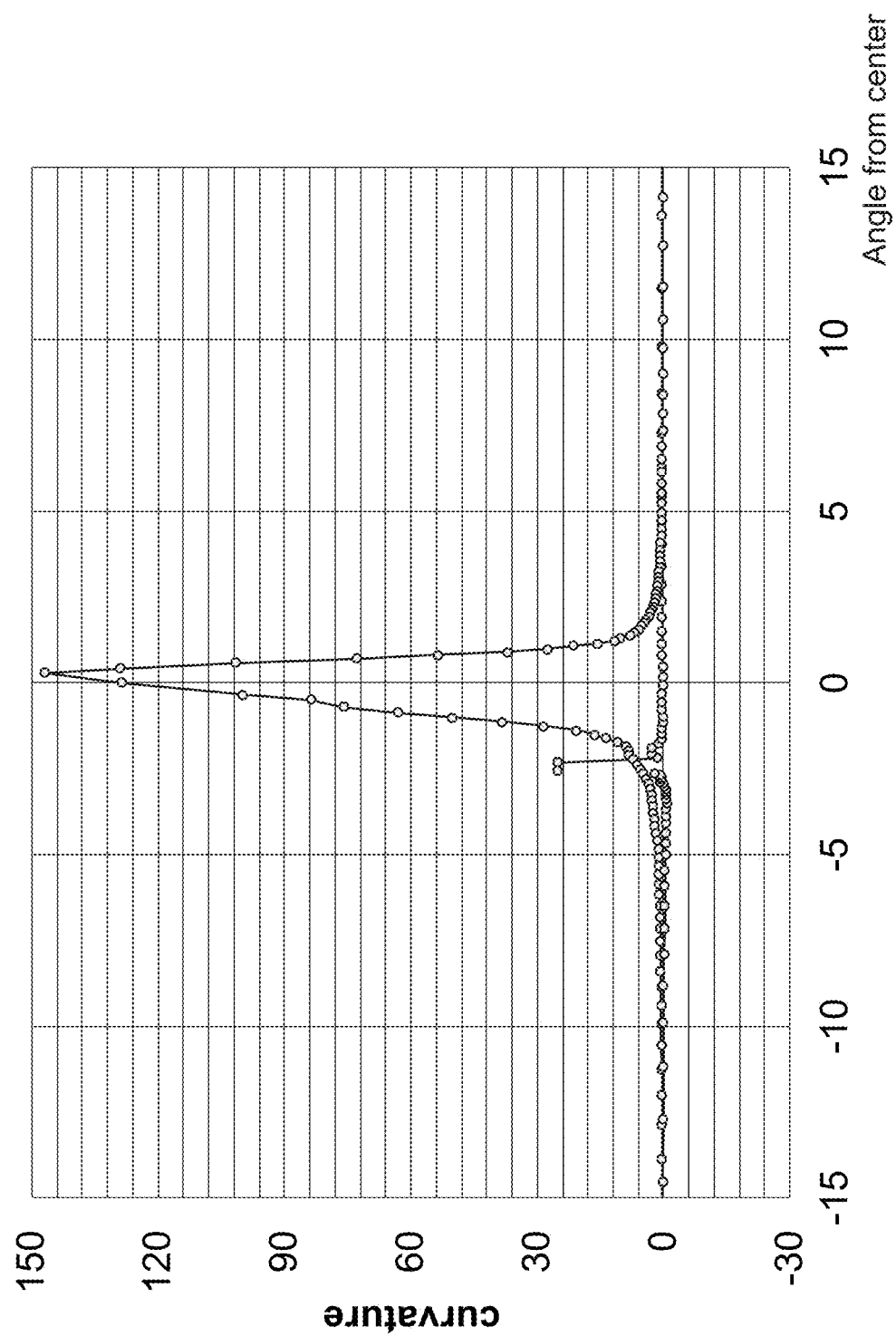
FIG. 30 is a graph showing a relationship between the angle from the center θ and κ of the airfoil in the second mode according to one embodiment.
Figure 31:
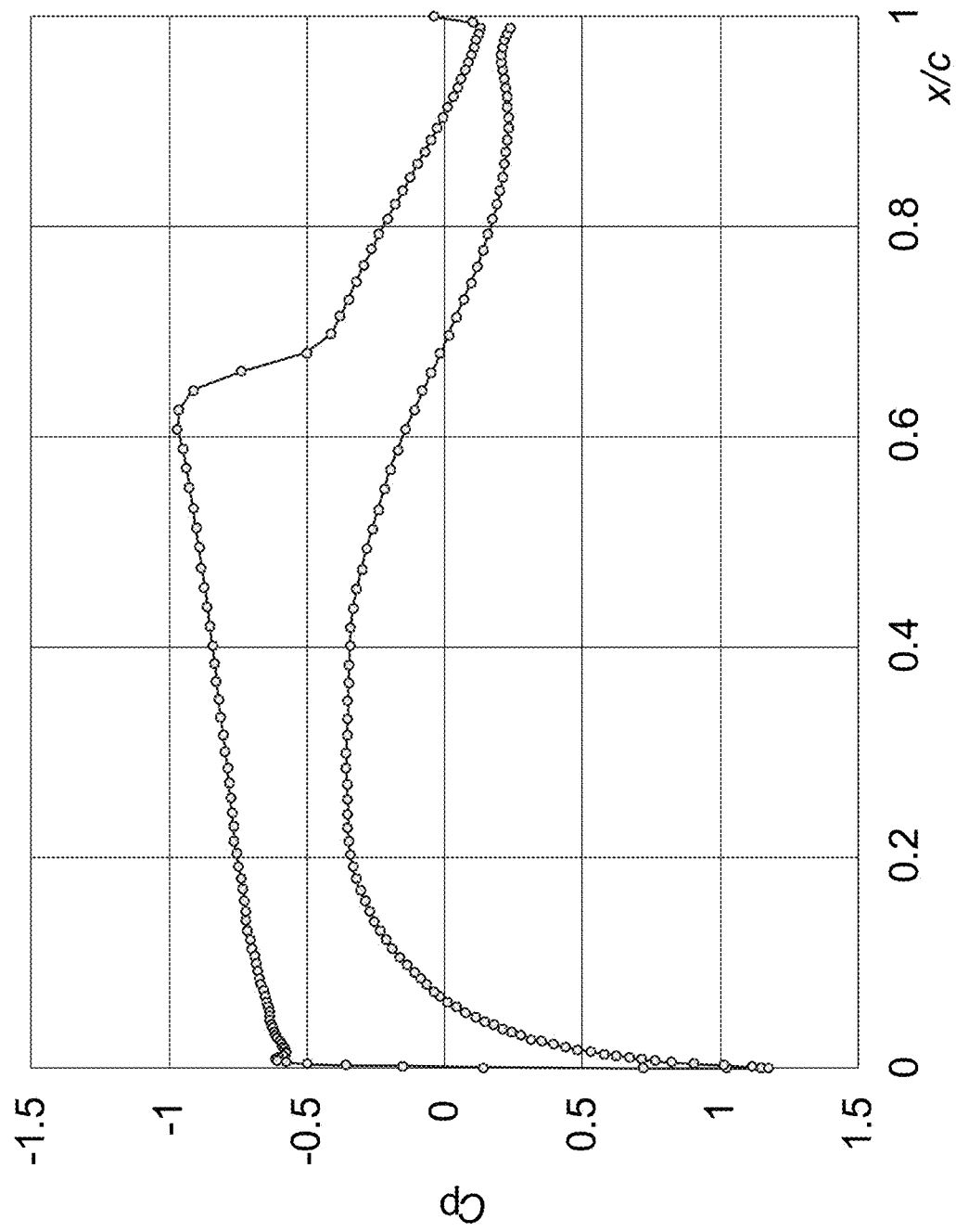
FIG. 31 is a graph showing a relationship between x/c and Cp of an airfoil in a third mode according to one embodiment.
Figure 32:
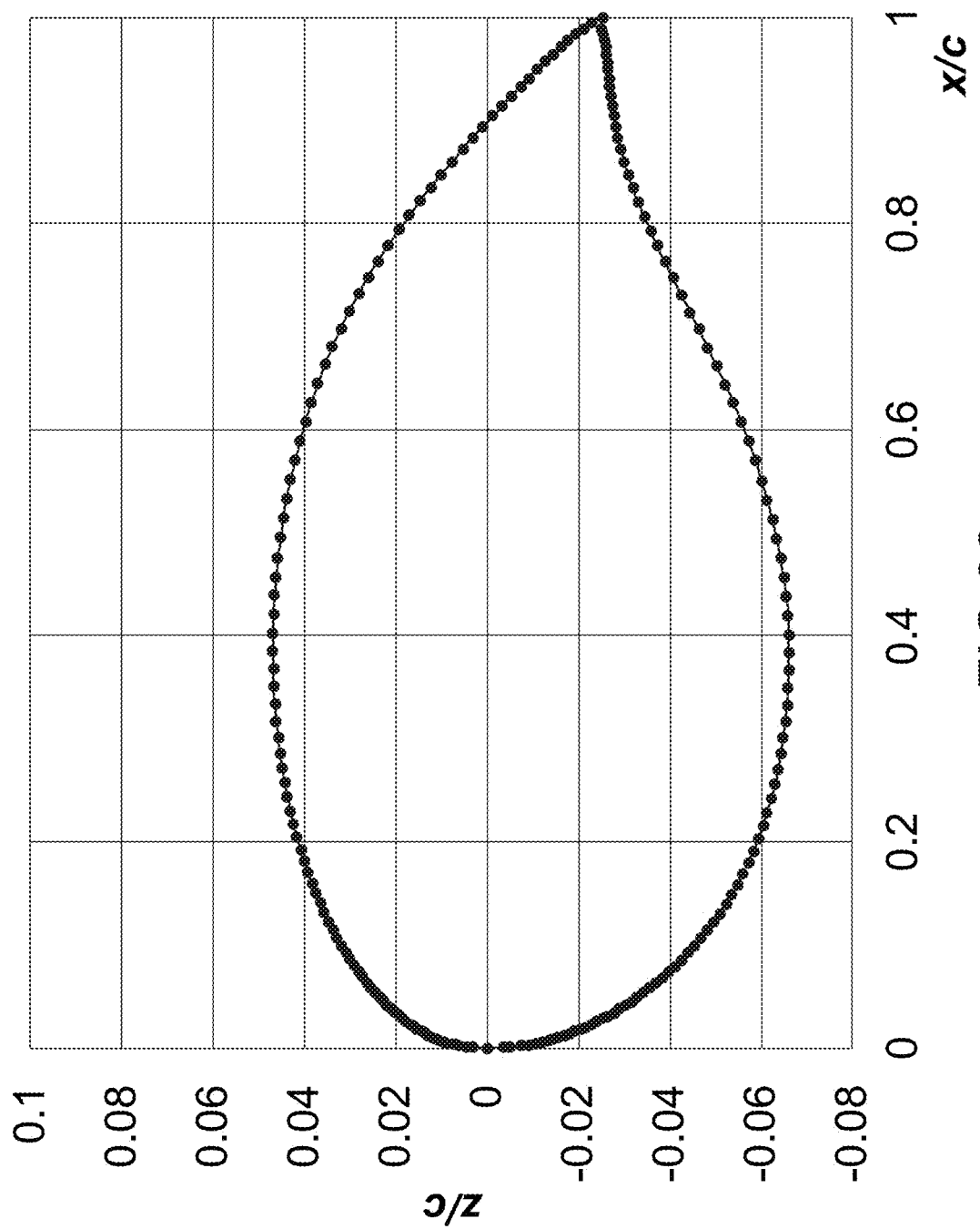
FIG. 32 is a graph showing a relationship between x/c and z/c of the airfoil in the third mode according to one embodiment.
Figure 33:
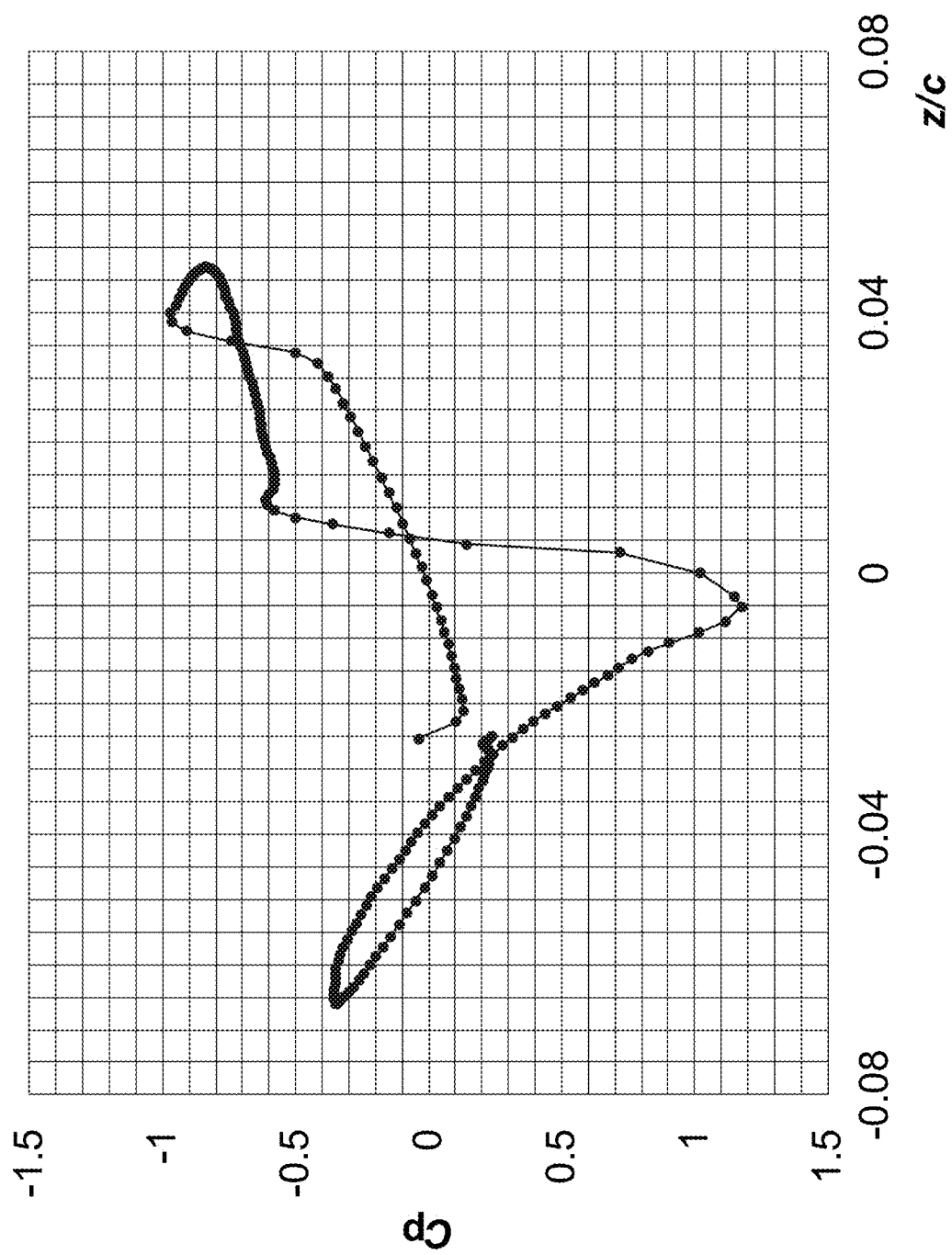
FIG. 33 is a graph showing a relationship between z/c and Cp of the airfoil in the third mode according to one embodiment.
Figure 34:
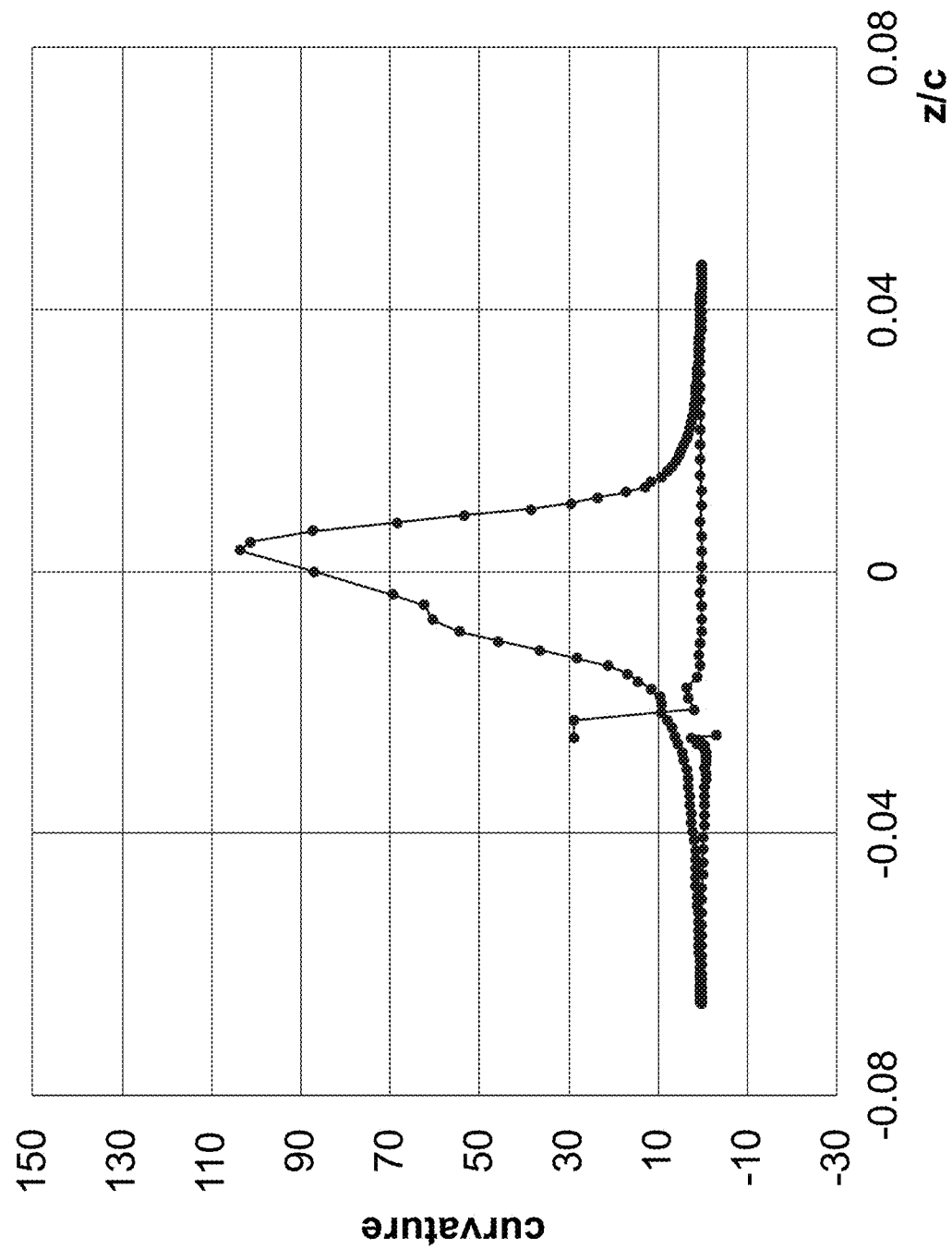
FIG. 34 is a graph showing a relationship between z/c and κ of the airfoil in the third mode according to one embodiment.
Figure 35:
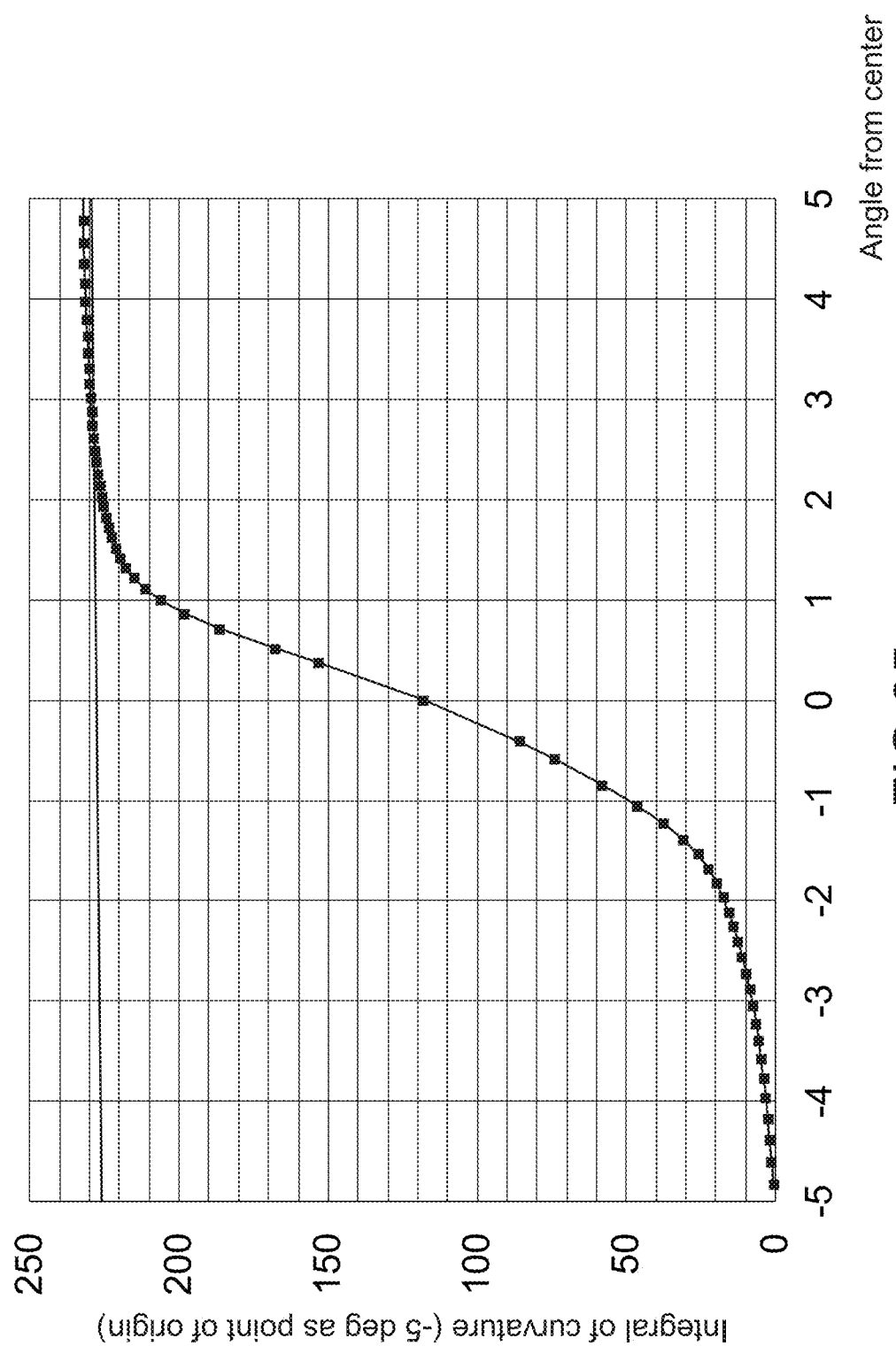
FIG. 35 is a graph showing a relationship between an angle from the center θ and $K_θ$ of the airfoil in the third mode according to one embodiment.
Figure 36:
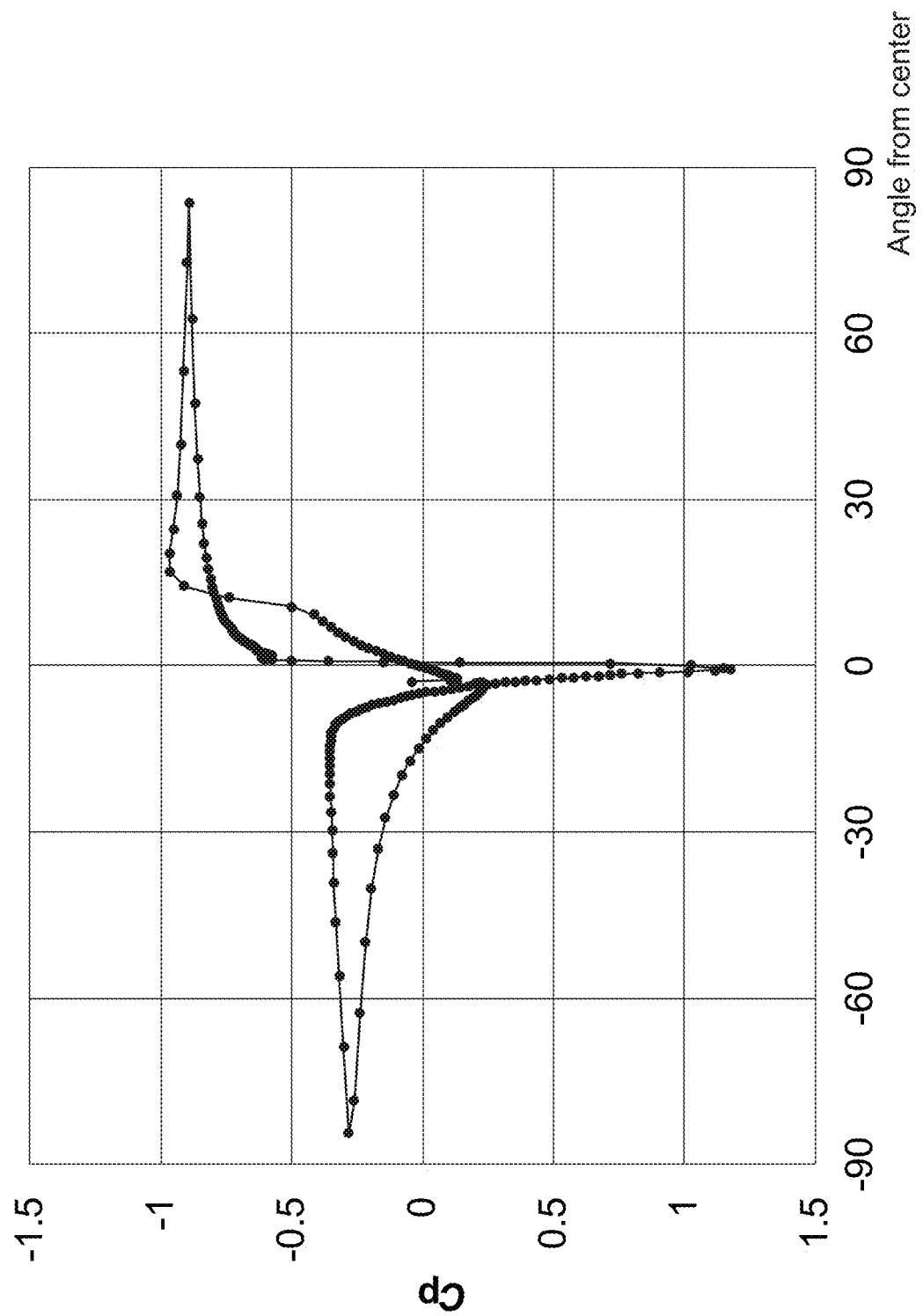
FIG. 36 is a graph showing a relationship between the angle from the center θ and Cp of the airfoil in the third mode according to one embodiment.
Figure 37:
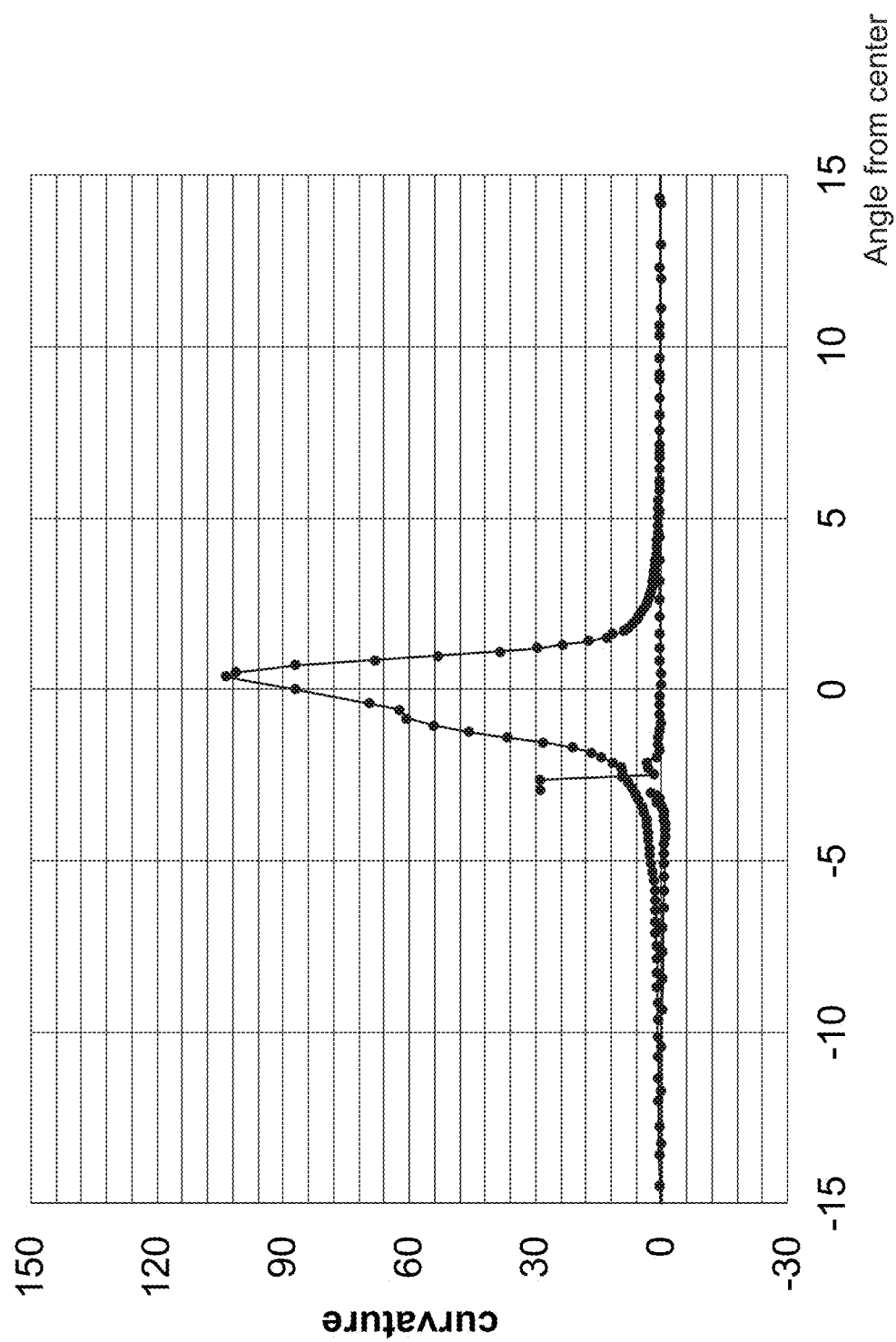
FIG. 37 is a graph showing a relationship between the angle from the center θ and κ of the airfoil in the third mode according to one embodiment.
Figure 38:
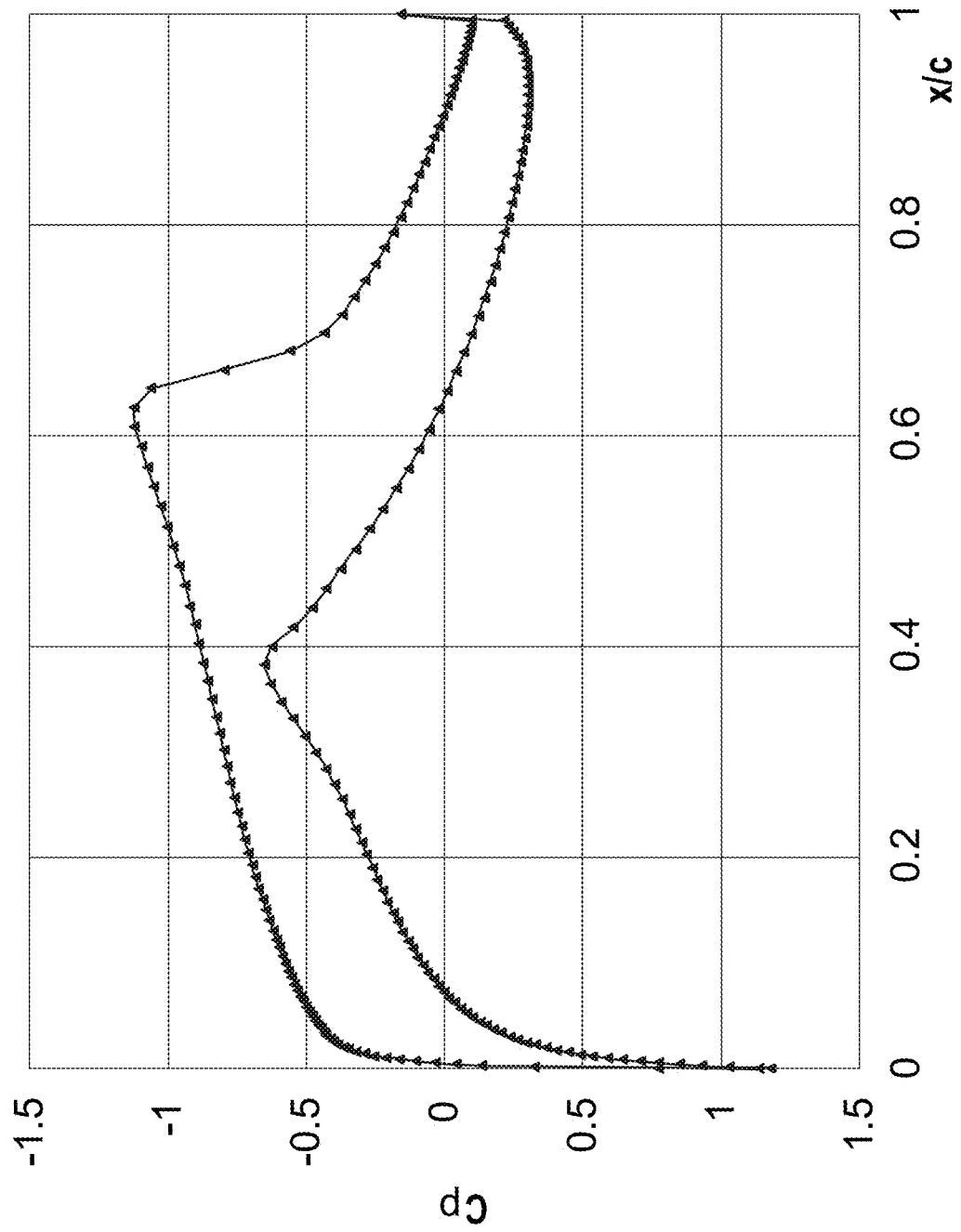
FIG. 38 is a graph showing a relationship between x/c and Cp of an RAE 2822 airfoil.
Figure 39:
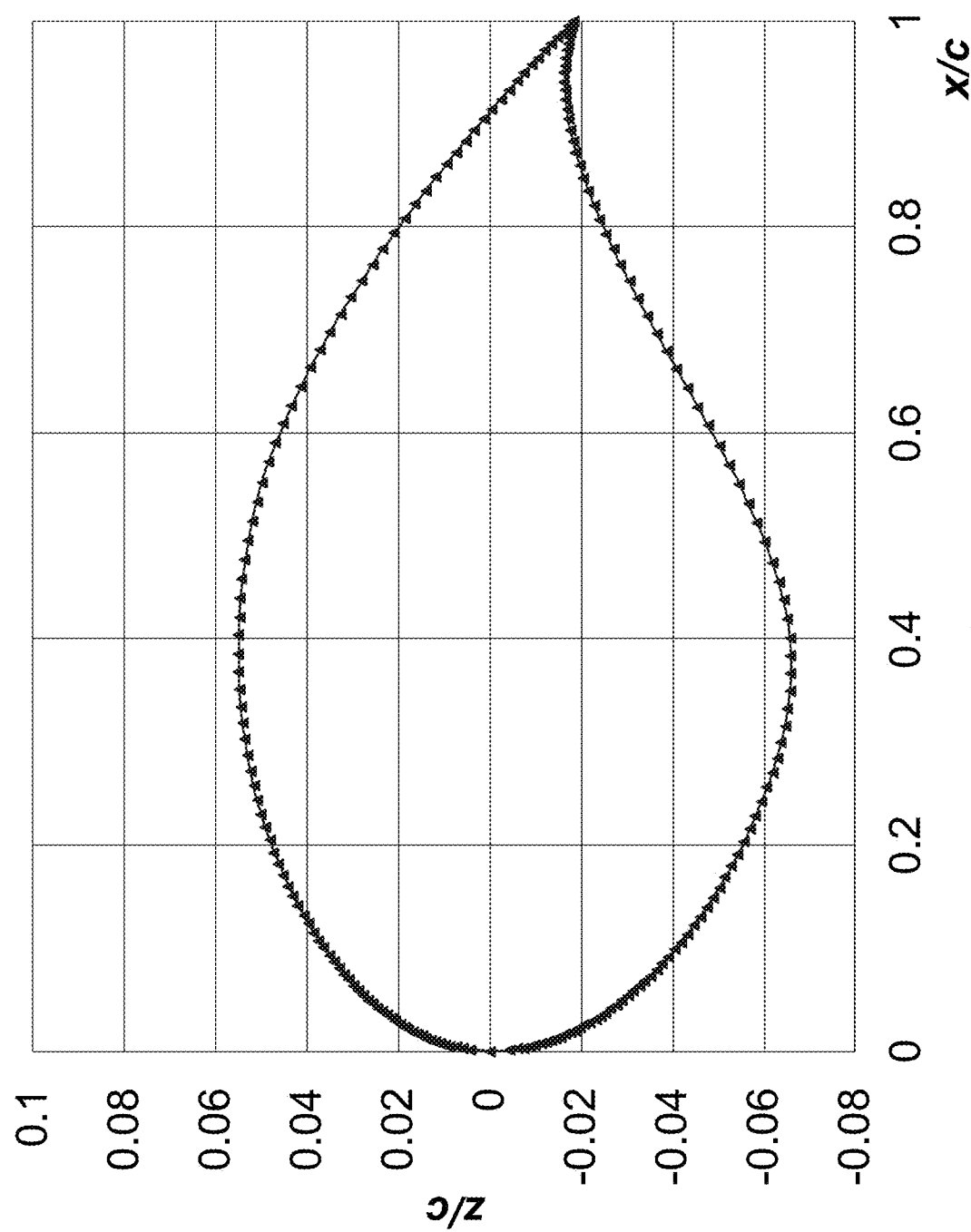
FIG. 39 is a graph showing a relationship between x/c and z/c of the RAE 2822 airfoil.
Figure 40:
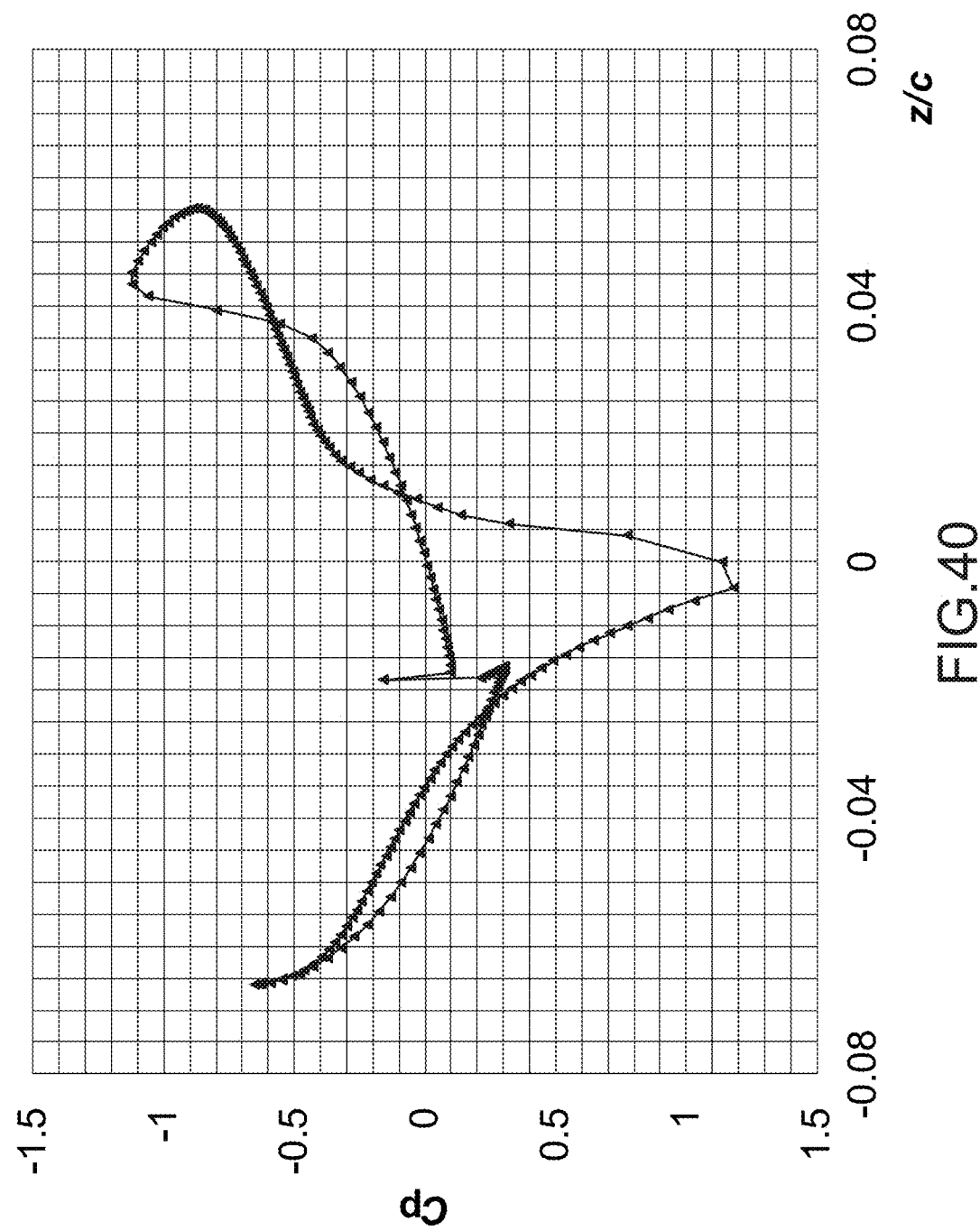
FIG. 40 is a graph showing a relationship between z/c and Cp of the RAE 2822 airfoil.
Figure 41:
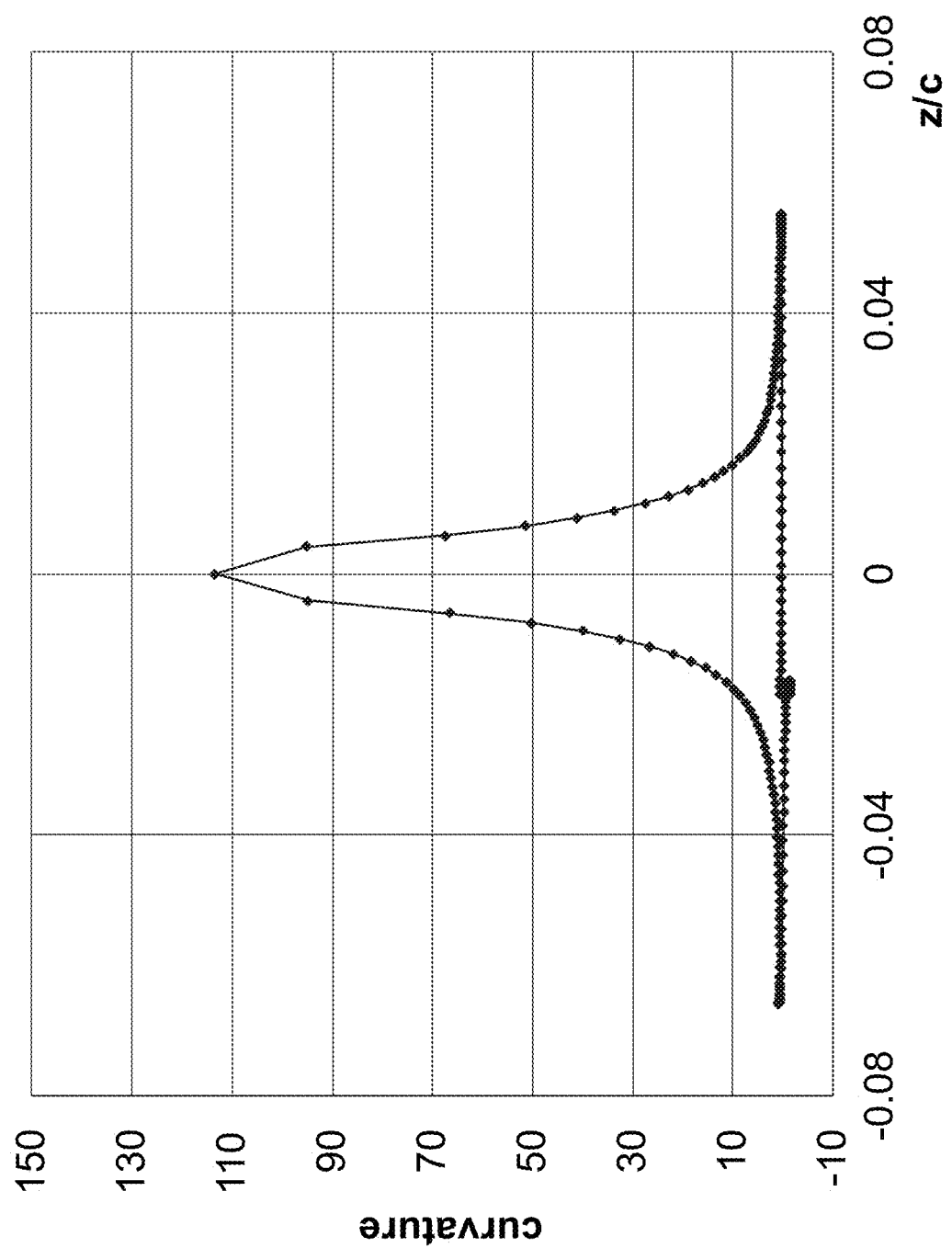
FIG. 41 is a graph showing a relationship between z/c and κ of the RAE 2822 airfoil.
Figure 42:
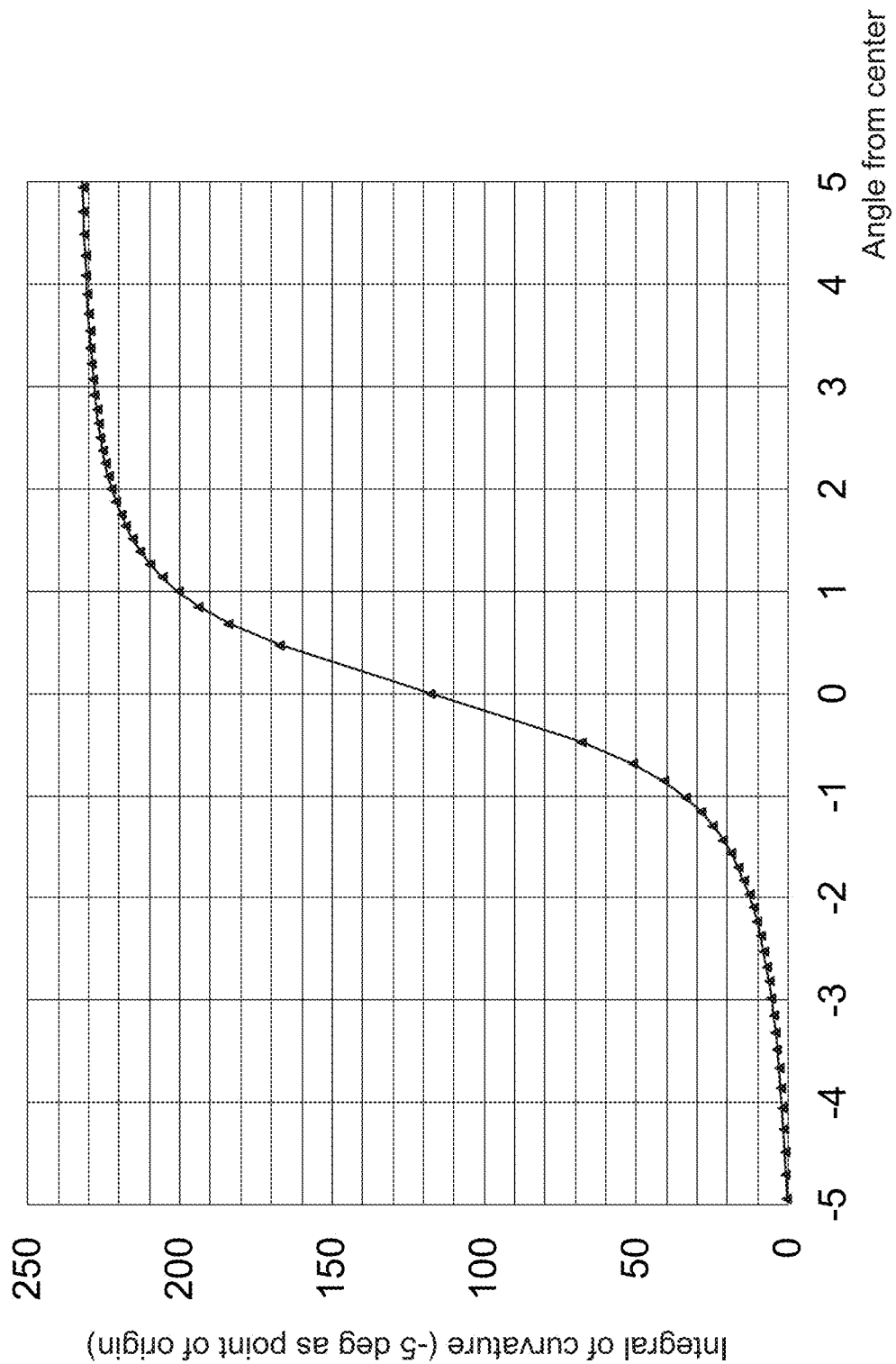
FIG. 42 is a graph showing a relationship between an angle from the center θ and $K_θ$ of the RAE 2822 airfoil.
Figure 43:
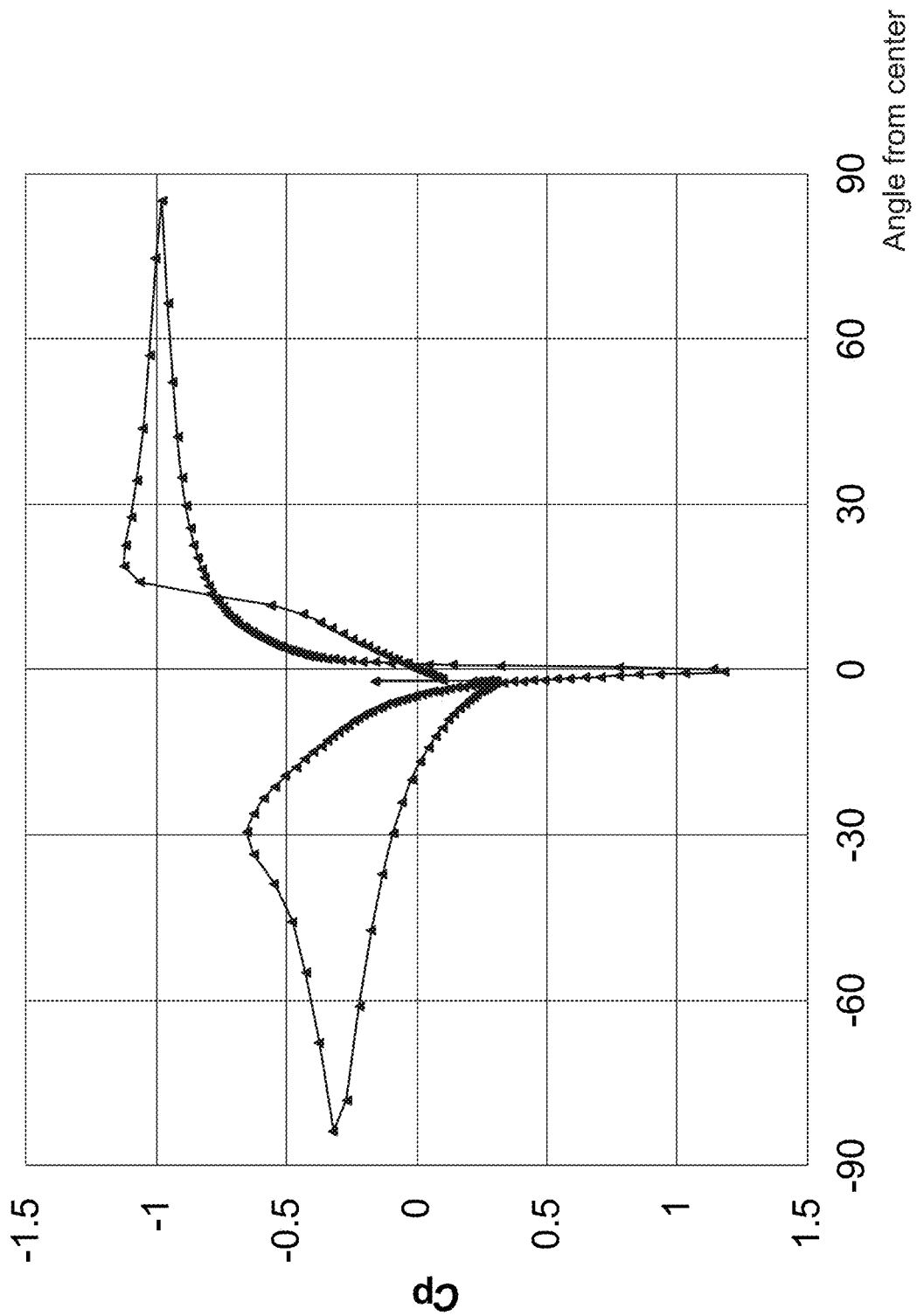
FIG. 43 is a graph showing a relationship between the angle from the center θ and Cp of the RAE 2822 airfoil.
Figure 44:
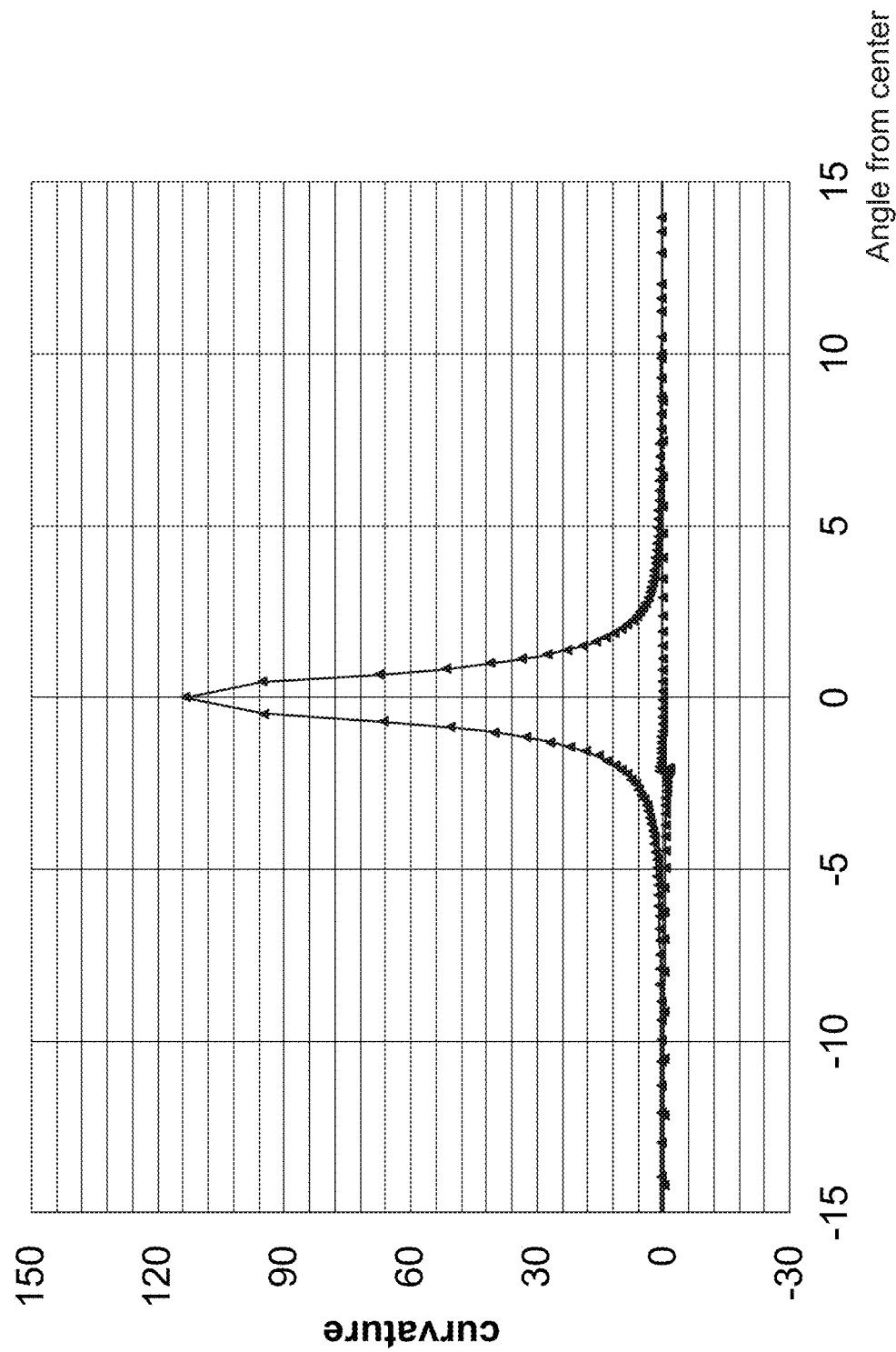
FIG. 44 is a graph showing a relationship between the angle from the center θ and κ of the RAE 2822 airfoil.
Figure 45:
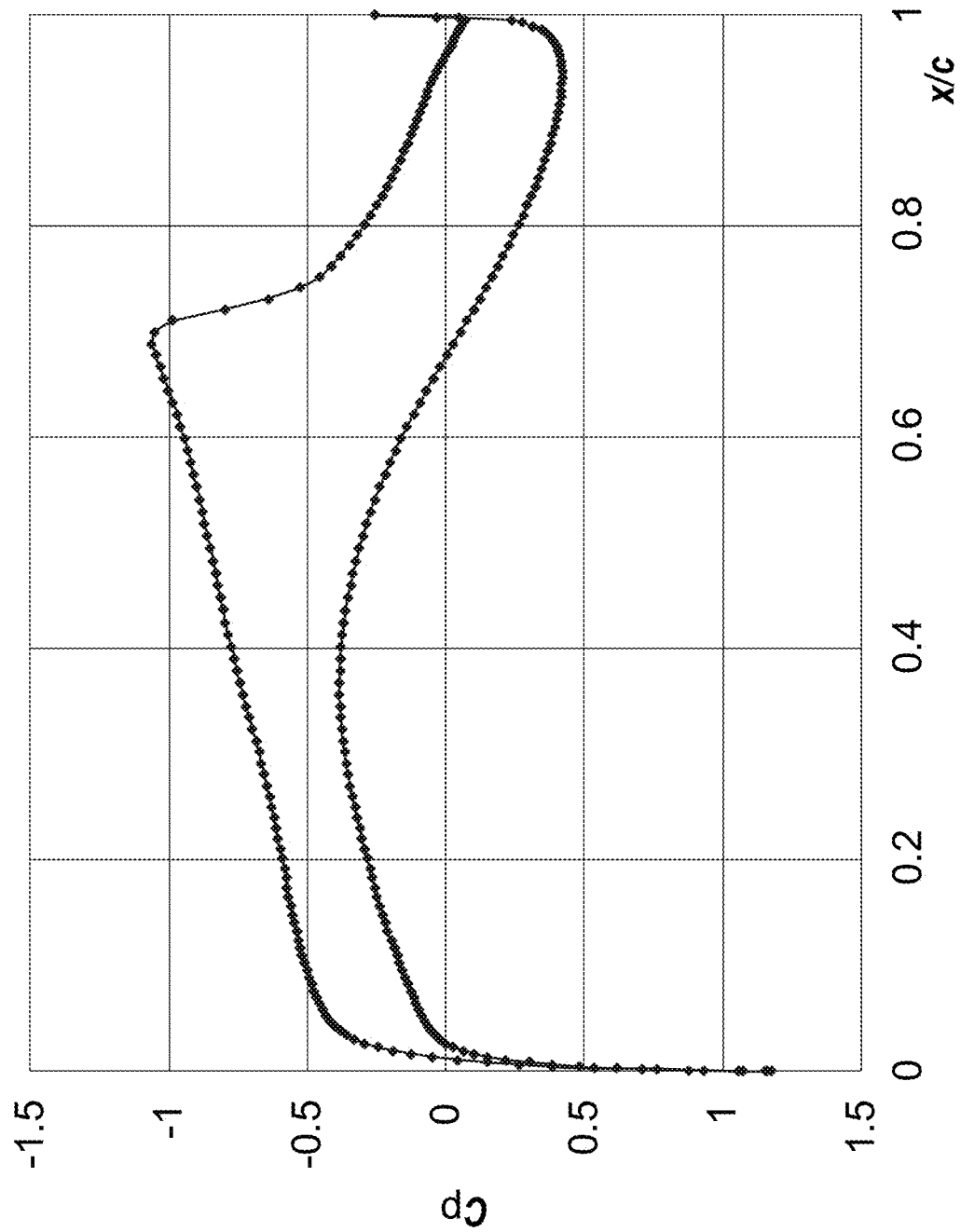
FIG. 45 is a graph showing a relationship between x/c and Cp of a CRM airfoil.
Figure 46:
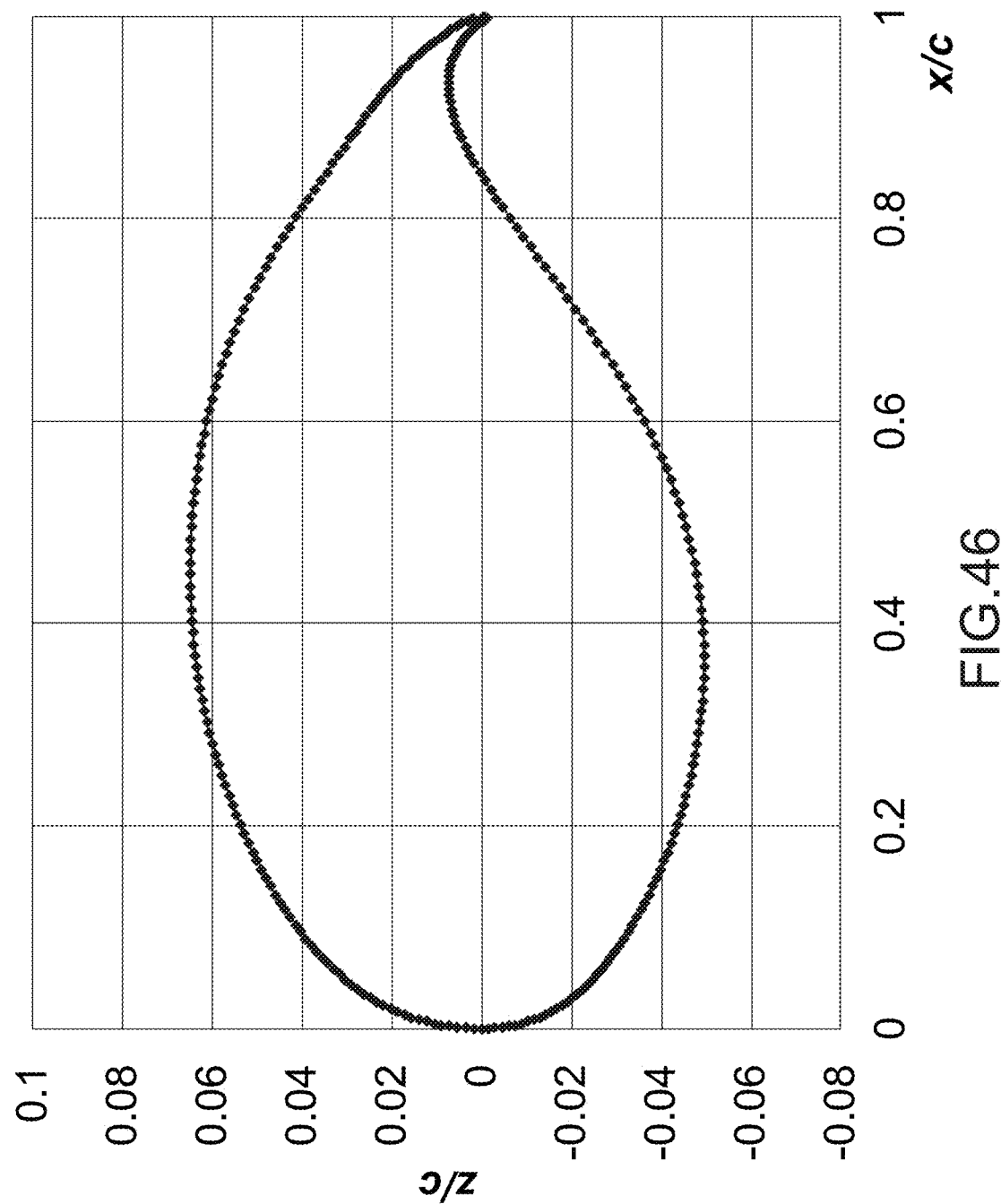
FIG. 46 is a graph showing a relationship between x/c and z/c of the CRM airfoil.
Figure 47:
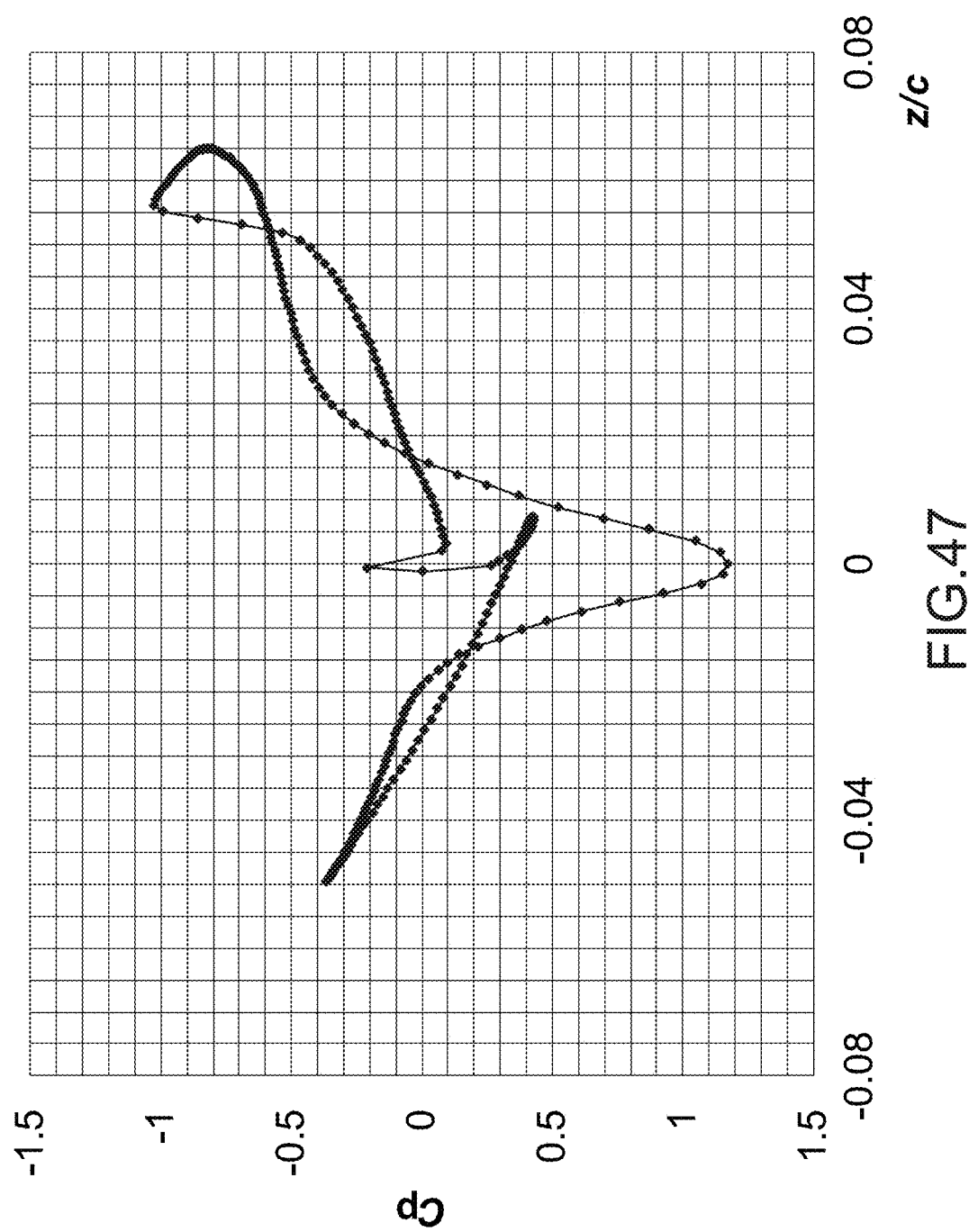
FIG. 47 is a graph showing a relationship between z/c and Cp of the CRM airfoil.
Figure 48:
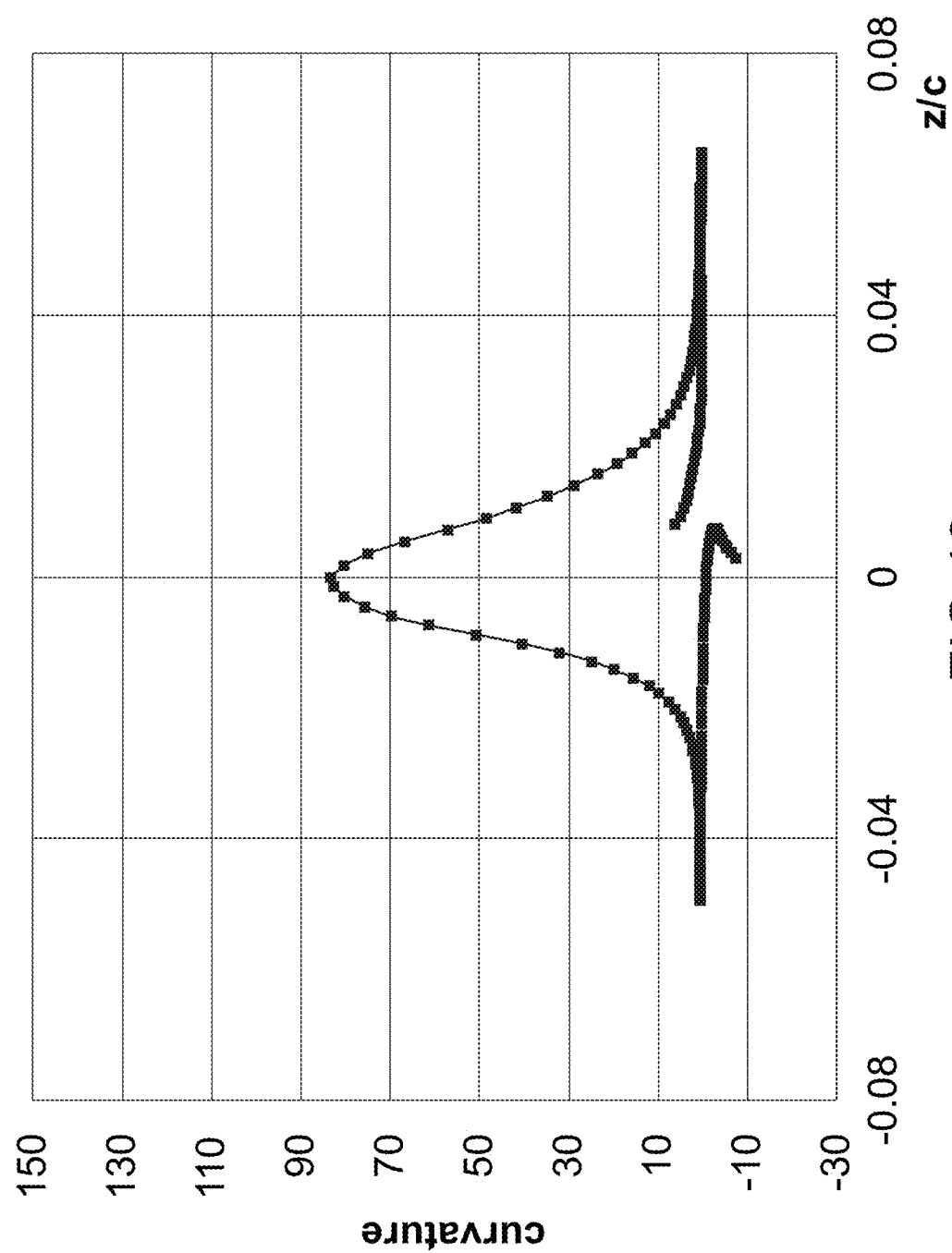
FIG. 48 is a graph showing a relationship between z/c and κ of the CRM airfoil.
Figure 49:
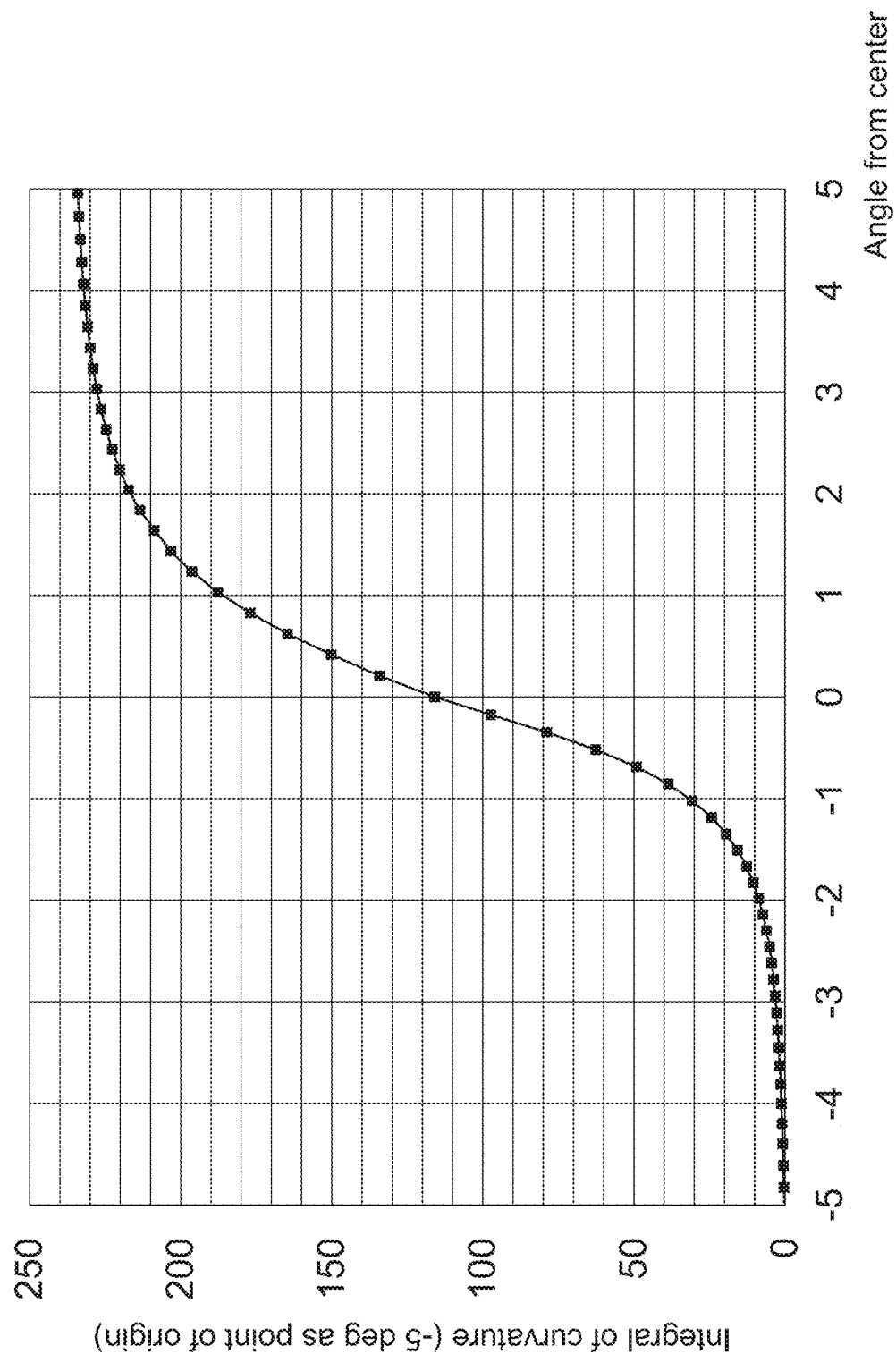
FIG. 49 is a graph showing a relationship between an angle from the center θ and $K_θ$ of the CRM airfoil.
Figure 50:
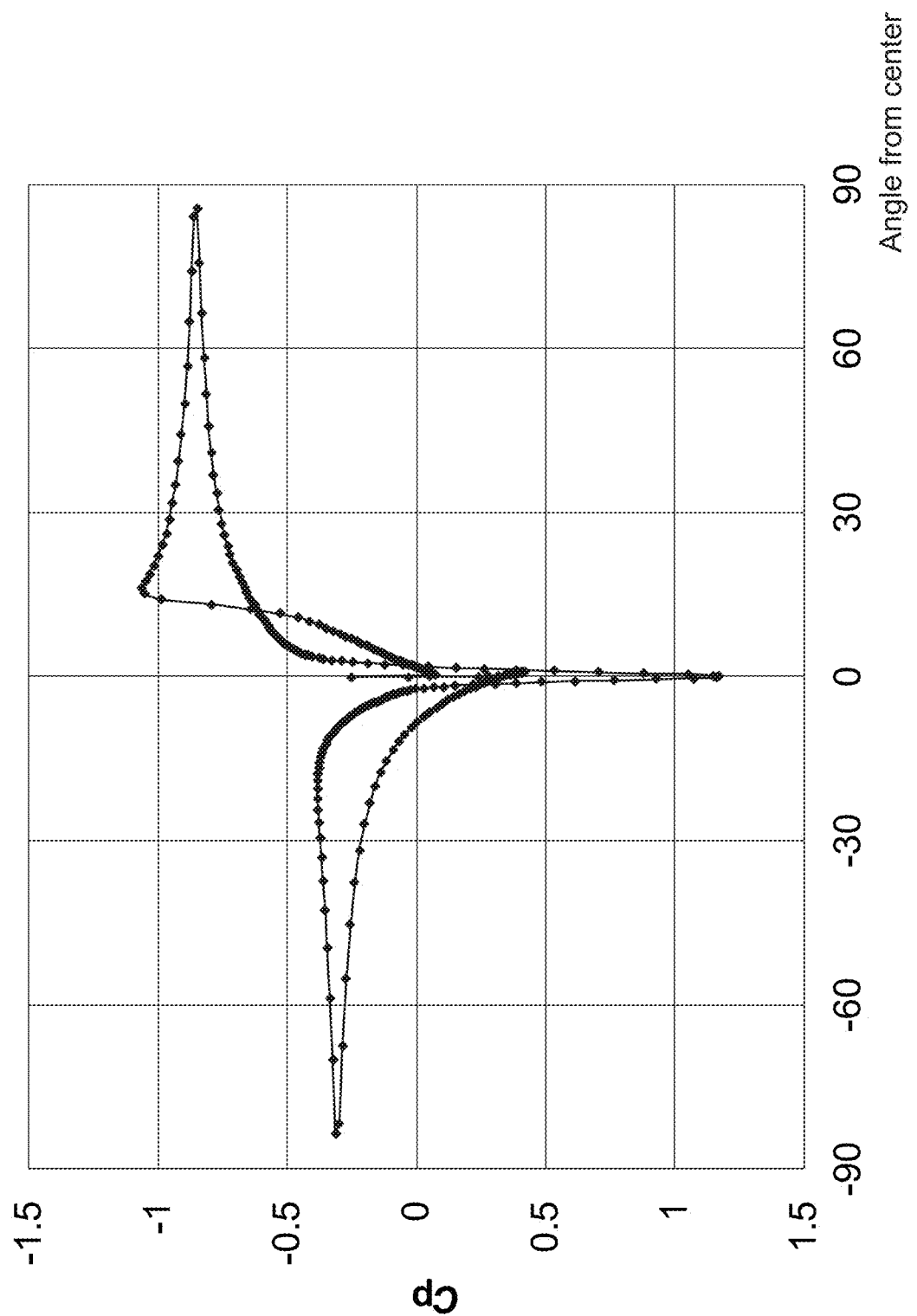
FIG. 50 is a graph showing a relationship between the angle from the center θ and Cp of the CRM airfoil.
Figure 51:
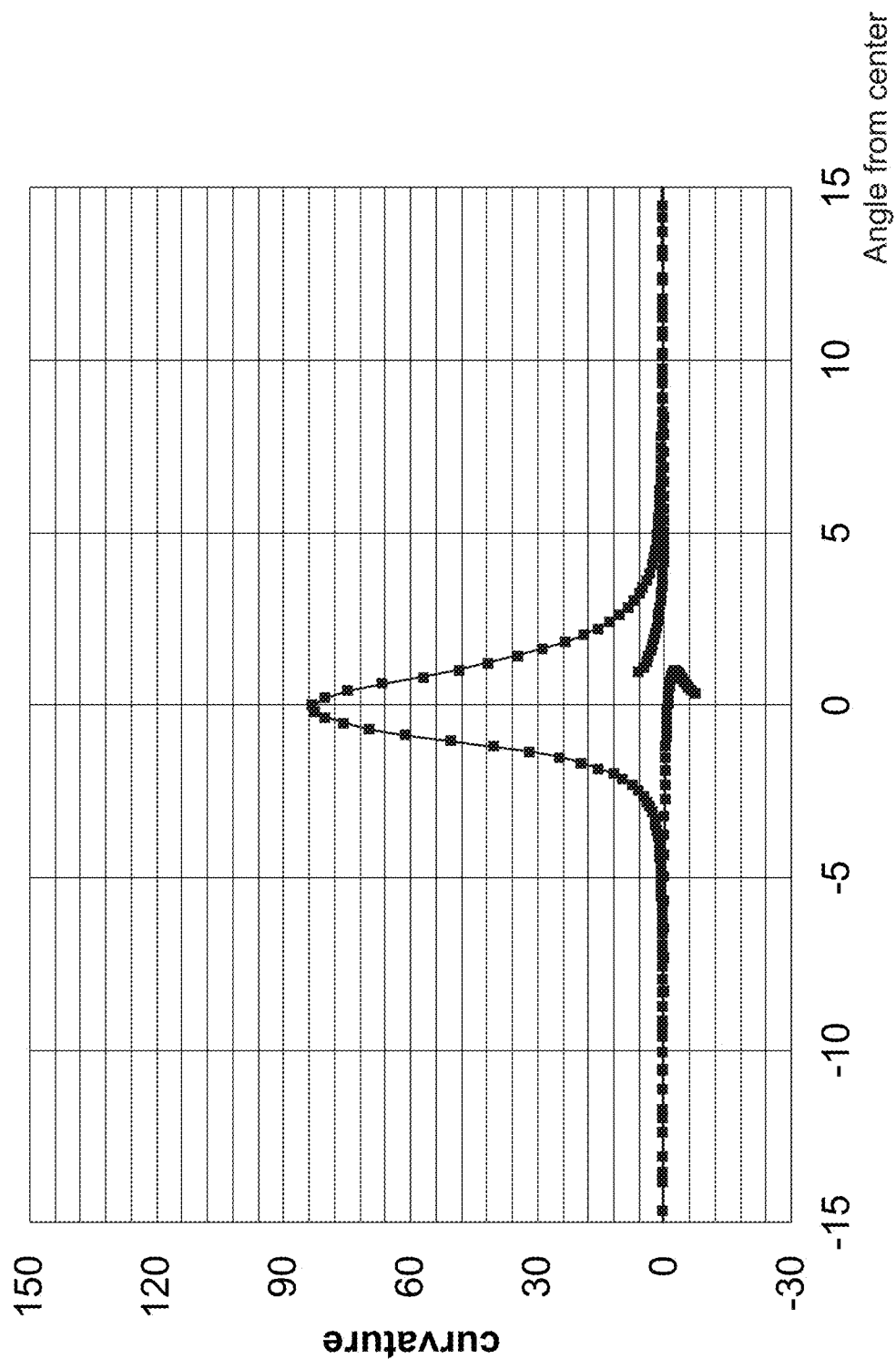
FIG. 51 is a graph showing a relationship between the angle from the center θ and κ of the CRM airfoil.
Figure 52:
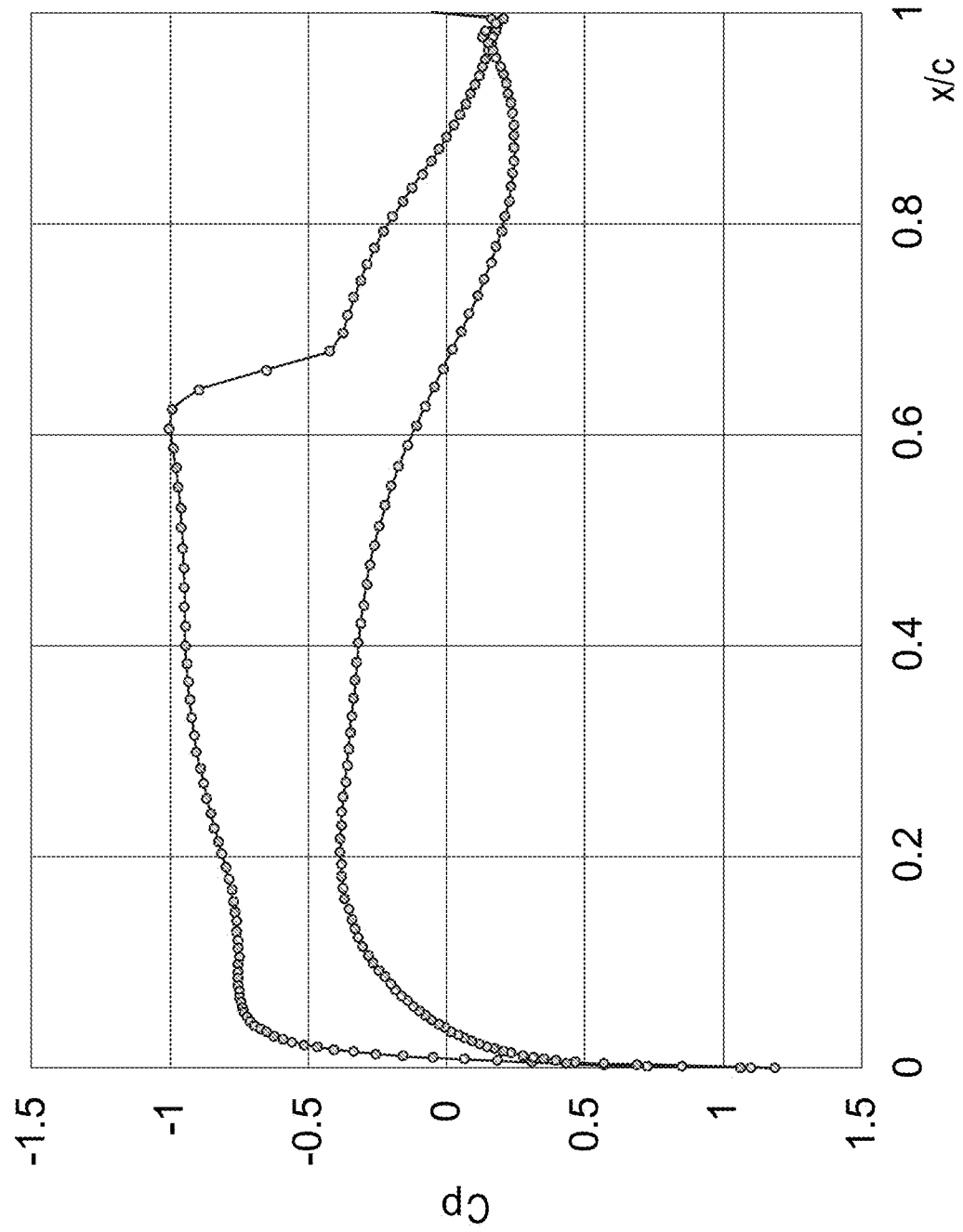
FIG. 52 is a graph showing a relationship between x/c and Cp of a Baseline airfoil.
Figure 53:
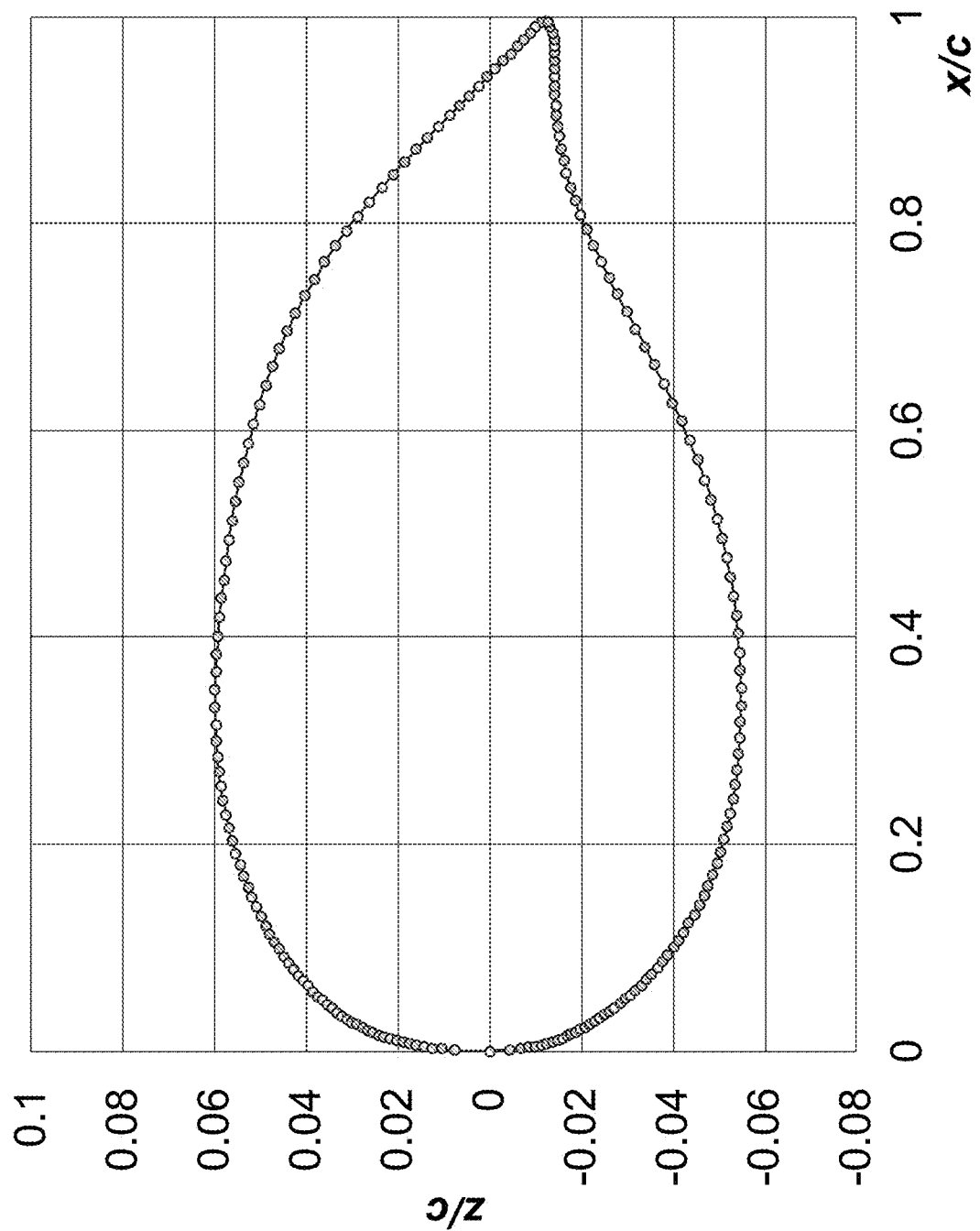
FIG. 53 is a graph showing a relationship between x/c and z/c of the Baseline airfoil.
Figure 54:
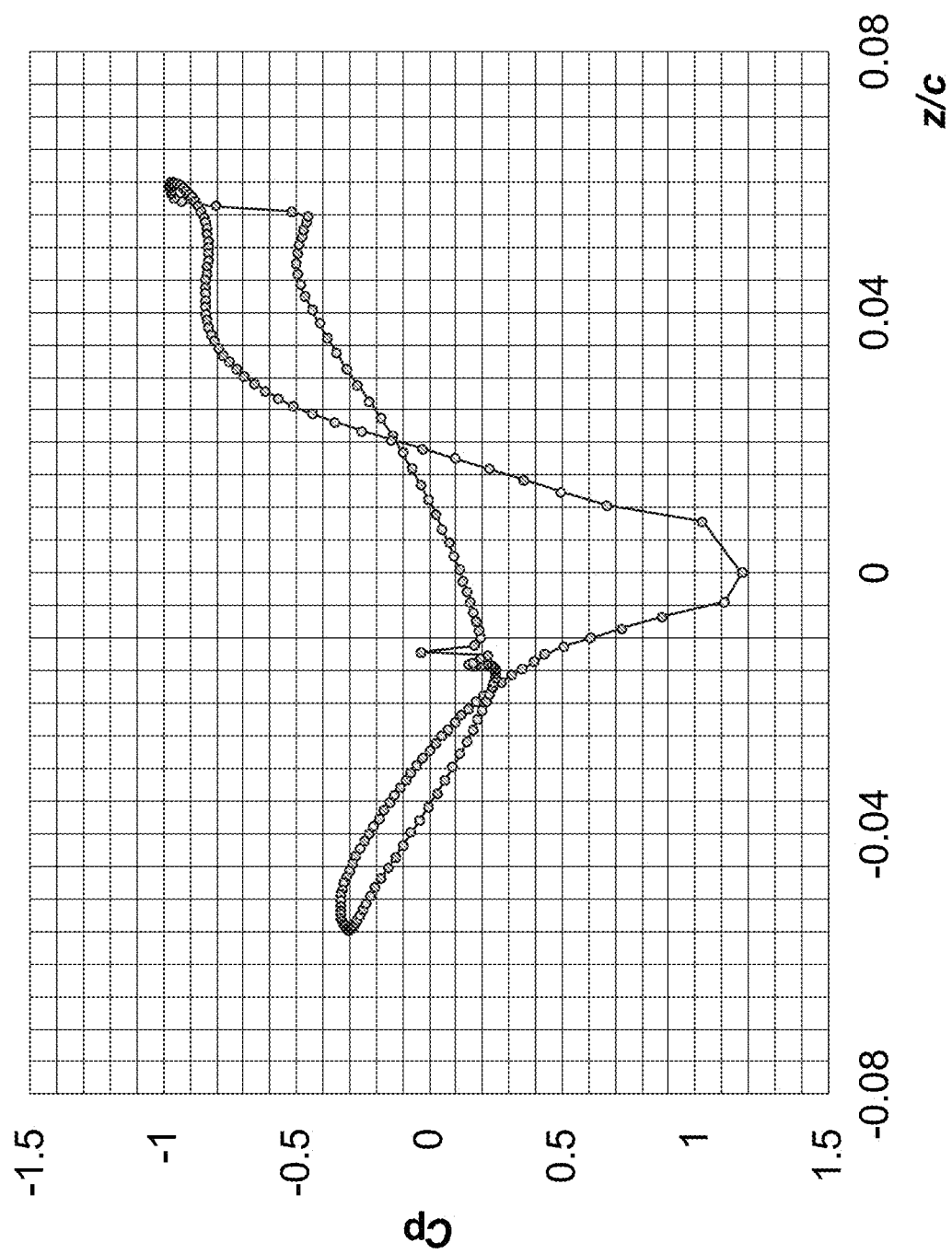
FIG. 54 is a graph showing a relationship between z/c and Cp of the Baseline airfoil.
Figure 55:
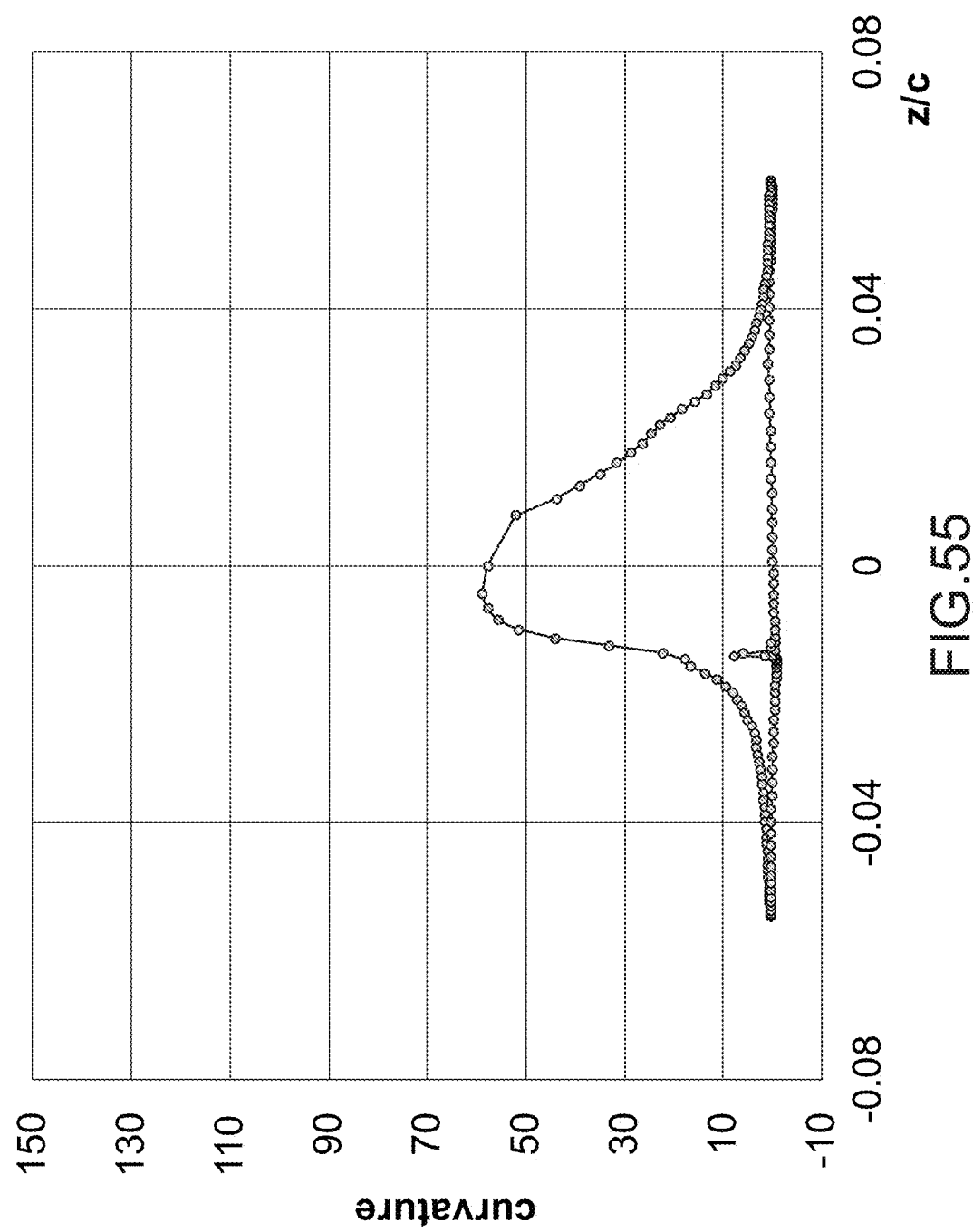
FIG. 55 is a graph showing a relationship between z/c and κ of the Baseline airfoil.
Figure 56:
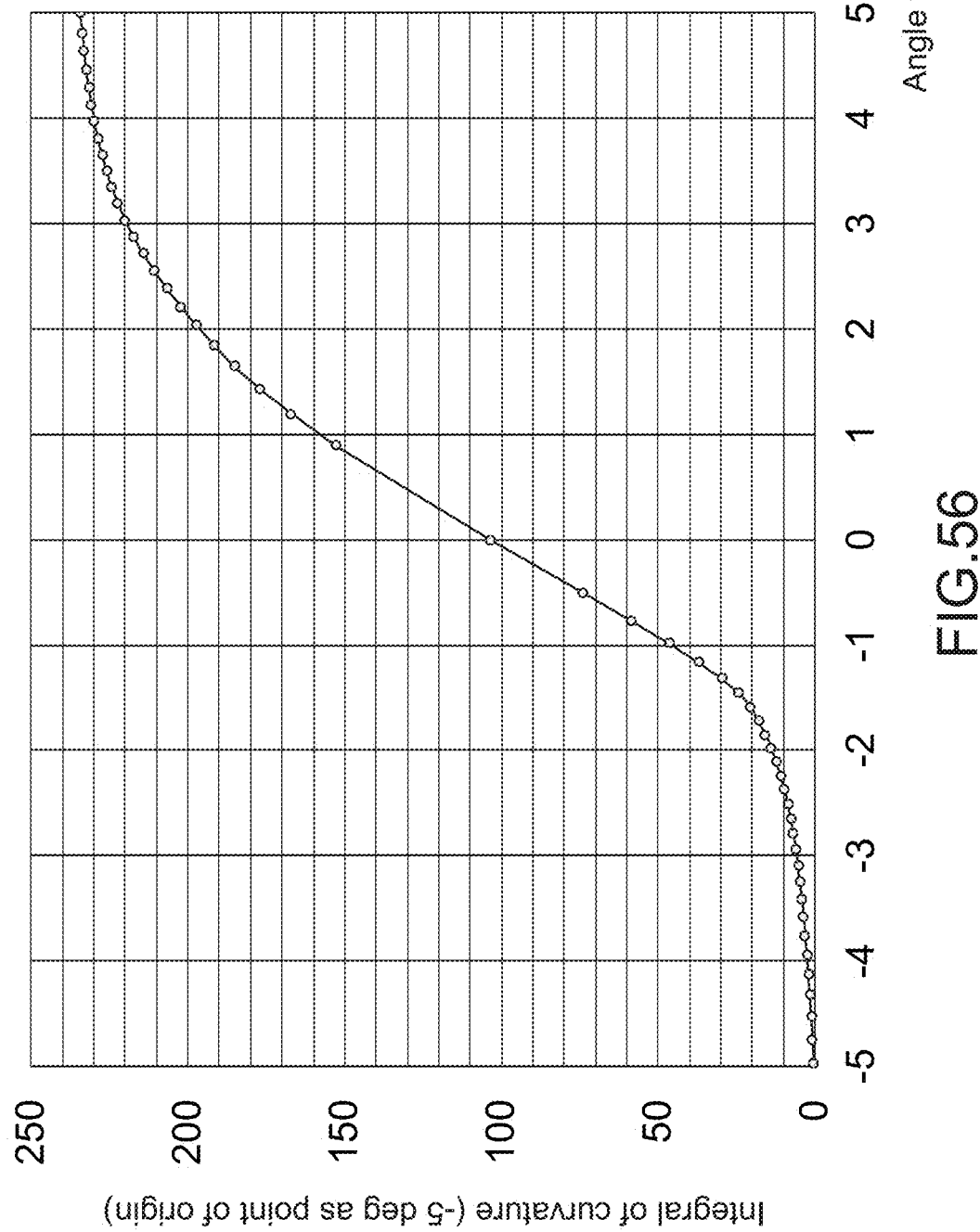
FIG. 56 is a graph showing a relationship between an angle from the center θ and $K_θ$ of the Baseline airfoil.
Figure 57:
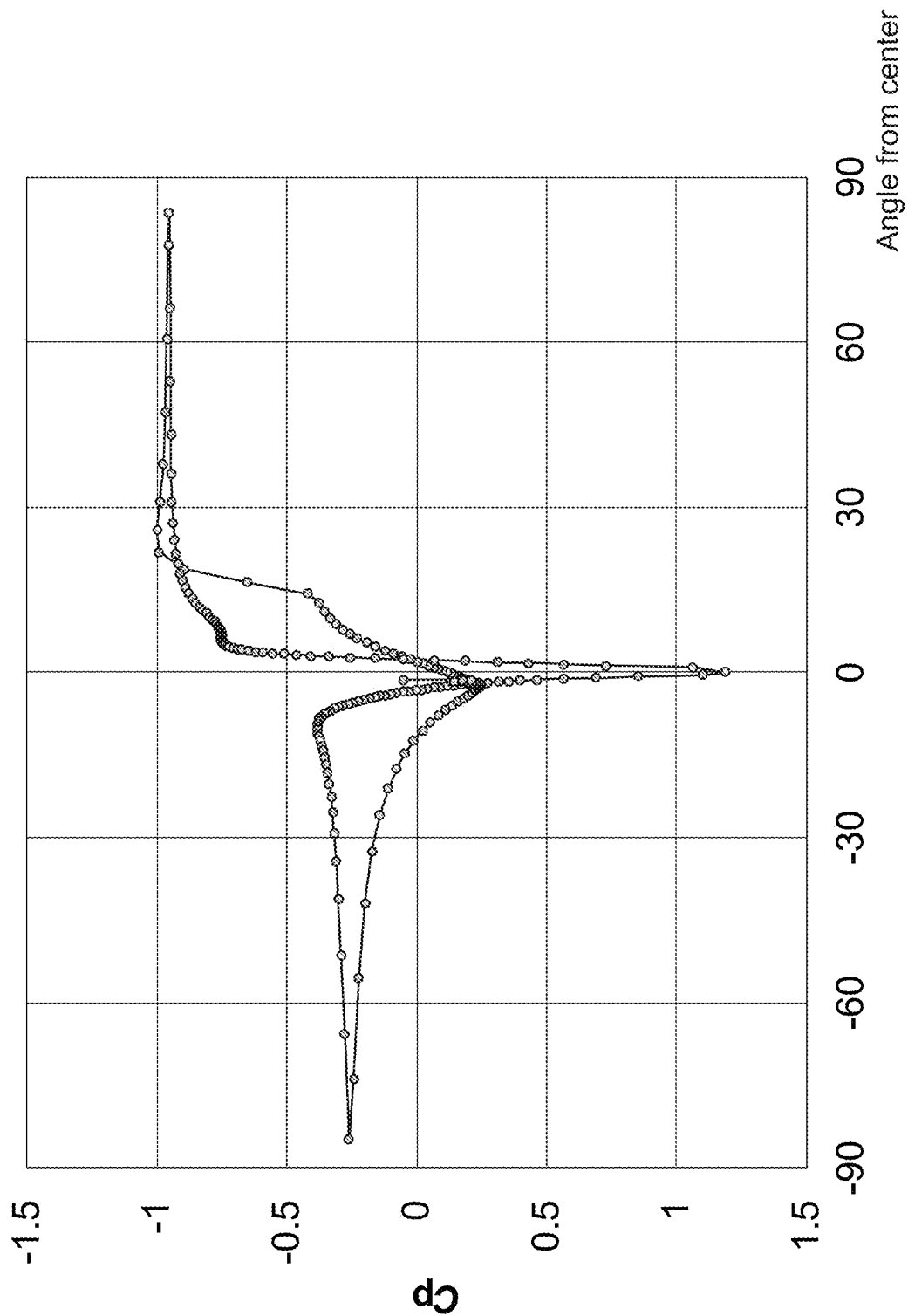
FIG. 57 is a graph showing a relationship between the angle from the center θ and Cp of the Baseline airfoil.
Figure 58:
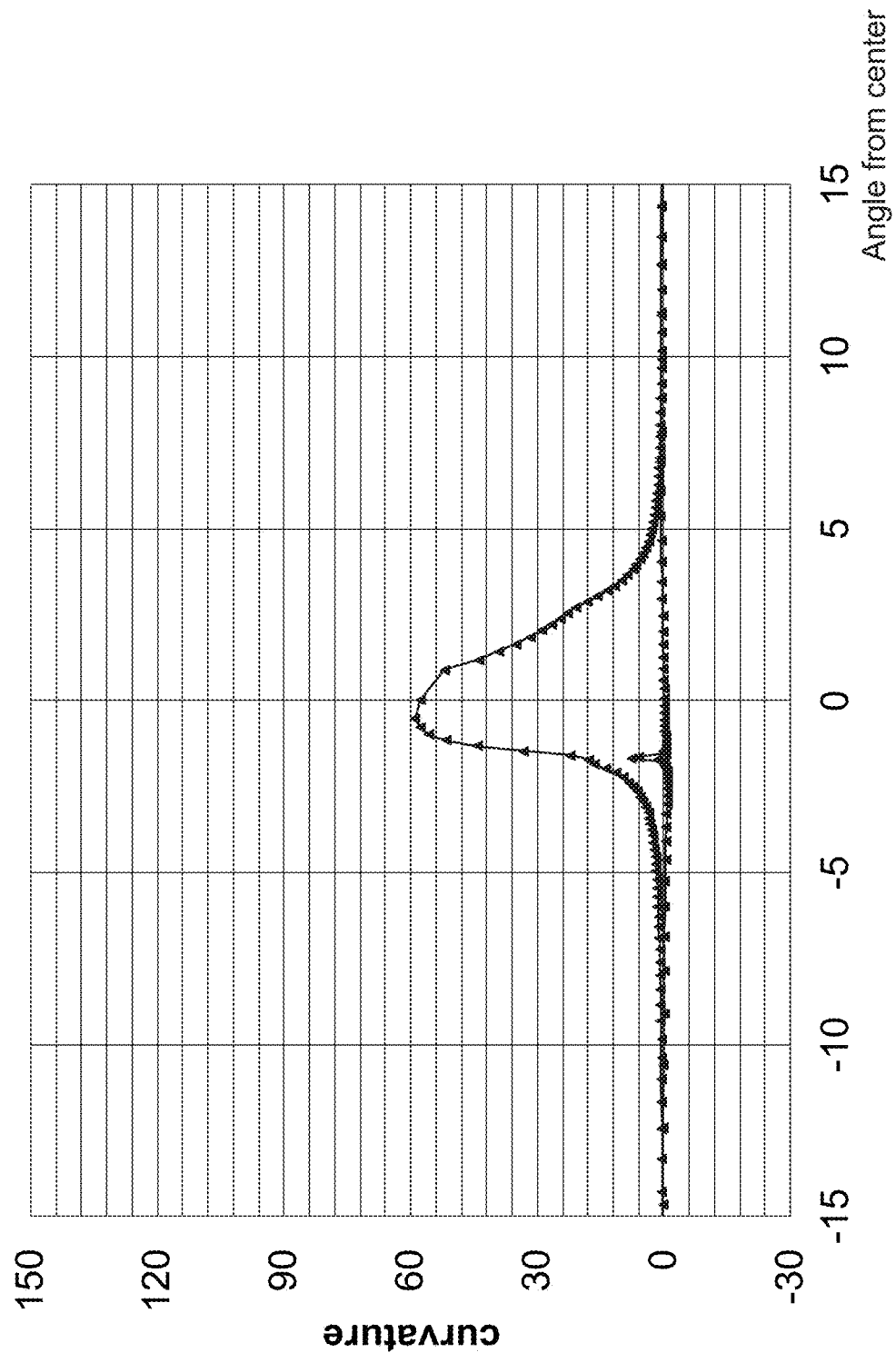
FIG. 58 is a graph showing a relationship between the angle from the center θ and κ of the Baseline airfoil.

Note that the airfoils 11 according to the embodiment described above have a shape in which the pressure coefficient Cp of the static pressure in the chord direction of the leading edge 12 is −0.04 or less at z/c=0.015. This is expressed using the relationship between Cp and x/c, which corresponds to the fact that Cp takes a negative value at x/c=0.0045, as shown in FIG. 16B. Note that FIG. 16B is a graph showing the relationship between Cp and x/c of the airfoils 11 shown in FIG. 16A in the vicinity of the leading edge in an enlarged manner.

FIGS. 17 to 23 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the airfoil 11 in the first mode according to the this embodiment.

FIGS. 24 to 30 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the airfoil 11 in the second mode according to the this embodiment.

FIGS. 31 to 37 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the airfoil 11 in the third mode according to the this embodiment.

FIGS. 38 to 44 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the RAE 2822 airfoil.

FIGS. 45 to 51 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the CRM airfoil.

FIGS. 52 to 58 show a relationship between x/c and Cp, a relationship between x/c and z/c, a relationship between z/c and Cp, a relationship between z/c and κ, a relationship between the angle from the center θ and $K_θ$, a relationship between the angle from the center θ and Cp, and a relationship between the angle from the center θ and κ, respectively, of the Baseline airfoil.

The present invention is not limited to the embodiment described above and can be variously modified or applied without departing from its technical idea to implement the present invention, the implementation range of which also belongs to the technical range of the present invention.

REFERENCE SIGNS LIST 1 aircraft
10 main wing
11 airfoil
12 leading edge
13 trailing edge

The invention claimed is:

1. A transonic airfoil, in which
κ has a local maximal value of 70 or more in an upwardly convex curve in a range of −0.08<s/c<0.08,
$K_s$ is 2.2 or more in a range from s/c=−0.1 to s/c=0.02, and
κ is 0.3 or less in a range from s/c=0.3 to s/c=0.6,
where
s represents a surface length along a surface of the airfoil, with a leading edge being as a reference (an upper wing surface direction is positive, and a lower wing surface direction is negative),
c represents a chord length,
κ represents a curvature that is made dimensionless by a reciprocal of the chord length, and
$K_s$ represents an integral value of the curvature κ.

2. The transonic airfoil according to claim 1, wherein κ is less than 0.3 at s/c=0.5, and the κ being less than 0.3 increases to be 0.45 or more at s/c=0.8.

3. The transonic airfoil according to claim 1, wherein κ has a local maximal value of 1 or more in an upwardly convex curve in a range from s/c=0.9 or more to a position of a trailing edge.

4. The transonic airfoil according to claim 1, wherein κ monotonically decreases in a range from a stagnation point to a crest position of a lower wing surface, and $K_s$ is 0.1 or more in a range from s/c=−0.1 to s/c=−0.2.

5. The transonic airfoil according to claim 1, wherein κ has a mean value of 0.45 or less in a range from s/c=−0.52 to s/c=−0.34, and
κ is 0.4 or less at s/c=−0.52.

6. The transonic airfoil according to claim 1, wherein a distribution of κ monotonically increases to 1 or more in a range from s/c=−0.9 or less to a position of a trailing edge.

7. The transonic airfoil according to claim 1, wherein the transonic airfoil has a shape in which a pressure coefficient Cp of a static pressure in a chord direction of a leading edge is −0.04 or less at z/c=0.015, where
z represents a coordinate in a direction perpendicular to an airflow direction within a plane that forms an airfoil, with the leading edge being as a reference (an upper wing surface direction is positive, and a lower wing surface direction is negative), and
c represents the chord length.

8. The transonic airfoil according to claim 1, wherein the transonic airfoil has a shape in which the pressure coefficient Cp of the static pressure in the chord direction of the leading edge is −0.07 or less at z/c=0.035.

9. An aircraft comprising a main wing having a transonic airfoil, the transonic airfoil having:
κ with a local maximal value of 70 or more in an upwardly convex curve in a range of −0.08<s/c<0.08;
$K_s$ of 2.2 or more in a range from s/c=−0.1 to s/c=0.02; and
κ of 0.3 or less in a range from s/c=0.3 to s/c=0.6,
where
s represents a surface length along a surface of the airfoil, with a leading edge being as a reference (an upper wing surface direction is positive, and lower wing surface direction is negative),
c represents a chord length,
κ represents a curvature that is made dimensionless by a reciprocal of the chord length, and
$K_s$ represents an integral value of the curvature κ.

* * * * *